(12) United States Patent
Kanno et al.

(10) Patent No.: US 10,199,173 B2
(45) Date of Patent: Feb. 5, 2019

(54) VARIABLE CAPACITANCE ELEMENT, PACKAGED CIRCUIT, RESONANT CIRCUIT, COMMUNICATION APPARATUS, COMMUNICATION SYSTEM, WIRELESS CHARGING SYSTEM, POWER SUPPLY APPARATUS, AND ELECTRONIC APPARATUS

(71) Applicant: DEXERIALS CORPORATION, Tokyo (JP)

(72) Inventors: Masayoshi Kanno, Tochigi (JP); Norio Saito, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 882 days.

(21) Appl. No.: 14/419,136

(22) PCT Filed: Jul. 29, 2013

(86) PCT No.: PCT/JP2013/070474
§ 371 (c)(1),
(2) Date: Feb. 2, 2015

(87) PCT Pub. No.: WO2014/024716
PCT Pub. Date: Feb. 13, 2014

(65) Prior Publication Data
US 2015/0243442 A1 Aug. 27, 2015

(30) Foreign Application Priority Data
Aug. 9, 2012 (JP) ................................ 2012-176665

(51) Int. Cl.
*H01G 7/00* (2006.01)
*H02J 5/00* (2016.01)
(Continued)

(52) U.S. Cl.
CPC .............. *H01G 7/00* (2013.01); *H01G 7/06* (2013.01); *H02J 5/005* (2013.01); *H02J 7/025* (2013.01); *H02J 17/00* (2013.01); *H02J 50/12* (2016.02)

(58) Field of Classification Search
CPC ............... H01G 7/00; H02J 50/00; H02J 7/00
(Continued)

(56) References Cited

U.S. PATENT DOCUMENTS

2009/0146498 A1 6/2009 Kanno
2011/0134582 A1* 6/2011 Kanno ................. H01G 7/06
361/277

(Continued)

FOREIGN PATENT DOCUMENTS

JP 2009142043 A 6/2009
JP 2010258402 A 11/2010
(Continued)

OTHER PUBLICATIONS

Translation of Oct. 8, 2013 International Search Report issued in International Patent Application No. PCT/JP2013/070474.

*Primary Examiner* — Rexford Barnie
*Assistant Examiner* — Joseph Inge
(74) *Attorney, Agent, or Firm* — Oliff PLC

(57) ABSTRACT

The present provides a variable capacitance element enabling a further reduction in capacitance variation among variable capacitance elements, and provides a packaged circuit including the variable capacitance element. A variable capacitance element is configured to include an element body unit, a compensation unit, a first external terminal for signals, a second external terminal for signals, external terminals for control, and external terminals for capacitance compensation. The compensation unit has second variable-capacitance capacitor units C9 to C 11, each including a (Continued)

second dielectric layer formed of a ferroelectric material, and is connected to the element body unit, and has a capacitance varying according to a control voltage signal.

10 Claims, 26 Drawing Sheets

(51) Int. Cl.
 *H02J 7/02* (2016.01)
 *H01G 7/06* (2006.01)
 *H02J 17/00* (2006.01)
 *H02J 50/12* (2016.01)

(58) Field of Classification Search
 USPC .......................................................... 307/104
 See application file for complete search history.

(56) References Cited

U.S. PATENT DOCUMENTS

| | | | | |
|---|---|---|---|---|
| 2012/0062338 A1* | 3/2012 | Kanno | ............... | H01G 4/012 333/185 |
| 2012/0161696 A1* | 6/2012 | Cook | ............... | B60L 11/182 320/108 |

FOREIGN PATENT DOCUMENTS

| | | | |
|---|---|---|---|
| JP | 2011119482 A | 6/2011 | |
| JP | 2012060030 A | 3/2012 | |

\* cited by examiner

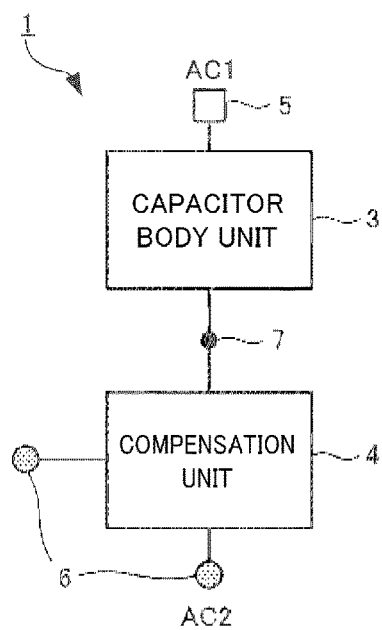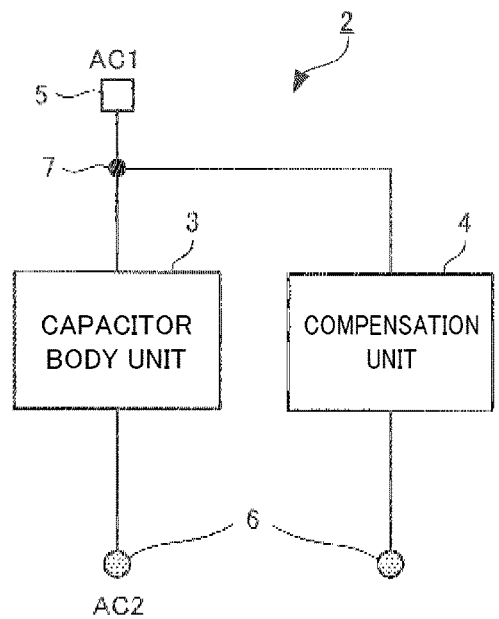
FIG.1A  FIG.1B
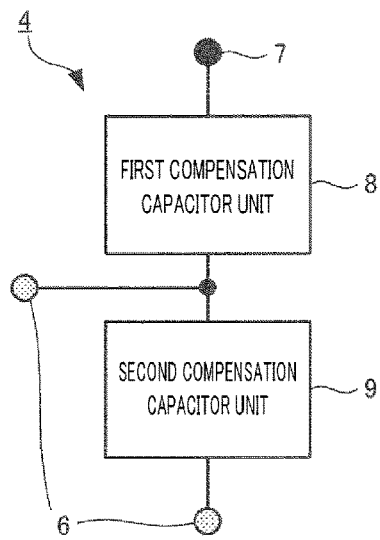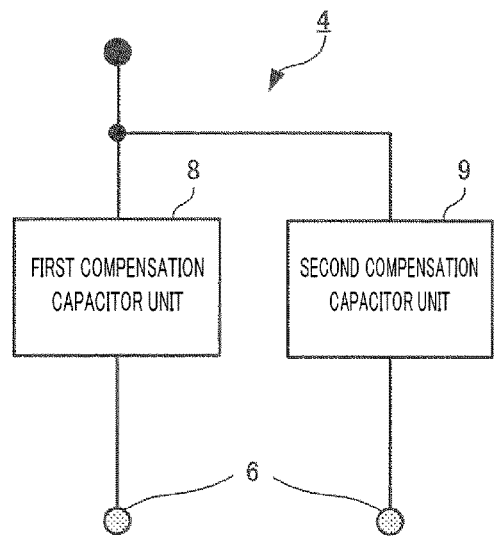
FIG.2A  FIG.2B

VARIABLE CAPACITANCE ELEMENT, PACKAGED CIRCUIT, RESONANT CIRCUIT, COMMUNICATION APPARATUS, COMMUNICATION SYSTEM, WIRELESS CHARGING SYSTEM, POWER SUPPLY APPARATUS, AND ELECTRONIC APPARATUS

FIELD OF THE INVENTION

The present application asserts priority rights based on JP Patent Application 2012-176665 filed in Japan on Aug. 9, 2012. The total contents of disclosure of the patent application of the senior filing date are to be incorporated by reference into the present application.

The present disclosure relates to a variable capacitance element having a capacitance which varies by the application of a control voltage; a packaged circuit including the variable capacitance element; a resonant circuit; a communication apparatus; a communication system; a wireless charging system; a power supply apparatus; and an electronic apparatus.

BACKGROUND OF THE INVENTION

Conventionally, as a variable-capacitance capacitor applicable to a system and an apparatus (electronic apparatus) each requiring a capacitance adjustment, a variable-capacitance capacitor made of a ferroelectric material has been proposed. Such variable-capacitance capacitor has a high relative dielectric constant, and therefore, if the size of an electrode, the film thickness of a dielectric layer, or the like deviates from a desired value, the capacitance of the variable-capacitance capacitor also more largely deviates from a desired capacitance value. Thus, due to a manufacturing error and the like, a wider variation in capacitance among variable-capacitance capacitors is caused.

Therefore, various techniques for controlling the capacitance variation among the variable-capacitance capacitors have been proposed (for example, refer to Patent Literature 1). Patent Literature 1 proposes a variable-capacitance capacitor wherein, even if a first electrode and a second electrode which face each other with sandwiching a dielectric layer therebetween cause a relative misalignment, a projected area obtained when the first electrode is projected onto a surface of the second electrode does not change.

PRIOR-ART DOCUMENTS

Patent Document

PTL 1: Japanese Patent Application Laid-Open No. 2010-258402

SUMMARY OF THE INVENTION

As mentioned above, conventionally, techniques for reducing capacitance variation among variable-capacitance capacitors made of a ferroelectric material have been proposed. However, in this technical field, there has been desired the development of a technique capable of further control of capacitance variation between variable-capacitance capacitors.

The present disclosure is provided in order to meet the above-mentioned demand. The present disclosure aims to provide a variable capacitance element allowing a further reduction in capacitance variation among variable capacitance elements; a packaged circuit including the above-mentioned variable capacitance element; a resonant circuit; a communication apparatus; a communication system; a wireless charging system; a power supply apparatus; and an electronic apparatus.

To solve the above-mentioned problem, a variable capacitance element according to the present disclosure is configured to comprise an element body unit, a compensation unit, a first external terminal for signals, a second external terminal for signals, an external terminal for control, and an external terminal for capacitance compensation, and each of the units and the terminals is configured as follows. The element body unit has a first variable capacitor unit including a first dielectric layer formed of a ferroelectric material, and the capacitance of the element body unit varies according to a control voltage signal applied from outside. The compensation unit has a second variable capacitor unit including a second dielectric layer formed of a ferroelectric material and is connected to the element body unit, and the capacitance of the compensation unit varies according to the control voltage signal. The first external terminal for signals is connected to the element body unit, and an AC signal is inputted to said first external terminal for signals. The second external terminal for signals is connected to the element body unit or the compensation unit, and an AC signal is inputted to said second external terminal for signals. The external terminal for control is connected to the element body unit, and the control voltage signal is inputted to said external terminal for control. The external terminal for capacitance compensation is connected to the compensation unit.

A packaged circuit according to the present disclosure comprises an element body unit, a compensation unit, a first external terminal for signals, a second external terminal for signals, an external terminal for control, and an external terminal for capacitance compensation, each having the same configuration as a corresponding one of the units and the terminals of the above-mentioned variable capacitance element according to the present disclosure, and furthermore, comprises a bias resistance connected to the external terminal for control.

A resonant circuit according to the present disclosure comprises: a resonant capacitor including the above-mentioned variable capacitance element according to the present disclosure; and a resonant coil connected to the resonant capacitors.

A communication apparatus according to the present disclosure comprises: a receiving antenna unit which includes a resonant capacitor including the variable capacitance element according to the present disclosure and a resonant coil connected to the resonant capacitor, and performs non-contact communication with outside; and a voltage generating circuit which outputs a control voltage signal to the external terminal for control included in the variable capacitance element.

A communication system according to the present disclosure is configured to comprise a transmitting apparatus and a receiving apparatus configured to perform non-contact communication with the transmitting apparatus. Furthermore, in the communication system according to the present disclosure, the transmitting apparatus includes a transmitting antenna unit including: a resonant capacitor including the above-mentioned variable capacitance element according to the present disclosure; and a resonant coil connected to the resonant capacitor.

A wireless charging system according to the present disclosure is configured to comprise a power feeding apparatus and a power receiving apparatus. In the wireless charging system according to the present disclosure, the power feeding apparatus has a power feeding antenna unit which includes: a first resonant capacitor including the above-mentioned first variable capacitance element according to the present disclosure; and a first resonant coil connected to the first resonant capacitor. Furthermore, in the wireless charging system according to the present disclosure, the power receiving apparatus includes a power receiving antenna unit which includes: a second resonant capacitor including the above-mentioned second variable capacitance element according to the present disclosure; and a second resonant coil connected to the second resonant capacitor, and performs non-contact communication with the power feeding antenna unit.

A power supply apparatus according to the present disclosure is configured to comprise: a power supply unit; a rectifier circuit unit configured to convert AC power supplied from the power supply unit into DC power; and a variable impedance unit. Furthermore, in the power supply apparatus according to the present disclosure, a variable impedance unit includes the above-mentioned variable capacitance element according to the present disclosure and is arranged between the power supply unit and the rectifier circuit unit.

A first electronic apparatus according to the present disclosure is configured to comprise a communication unit and a voltage generating circuit, and the communication unit and the voltage generating circuit each are configured as follows. The communication unit comprises: a resonant capacitor including the above-mentioned variable capacitance element according to the present disclosure; and a resonant coil connected to the resonant capacitor, and performs non-contact communication with outside. The voltage generating circuit outputs a control voltage signal to the external terminal for control included in the variable capacitance element.

A second electronic apparatus according to the present disclosure is configured to comprise a power feeding apparatus unit and a power receiving apparatus unit which have the same configuration as the power feeding apparatus and the power receiving apparatus of the above-mentioned wireless feed system according to the present disclosure, respectively.

A third electronic apparatus according to the present disclosure is configured to comprise the power supply unit, the rectifier circuit unit, and the variable impedance unit of the above-mentioned power supply apparatus according to the present disclosure.

A fourth electronic apparatus according to the present disclosure is configured to comprise: a communication apparatus unit having the same configuration as that of the above-mentioned first electronic apparatus; and a power feeding apparatus unit and a power receiving apparatus unit which have the same configuration as those of the above-mentioned second electronic apparatus, respectively.

A fifth electronic apparatus according to the present disclosure is configured to comprise: a communication apparatus unit having the same configuration as that of the above-mentioned first electronic apparatus; and a power supply apparatus unit having the same configuration as that of the above-mentioned third electronic apparatus.

A sixth electronic apparatus according to the present disclosure is configured to comprise: a power feeding apparatus unit and a power receiving apparatus unit having the same configuration as those of the above-mentioned second electronic apparatus, respectively; and a power supply apparatus unit having the same configuration as that of the above-mentioned third electronic apparatus.

A seventh electronic apparatus according to the present disclosure is configured to comprise: a communication apparatus unit having the same configuration as that of the above-mentioned first electronic apparatus; a power feeding apparatus unit and a power receiving apparatus unit having the same configuration as those of the above-mentioned second electronic apparatus, respectively; and a power supply apparatus unit having the same configuration as that of the above-mentioned third electronic apparatus.

As mentioned above, in the variable capacitance element according to the present disclosure, not only the first and the second external terminals for signals and the external terminal for control, but also an external terminal for capacitance compensation which is connected to the compensation unit having the second variable capacitor unit are provided as external terminals. Such configuration allows the capacitance of the variable capacitance element to be adjusted by changing an electrical connection state between the second external terminal for signals and the external terminal for capacitance compensation by, for example, external wiring or the like, after the variable capacitance element is mounted on an external circuit board or the like.

Effects of Invention

As mentioned above, the variable capacitance element according to the present disclosure allows the capacitance of the variable capacitance element to be adjusted after the variable capacitance element is mounted on an external circuit board or the like. Therefore, the present disclosure enables a reduction in capacitance variation among the variable capacitance elements.

BRIEF DESCRIPTION OF DRAWINGS

FIG. 1 is a schematic block diagram of a variable capacitance element according to the present disclosure.

FIG. 2 is a schematic internal configuration diagram of a compensation unit of the variable capacitance element according to the present disclosure.

DETAILED DESCRIPTION OF THE INVENTION

Figure 3:
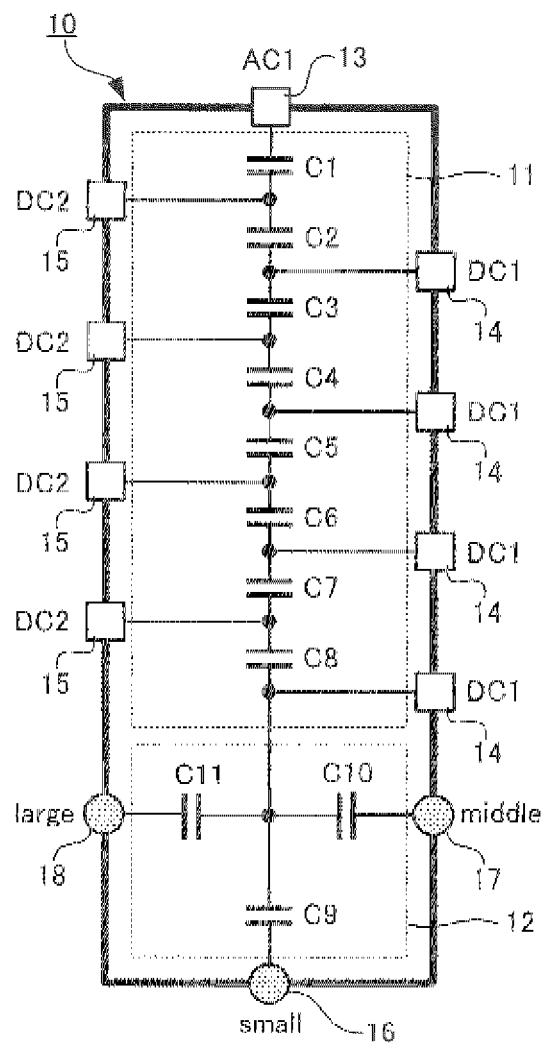
FIG. 3 is a schematic diagram of a variable capacitance element according to a first embodiment.

Hereinafter, configuration examples of variable capacitance elements according to various embodiments of the present disclosure will be described in the following order with reference to the drawings. It should be noted that the present disclosure is not limited to the following examples.

1. Outline of variable capacitance element according to the present disclosure

2. First Embodiment: First configuration example of series-connected type variable capacitance element 3. Second Embodiment: Second configuration example of series-connected type variable capacitance element 4. Third Embodiment: Third configuration example of series-connected type variable capacitance element 5. Fourth Embodiment: Configuration example of parallel-connected type variable capacitance element 6. Various Application Examples <1. Outline of Variable Capacitance Element According to the Present Disclosure>

[Effect of Capacitance Variation]

First, before the explanation of the outline of a variable capacitance element according to the present disclosure, the reason why capacitance variation of a variable capacitance element needs to be further controlled in this technical field will be briefly described.

As mentioned above, in a variable capacitance element made of a ferroelectric material, due to a manufacturing error and the like, a wider variation in capacitance among variable capacitance elements is caused. In the case where a variable capacitance element having such wider capacitance variation is applied to, for example, a communication system or the like, a substantial variable range (an available range) of capacitance in the variable capacitance element is calculated by subtracting the capacitance variation from a variable range of capacitance obtained when there is no capacitance variation. In this case, the substantial variable range of capacitance in a communication system or the like is narrower.

More specifically, now, there is considered a case where, for example, a variable capacitance element having a capacitance variation among variable capacitance elements of ±10% (1 C±0.1 C) is applied to a communication system or the like. Furthermore, there is considered the case of using a variable capacitance element which is such that, when a control voltage Vc of 3V is applied to the variable capacitance element, the capacitance of the variable capacitance element decreases by 30%.

In this case, for example, in a variable capacitance element having a desired capacitance (an amount of capacitance variation of 0%: capacitance=1.0 C), when a control voltage Vc is made to vary between 0 V and 3 V, the variable range in capacitance of the variable capacitance element becomes 1.0 C to 0.7 C (ΔC=0.3 C). Furthermore, for example, in a variable capacitance element having a capacitance higher by 10% than the desired capacitance, (an amount of capacitance variation of +10%: the capacitance=1.1 C), when a control voltage Vc is made to vary between 0 V to 3 V, the variable range in capacitance of the variable capacitance element becomes 1.1 C to 0.77 C. Furthermore, for example, in a variable capacitance element having a capacitance lower by 10% than the desired capacitance, (an amount of capacitance variation of −10%: the capacitance=0.9 C), when a control voltage Vc is made to vary between 0 V to 3 V, the variable range in capacitance of the variable capacitance element becomes 0.9 C to 0.63 C.

Therefore, in the case where the above-mentioned variable capacitance element having a capacitance variation among variable capacitance elements of ±10% is applied to a communication system or the like, a variable range in capacitance actually available is a range in which the above-mentioned three variable ranges are overlapped. In other words, in the above-mentioned example, an available variable range in capacitance is 0.9 C to 0.77 C (ΔC=0.13 C), which is not more than half a variable capacitance range (ΔC=0.3 C) obtained when there is no amount of variation in capacitance. Therefore, a larger capacitance-variation among variable capacitance elements causes a narrower variable range in capacitance actually available, and hence, an advantage that a ferroelectric material having a high relative dielectric constant is employed as a material for forming a dielectric layer is not made full use of Therefore, to solve the above-mentioned problems, the present disclosure proposes a variable capacitance element having a configuration which, even if the variable capacitance element has a wider variation in capacitance among variable capacitance elements, allows said variation in capacitance to be reduced after the variable capacitance element is mounted on a communication system or the like.

[Configuration Outline of Variable Capacitance Element]

The outline of a variable capacitance element according to the present disclosure will be described with reference to FIGS. 1 (a) and (b), and FIGS. 2 (a) and (b). FIGS. 1 (a) and (b) are schematic block diagrams of variable capacitance elements according to the present disclosure, and FIGS. 2 (a) and (b) are schematic internal configuration diagrams of later-mentioned compensation units 4. Here, to simplify an explanation, examples of the later-mentioned compensation units 4 each comprising two compensation capacitor units will be described.

Variable capacitance elements 1 and 2 according to the present disclosure each comprise: a capacitor body unit 3 (an element body unit); and a compensation unit 4 configured to compensate the capacitance variation of the capacitor body unit 3. Furthermore, the variable capacitance elements 1 and 2 each comprise: an external terminal for signals 5 (a first external terminal for signals) connected to the capacitor body unit 3; and two external terminals for compensation 6 (external terminals for capacitance compensation).

In the series-connected type variable capacitance element 1 illustrated in FIG. 1 (a), the capacitor body unit 3 and the compensation unit 4 are serially connected via an internal terminal 7. Furthermore, when the series-connected type variable capacitance element 1 is mounted on a circuit board of an external system or the like, the external terminal for signals 5 is connected to one input terminal (AC1) for AC signals, and at least one of the two external terminals for compensation 6 is connected to another input terminal (AC2) for AC signals. In other words, in the series-connected type variable capacitance element 1, at least one of the two external terminals for compensation 6 is used also as an external terminal for signals (a second external terminal for signals).

On the other hand, in the parallel-connected type variable capacitance element 2 illustrated in FIG. 1 (b), the capacitor body unit 3 (an element body unit) and the compensation unit 4 are connected in parallel via an internal terminal 7. Furthermore, in the parallel-connected type variable capacitance element 2, one external terminal for compensation 6 (a second external terminal for signals) of the two external terminals for compensation 6 is connected to the capacitor body unit 3, meanwhile another external terminal for compensation 6 (an external terminal for capacitance compensation) is connected to the compensation unit 4. It should be noted that, when the parallel-connected type variable capacitance element 2 is mounted on a circuit board of an external system or the like, the external terminal for signals 5 is connected to one input terminal (AC1) for AC signals, meanwhile the external terminal for compensation 6 connected to the capacitor body unit 3 is connected to another input terminal (AC2) for AC signals. In other words, in the parallel-connected type variable capacitance element 2, at least, the one external terminal for compensation 6 connected to the capacitor body unit 3 is used also as an external terminal for signals.

Furthermore, each of the capacitor body unit 3 and the compensation unit 4 is configured to be a laminated type capacitor in which a plurality of dielectric layers are laminated with electrode layers sandwiched therebetween. In examples illustrated in FIGS. 2 (a) and (b), the compensation unit 4 is configured by laminating two capacitors. It should be noted that each of the dielectric layers may comprise one dielectric film, or may comprise a plurality of dielectric films laminated, depending on a method for producing the dielectric layers.

As illustrated in FIGS. 2 (a) and (b), the compensation unit 4 is configured to comprise a first compensation capacitor unit 8 and a second compensation capacitor unit 9, and these two compensation capacitor units are configured to be connected serially or in parallel. It should be noted that the first compensation capacitor unit 8 and the second compensation capacitor unit 9 are connected by internal wiring.

[Outline of Method for Compensating Capacitance Variation]

In the present disclosure, after the variable capacitance elements 1, 2 having the above-mentioned respective configurations each are mounted on a circuit board of an external system or the like, the capacitances of the variable capacitance elements 1, 2 each are adjusted in the following way so as to be a capacitance within a desired range. First, the variable capacitance elements 1, 2 each are mounted on a circuit board of an external system, and, in this state (a state with a control voltage of 0 V), the capacitance of each of the external terminals for compensation 6 is measured.

Next, based on measurement results of the capacitance of each of the external terminals for compensation 6, a connection state between a plurality of the external terminals for compensation 6 is changed on the mounting board so that the capacitances of the variable capacitance elements 1, 2 each are adjusted to be a capacitance within a desired range. Specifically, in the case where, at the time of the mounting, a plurality of the external terminals for compensation 6 is connected through external wiring of the mounting board, a wiring pattern of the external wiring is cut, whereby the capacitances of the variable capacitance elements 1, 2 each are adjusted. In the case where, at the time of the mounting, a plurality of the external terminals for compensation 6 is not connected to each other, predetermined two of the external terminals for compensation 6 are connected by external wiring, whereby the capacitances of the variable capacitance elements 1, 2 each are adjusted.

The above-mentioned cutting and connecting of external wiring on a mounting board can be performed using well-known methods. A method for changing a connection state between a plurality of external terminals for compensation 6 will be described in detail in the following various embodiments.

The use of the variable capacitance elements 1, 2 having the above-mentioned respective configurations allows the capacitances of the variable capacitance elements 1, 2 each to be easily adjusted to a capacitance within a predetermined range only by changing an electrical connection state between a plurality of the external terminals for compensation 6 on a substrate after mounting of the variable capacitance elements 1, 2. In other words, according to the present disclosure, even if the variable capacitance elements 1, 2 each have a wider variation in capacitance before mounted, the capacitance variations of the variable capacitance elements 1, 2 can be reduced after the variable capacitance elements each are mounted. Therefore, the variable capacitance elements 1, 2 according to the present disclosure can solve the problem caused by the capacitance variation, whereby an advantage that a ferroelectric material having a high relative dielectric constant is employed can be made full use of.

<2. First Embodiment: First Configuration Example Of Series-connected Type Variable Capacitance Element>

In the first embodiment, there will be described configuration examples of a variable capacitance element and a packaged circuit including the variable capacitance element, wherein the variable capacitance element has a configuration being such that a capacitor body unit and a compensation unit are serially connected and a plurality of compensation capacitor units in the compensation unit is connected in parallel.

[Configuration of Variable Capacitance Element]

First, the configuration of the variable capacitance element according to the first embodiment will be described with reference to FIG. 3. FIG. 3 is a schematic diagram of the variable capacitance element according to the first embodiment.

A variable capacitance element 10 of the first embodiment comprises a capacitor body unit 11 (an element body unit) and a compensation unit 12 serially connected to said capacitor body unit 11. The variable capacitance element 10 further comprises an external terminal for signals 13 (a first external terminal for signals), four first external terminals for control 14 (external terminals for control), and four second external terminals for control 15 (external terminals for control). The variable capacitance element 10 further comprises three external terminals for compensation (hereinafter, referred to as a first external terminal for compensation 16 to a third external terminal for compensation 18: external terminals for capacitance compensation and a second external terminal for signals).

The capacitor body unit 11 comprises eight variable-capacitance capacitor units (hereinafter, respectively referred to as a first variable-capacitance capacitor unit C1 to an eighth variable-capacitance capacitor unit C8: a first variable capacitor unit). In the present embodiment, the first variable-capacitance capacitor unit C1 to the eighth variable-capacitance capacitor unit C8 are serially connected. Furthermore, an end portion, on the side of the first variable-capacitance capacitor unit C1, of a series circuit composed of the eight variable-capacitance capacitor units is connected to the external terminal for signals 13, meanwhile an end portion, on the side of the eight variable-capacitance capacitor unit C8, of said series circuit is connected to the compensation unit 12.

Each of a connection point between the second variable-capacitance capacitor unit C2 and the third variable-capacitance capacitor unit C3 and a connection point between the fourth variable-capacitance capacitor unit C4 and the fifth variable-capacitance capacitor unit C5 is connected to a corresponding one of the first external terminals for control 14. Furthermore, each of a connection point between the sixth variable-capacitance capacitor unit C6 and the seventh variable-capacitance capacitor unit C7 and a connection point between the eighth variable-capacitance capacitor unit C8 and the compensation unit 12 is also connected to a corresponding one of the first external terminals for control 14.

Each of a connection point between the first variable-capacitance capacitor unit C1 and the second variable-capacitance capacitor unit C2 and a connection point between the third variable-capacitance capacitor unit C3 and the fourth variable-capacitance capacitor unit C4 is connected to a corresponding one of the second external terminals for control 15. Furthermore, each of a connection point between the fifth variable-capacitance capacitor unit C5 and the sixth variable-capacitance capacitor unit C6 and a connection point between the seventh variable-capacitance capacitor unit C7 and the eighth variable-capacitance capacitor unit C8 is also connected to a corresponding one of the second external terminals for control 15.

Figure 4:
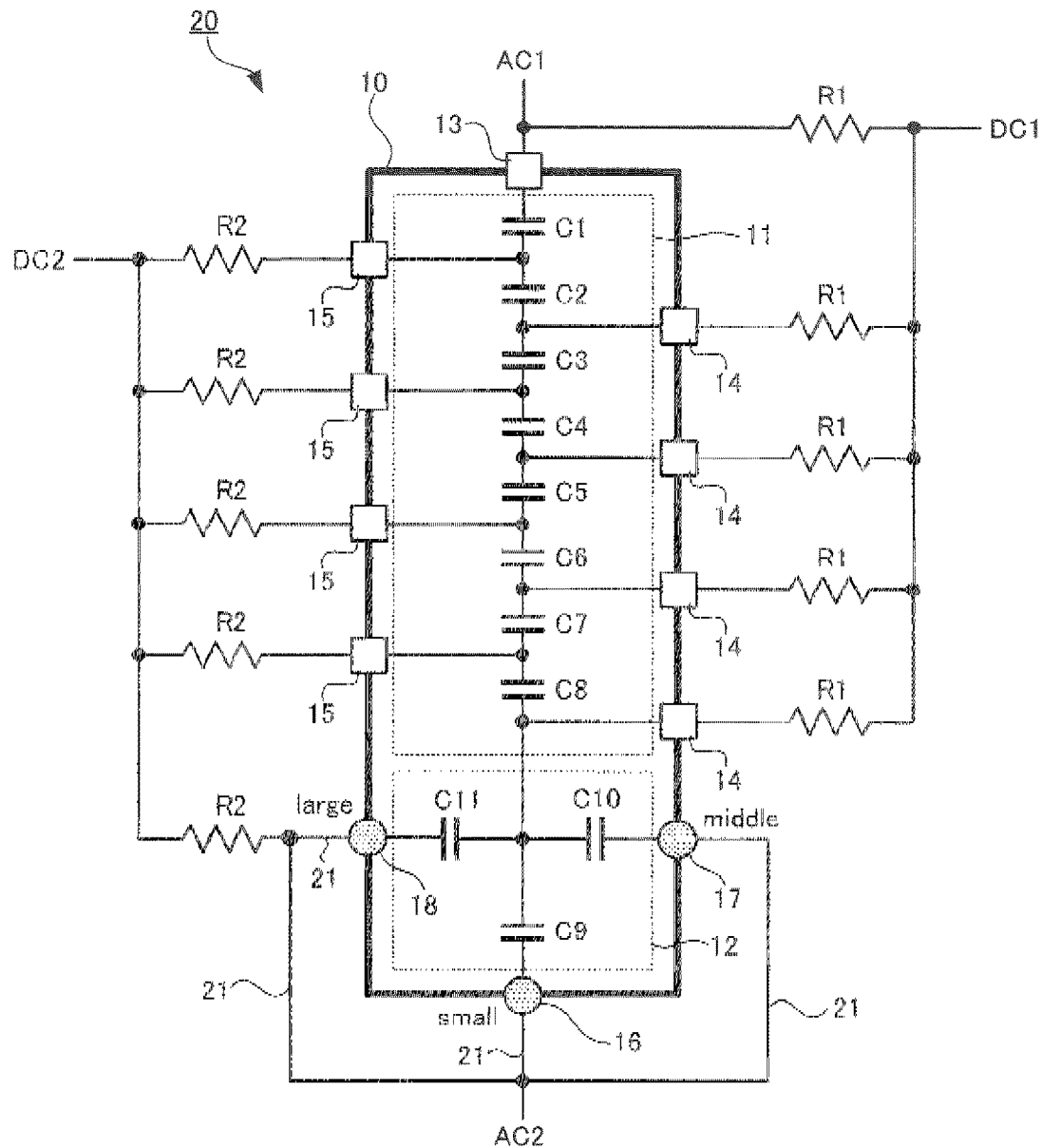
FIG. 4 is a schematic diagram of a packaged circuit on which the variable capacitance element according to the first embodiment is mounted.

It should be noted that the connections between the plurality of the variable-capacitance capacitor units and the connections between each of the variable-capacitance capacitor units and a corresponding one of the external terminals are performed by internal wiring. Furthermore, as illustrated in FIG. 4 later mentioned, when mounted on a circuit board of an external system or the like, each of the first external terminals for control 14 is connected to one output terminal (DC1) of a power supply for control voltage via a bias resistance. Furthermore, each of the second external terminals for control 15 is connected to another output terminal (DC2) of the power supply for control voltage via a bias resistance.

Although not illustrated in FIG. 3, the first variable-capacitance capacitor unit C1 to the eighth variable-capacitance capacitor unit C8 are configured as a laminated capacitor in which the eight dielectric layers (a first dielectric layer) are laminated with electrode layers sandwiched therebetween. It should be noted that the dielectric layer constituting each of the variable-capacitance capacitor units is formed of a ferroelectric material having a high relative dielectric constant, and the capacitance thereof varies with a control voltage Vc (a control voltage signal) applied between a corresponding one of the first external terminals for control 14 and a corresponding one of the second external terminals for control 15. Specifically, the application of a control voltage Vc causes a decrease in the capacitance of each of the variable-capacitance capacitor units. Furthermore, depending on a method for producing the dielectric layer constituting each of the variable-capacitance capacitor units, the dielectric layer may comprise one dielectric film, or may comprise a plurality of dielectric films laminated.

The compensation unit 12 comprises three variable-capacitance capacitors for compensation (hereinafter, respectively referred to a first compensation capacitor unit C9 to a third compensation capacitor unit C11: a second variable capacitor unit). It should be noted that, in the present embodiment, the first compensation capacitor unit C9 to the third compensation capacitor unit C11 are connected in parallel.

A connection point (a parallel connection point) among the first compensation capacitor unit C9 to the third compensation capacitor unit C11 is connected to the eighth variable-capacitance capacitor unit C8 of the capacitor body unit 11 (an end portion, on the side of the eighth variable-capacitance capacitor unit C8, of a series circuit comprising the eight variable-capacitance capacitor units). Furthermore, an end portion, on a side opposite to the side of the parallel connection point, of the first compensation capacitor unit C9 is connected to the first external terminal for compensation 16. An end portion, on a side opposite to the side of the parallel connection point, of the second compensation capacitor unit C10 is connected to the second external terminal for compensation 17. An end portion, on a side opposite to the side of the parallel connection point, of the third compensation capacitor unit C11 is connected to the third external terminal for compensation 18.

As mentioned later, in the present embodiment, when the variable capacitance element 10 is mounted on an external circuit board or the like, the external terminal for signals 13 is connected to one input terminal (AC1) for AC signals, meanwhile, at least, the first external terminal for compensation 16 is connected to another input terminal (AC2) for AC signals. Thus, the first external terminal for compensation 16 acts also as an external terminal for signals (a second external terminal for signals).

Although not illustrated in FIG. 3, the first compensation capacitor unit C9 to the third compensation capacitor unit C11 are configured as a laminated capacitor in which three dielectric layers (a second dielectric layer) are laminated with electrode layers sandwiched therebetween. As is the case with the above-mentioned variable-capacitance capacitor units, the dielectric layer constituting each of the compensation capacitor units is formed of a ferroelectric material having a high relative dielectric constant, and the capacitance thereof varies with a control voltage Vc (a control voltage signal) applied. Specifically, the application of a control voltage Vc causes a decrease in the capacitance of each of the compensation capacitor units. Furthermore, depending on a method for producing the dielectric layer constituting each of the compensation capacitor units, the dielectric layer may comprise one dielectric film, or may comprise a plurality of dielectric films laminated.

It should be noted that, in the present embodiment, the dielectric layer constituting each of the variable-capacitance capacitor units inside the capacitor body unit 11 and the dielectric layer constituting each of the compensation capacitor units inside the compensation unit 12 are formed of the same ferroelectric material. Furthermore, in the present embodiment, all the electrode layers each provided between two dielectric layers adjoining each other in a lamination direction are also formed of the same material.

In the present embodiment, the variable capacitance element 10 is configured by laminating the first variable-capacitance capacitor unit C1 to the eighth variable-capacitance capacitor unit C8 and the first compensation capacitor unit C9 to the third compensation capacitor unit C11. Furthermore, in the present embodiment, the first variable-capacitance capacitor unit C1 to the eighth variable-capacitance capacitor unit C8 have the same capacitance, and the first compensation capacitor unit C9 to the third compensation capacitor unit C11 have the same capacitance. It should be noted that the capacitance of each of the first compensation capacitor unit C9 to the third compensation capacitor unit C11 is made smaller than the capacitance of each of the first variable-capacitance capacitor unit C1 to the eighth variable-capacitance capacitor unit C8, for example, is made approximately one-half of the capacitance thereof

[Configuration Example of Packaged Circuit]

Next, the configuration of a packaged circuit according to the present embodiment will be described with reference to FIG. 4. FIG. 4 is a schematic diagram of a packaged circuit in which the variable capacitance element 10 according to the first embodiment illustrated in FIG. 3 is mounted on a circuit board of an external system or the like. It should be noted that, to simplify an explanation, FIG. 4 illustrates only a circuit portion of the packaged circuit connected to each of the external terminals of the variable capacitance element 10.

A packaged circuit 20 comprises: the variable capacitance element 10; and external wiring 21 configured to electrically connect the first external terminal for compensation 16 to the third external terminal for compensation 18 of the variable capacitance element 10 to each other. The packaged circuit 20 further comprises five first bias resistances R1 and five second bias resistances R2.

In the configuration example of the packaged circuit of the present embodiment, when the variable capacitance element 10 is mounted on the packaged circuit 20, the external terminal for signals 13 is connected to one AC-signal terminal (AC1) and a corresponding one of the first bias resistances R1. In the present embodiment, all the external terminals for compensation in the variable capacitance element 10 are connected to another AC-signal terminal (AC2) and a corresponding one of the second bias resistances R2 via external wiring 21.

Furthermore, in the present embodiment, each of the first bias resistances R1 is provided between a corresponding one of the external terminals of the variable capacitance element 10 (the external terminal for signals 13 or the first external terminal for control 14) and one output terminal (DC1) of a power supply for control voltage. Each of the second bias resistances R2 is provided between a corresponding one of the external terminals of the variable capacitance element 10 (any of the second external terminal for control 15 and the first external terminal for compensation 16 to the third external terminal for compensation 18) and another output terminal (DC2) of the power supply for control voltage.

Each of the bias resistances is a resistance provided to control interference between an AC signal inputted between the AC terminals of the variable capacitance element 10 (between AC1 and AC2 in FIG. 4) and a control voltage signal applied between the DC terminals of the variable capacitance element 10 (between DC1 and DC2 in FIG. 4). Hence, each of the bias resistances comprises a resistance element having a high resistance, such as 100 kΩ.

[Relationship Between a Connection State of the Compensation Unit and an Amount of Change in Capacitance]

Next, there will be specifically described a relationship between a connection state between the first external terminal for compensation 16 to the third external terminal for compensation 18 (a connection state in the compensation unit 12) and the capacitance of the whole of the variable capacitance element 10. Here, in the variable capacitance element 10 of the present embodiment, each capacitance of the first variable-capacitance capacitor unit C1 to the eighth variable-capacitance capacitor unit C8 is taken as "9 C", and each capacitance of the first compensation capacitor unit C9 to the third compensation capacitor unit C11 is taken as "4.5 C". Furthermore, the capacitance of the variable capacitance element 10 is assumed to vary within a range of −10% to +10%.

It should be noted that, here, as illustrated in FIG. 4, a state in which each of the first external terminal for compensation 16 to the third external terminal for compensation 18 is connected to the other AC signal terminal (AC2) and a corresponding one of the second bias resistances R2 via the external wiring 21 is called a "large-capacitance connection state." Furthermore, a state (refer to the later-mentioned FIG. 6 (a)) in which each of the first external terminal for compensation 16 and the second external terminal for compensation 17 is connected to the other AC signal terminal (AC2) and a corresponding one of the second bias resistances R2 via the external wiring 21 is called a "middle-capacitance connection state". Furthermore, a state (refer to the later-mentioned FIG. 6 (b)) in which only the first external terminal for compensation 16 is connected to the other AC signal terminal (AC2) and a corresponding one of the second bias resistances R2 via the external wiring 21 is called a "small-capacitance connection state".

In the large-capacitance connection state (a state in which all of the first compensation capacitor unit C9 to the third compensation capacitor unit C11 contribute to compensation), taking the above-mentioned amount of variation into consideration, the capacitance of the variable capacitance element 10 is in a range of 0.93 C to 1.14 C. It should be noted that, in the large-capacitance connection state, when the amount of variation is 0%, the capacitance of the variable capacitance element 10 is 1.04 C.

In the middle-capacitance connection state (a state in which the first compensation capacitor unit C9 and the second compensation capacitor unit C10 contribute to compensation), taking the above-mentioned amount of variation into consideration, the capacitance of the variable capacitance element 10 is in a range of 0.90 C to 1.10 C. It should be noted that, in the middle-capacitance connection state, when the amount of variation is 0%, the capacitance of the variable capacitance element 10 is 1.00 C.

Furthermore, in the small-capacitance connection state (a state in which only the first compensation capacitor unit C9 contributes to compensation), taking the above-mentioned amount of variation into consideration, the capacitance of the variable capacitance element 10 is in a range of 0.81 C to 0.99 C. It should be noted that, in the small-capacitance connection state, when the amount of variation is 0%, the capacitance of the variable capacitance element 10 is 0.90 C.

Here, the following Table 1 collectively shows the above-mentioned relationships between a connection state of the compensation unit 12 and a change in the capacitance of the variable capacitance element 10 of the present embodiment.

TABLE 1

| Variation amount | −10% | 0% | +10% |
|---|---|---|---|
| Small-capacitance connection | 0.81 C | 0.90 C | 0.99 C |
| Middle-capacitance connection | 0.90 C | 1.00 C | 1.10 C |
| Large-capacitance connection | 0.93 C | 1.04 C | 1.14 C |

Figure 5:
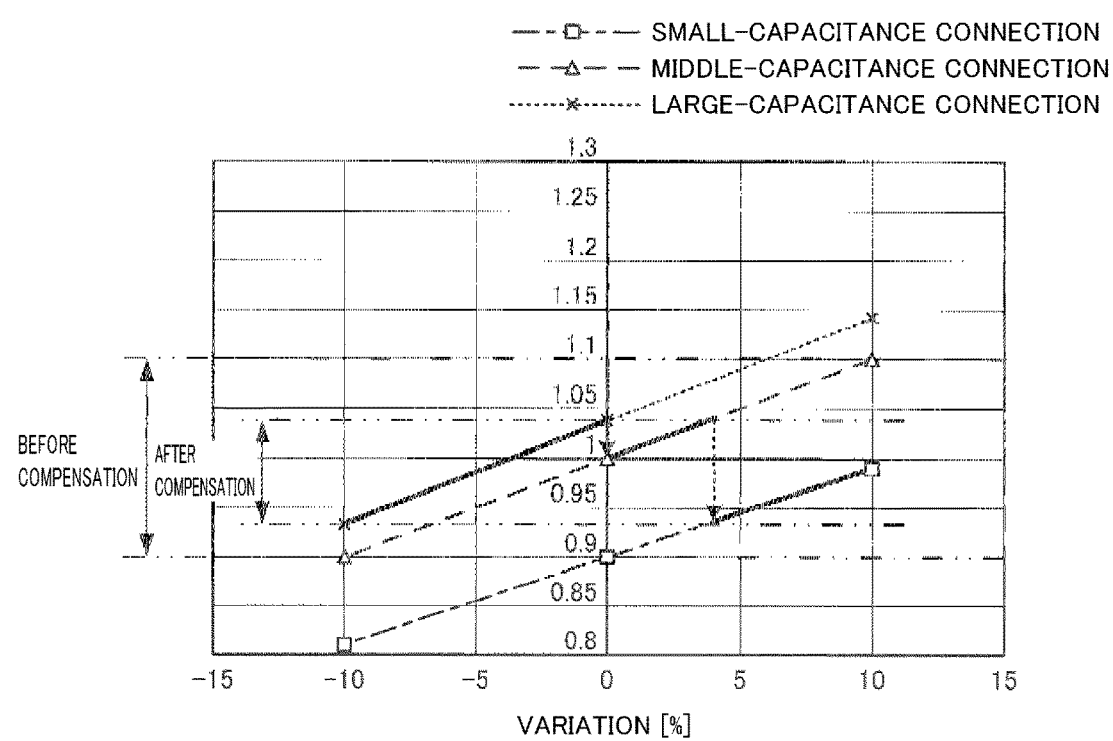
FIG. 5 illustrates a relationship between a connection state of a compensation unit and a capacitance variation characteristic with respect to an amount of variation, in the variable capacitance element of the first embodiment.

Furthermore, FIG. 5 shows a graph charting the relationships, shown in the above-mentioned Table 1, between a connection state of the compensation unit 12 and a change in the capacitance with respect to the amount of variation. It should be noted that, in FIG. 5 showing a characteristic, the horizontal axis represents the amount of variation in capacitance of the variable capacitance element 10, and the vertical axis represents a capacitance value (relative value) of the variable capacitance element 10. Furthermore, a characteristic indicated by a dot-and-dash line in FIG. 5 (a characteristic indicated by a hollow square mark) represents a characteristic of capacitance variation at the time when the compensation unit 12 is in a small-capacitance connection state. A characteristic indicated by a dashed line in FIG. 5 (a characteristic indicated by a hollow triangle mark) represents a characteristic of capacitance variation at the time when the compensation unit 12 is in a middle-capacitance connection state. A characteristic indicated by a dotted line in FIG. 5 (a characteristic indicated by a mark X) represents a characteristic of capacitance variation at the time when the compensation unit 12 is in a large-capacitance connection state. It should be noted that a bold solid line and a dotted line arrow in FIG. 5 indicate a later-mentioned first compensation for capacitance variation.

[First Compensation for Capacitance Variation]

Next, first compensation for capacitance variation of the variable capacitance element 10 in the packaged circuit 20 will be described with reference to FIGS. 4, 5, and 6 (a) and (b). It should be noted that FIGS. 6 (a) and (b) illustrate a process of changing a connection state of the compensation unit 12 in the first compensation for capacitance variation.

In the first compensation, a necessary range of capacitance variation of the variable capacitance element 10 is determined in advance in consideration of, for example, the use. Here, there will be described an example in which a compensation is performed so that the capacitance of the variable capacitance element 10 after the compensation is within a range of not less than 0.93 C and less than 1.04 C.

In the present embodiment, when the variable capacitance element 10 is mounted on the packaged circuit 20, as illustrated in FIG. 4, there is brought about a state in which each of the first external terminal for compensation 16 to the third external terminal for compensation 18 is connected to the other AC signal terminal (AC2) and a corresponding one of the second bias resistances R2 via the external wiring 21. In other words, when the variable capacitance element 10 is mounted on the packaged circuit 20, the compensation unit 12 is brought into a large-capacitance connection state. Therefore, in the packaged circuit 20 illustrated in FIG. 4, compensation for capacitance variation of the variable capacitance element 10 is started with a large-capacitance connection state.

First, in the large-capacitance connection state as illustrated in FIG. 4, the capacitance of the variable capacitance element 10 is measured. Specifically, the capacitance of any of the first external terminal for compensation 16 to the third external terminal for compensation 18 is measured. Next, when the measured capacitance is in a range of not less than 0.93 C and less than 1.04 C, in other words, when the measured capacitance is in a range indicated by a bold solid line in the characteristic indicated by the dotted line in FIG. 5, the compensation is terminated.

On the other hand, when the capacitance measured in the large-capacitance connection state is not in a range of not less than 0.93 C and less than 1.04 C, the connection state of the compensation unit 12 is changed to a middle-capacitance connection state. Specifically, as illustrated in FIG. 6 (a), the pattern of the external wiring 21 is cut at a point at which the third external terminal for compensation 18 is connected to a corresponding one of the second bias resistances R2 and the other AC signal terminal (AC2).

Figure 6A:
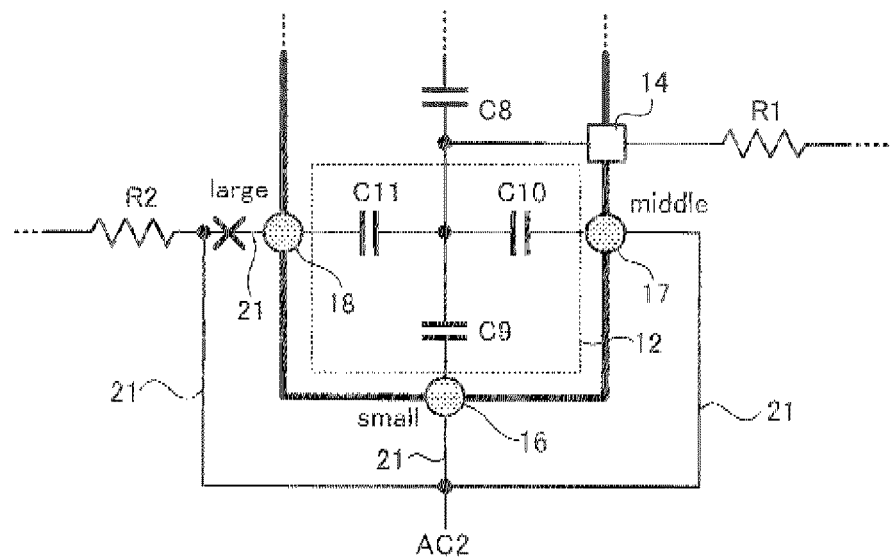
FIG. 6 describes compensation (first compensation) for capacitance variation in the variable capacitance element of the first embodiment.
Figure 6B:
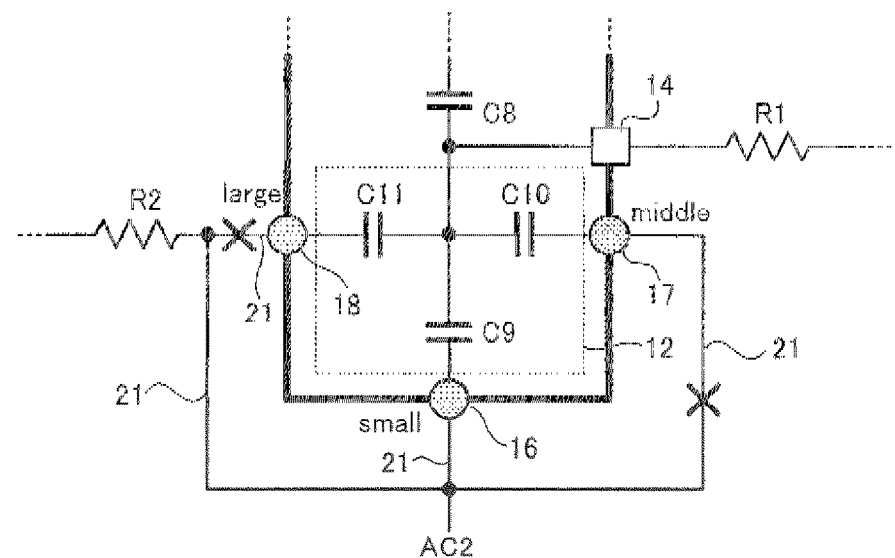

Next, measured is the capacitance of the variable capacitance element 10 at the time when the compensation unit 12 is in a middle-capacitance connection state as illustrated in FIG. 6 (a). Specifically, the capacitance of the first external terminal for compensation 16 or the second external terminal for compensation 17 is measured. Then, when the measured capacitance is in a range of not less than 0.93 C and less than 1.04 C, in other words, when the measured capacitance is in a range indicated by a bold solid line in the characteristic indicated by the dashed line in FIG. 5, the compensation is terminated.

On the other hand, when the capacitance measured in the middle-capacitance connection state is not in a range of not less than 0.93 C and less than 1.04 C, the connection state of the compensation unit 12 is changed to a small-capacitance connection state. Specifically, as illustrated in FIG. 6 (b), there is cut the pattern of the external wiring 21 is cut at a point at which the second external terminal for compensation 17 is connected to a corresponding one of the second bias resistances R2 and the other AC signal terminal (AC2).

Next, measured is the capacitance of the variable capacitance element 10 at the time when the compensation unit 12 is in a small-capacitance connection state as illustrated in FIG. 6 (*b*). Specifically, the capacitance of the first external terminal for compensation 16 is measured. Then, when the measured capacitance is in a range of not less than 0.93 C and less than 1.04 C, in other words, when the measured capacitance is in a range indicated by a bold solid line in the characteristic indicated by the dot-and-dash line in FIG. 5, the compensation is terminated. On the other hand, when the capacitance measured in the small-capacitance connection state is not in a range of not less than 0.93 C and less than 1.04 C, the variable capacitance element 10 having undergone the compensation is disposed of as a defective product.

In the packaged circuit 20 of the present embodiment, the capacitance variation of the variable capacitance element 10 is thus compensated. In the above-mentioned packaged circuit 20, the capacitance variation of the variable capacitance element 10 can be reduced from ±10% to from +4% to −7% after the mounting of the variable capacitance element 10.

[Various Effects]

As mentioned above, in the packaged circuit 20 of the present embodiment, the capacitance variation of the variable capacitance element 10 can be reduced after the variable capacitance element 10 is mounted. Consequently, the present embodiment can solve the above-mentioned problem which arises after the variable capacitance element 10 is mounted on an external system or the like (a problem that, due to a capacitance variation, a variable range of capacitance actually available is made smaller).

Furthermore, the present embodiment allows the capacitance of the variable capacitance element 10 to be adjusted to be within a desired capacitance range after the variable capacitance element 10 is mounted, whereby the scope of application of the variable capacitance element 10 can be further extended. Furthermore, by changing a connection state between a plurality of external terminals for compensation (a connection state in the compensation unit 12) after the mounting of the variable capacitance element 10 of the present embodiment, a plural kinds of variable capacitance elements each having a different capacitance can be obtained. Therefore, the present embodiment can achieve a smaller lineup of the variable capacitance element 10, thereby enabling a reduction in costs for manufacturing a variable capacitance element.

Furthermore, the present embodiment allows the capacitance of the variable capacitance element 10 to be easily adjusted not only at the time of pre-shipment, but also at the time of post-shipment maintenance or the like of a system or the like on which the variable capacitance element 10 is mounted. Therefore, even if the capacitance of the variable capacitance element 10 changes due to a change with passage of time and the like, the present embodiment enables the capacitance thereof to be easily readjusted to be within a desired capacitance range.

Furthermore, the present embodiment allows a capacitance variation to be compensated only by changing a connection state between a plurality of the external terminals for compensation of the variable capacitance element 10 externally (on a packaged circuit), whereby a higher degree of flexibility in the design of the variable capacitance element 10 and the packaged circuit 20 can be achieved.

Furthermore, in the variable capacitance element 10 of the present embodiment, as mentioned above, the compensation unit 12 can be configured in the same manner as the capacitor body unit 11, and therefore, the variable capacitance element 10 can be produced by the same manufacturing process as that for a conventional layered-type variable-capacitance capacitor. In other words, the present embodiment allows the variable capacitance element 10 to be produced without greatly changing the conventional manufacturing process, whereby the variable capacitance element 10 can be produced at lower cost.

MODIFIED EXAMPLE 1

In the above-mentioned first embodiment, there was described an example in which, when the variable capacitance element 10 is mounted on the packaged circuit 20, the first external terminals for compensation 16 to the third external terminals for compensation 18 are connected to each other via the external wiring 21 (a large-capacitance connection state), but, the present disclosure is not limited to this embodiment. There may be employed a configuration of a packaged circuit, the configuration being such that, when the variable capacitance element 10 is mounted on the packaged circuit, the first external terminal for compensation 16 to the third external terminal for compensation 18 are not connected to each other via the external wiring 21. In Modified Example 1, an example of such configuration will be described.

(1) Configuration of Packaged Circuit

Figure 7:
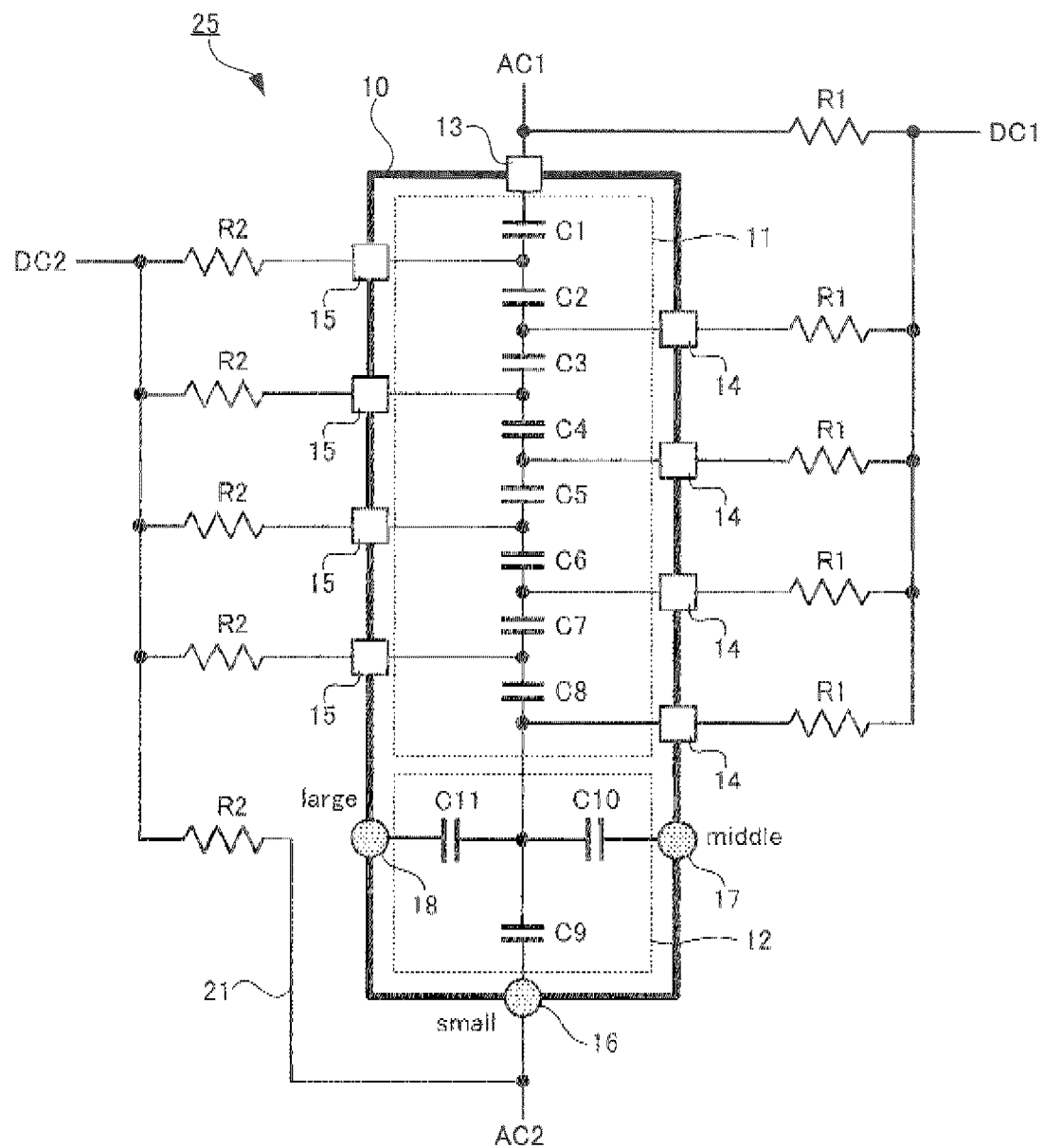
FIG. 7 is a schematic diagram of a packaged circuit on which a variable capacitance element of Modified Example 1 is mounted.

FIG. 7 illustrates a schematic configuration of a packaged circuit of Modified Example 1 in which the variable capacitance element 10 according to the first embodiment illustrated in FIG. 3 is mounted on a circuit board of an external system or the like. It should be noted that, to simplify an explanation, FIG. 7 illustrates only a circuit portion of the packaged circuit, the circuit portion being connected to each of the external terminals of the variable capacitance element 10. Furthermore, in a packaged circuit 25 illustrated in FIG. 7, the same reference signs are given to the same configuration components as those in the packaged circuit 20 of the above-mentioned first embodiment illustrated in FIG. 4.

As is clear from a comparison between FIG. 7 and FIG. 4, the packaged circuit 25 in this Modified Example has a configuration which is obtained in such a manner that, in the packaged circuit 20 of the above-mentioned first embodiment, the connection state of the external wiring 21 at the time of the mounting of the variable capacitance element 10 is changed. Specifically, in this Modified Example, at the time of the mounting, only the first external terminals for compensation 16 of the variable capacitance element 10 is connected to the other AC signal terminal (AC2) and a corresponding one of the second bias resistances R2 via the external wiring 21. In other words, in this Modified Example, when the variable capacitance element 10 is mounted on the packaged circuit 25, the compensation unit 12 is in a small-capacitance connection state. It should be noted that this Modified Example has the same configuration as that of the above-mentioned first embodiment, except that the connection state of the external wiring 21.

Figure 8:
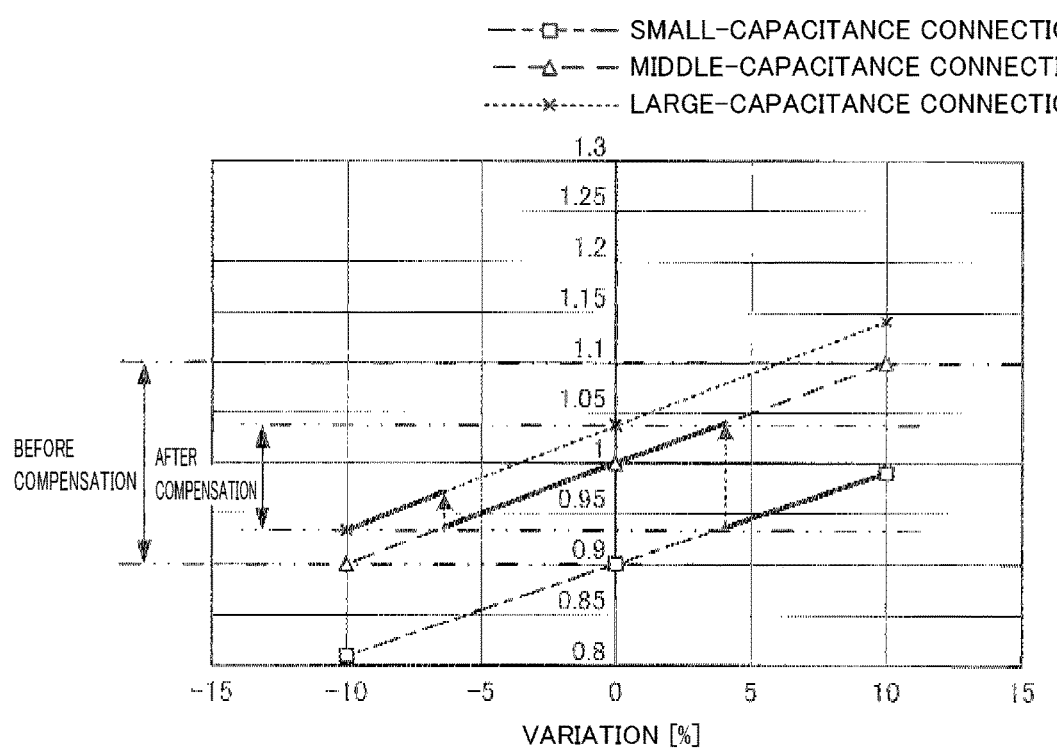
FIG. 8 illustrates a relationship between a connection state of a compensation unit and a capacitance variation characteristic with respect to an amount of variation, in the variable capacitance element of Modified Example 1.

The relationship between a connection state of the compensation unit 12 and a change in capacitance in the variable capacitance element 10 inside the packaged circuit 25 is the same as the relationship shown in the above-mentioned Table 1. In other words, in Modified Example 1, the relationship between a connection state of the compensation unit 12 and a change in capacitance with respect to the amount of variation is the same as the relationship in the above-mentioned first embodiment, and FIG. 8 shows the relationship in Modified Example 1. It should be noted that, in FIG. 8 showing a characteristic, the horizontal axis represents the amount of capacitance variation of the variable capacitance element 10, and the vertical axis represents a capacitance value (relative value) of the variable capacitance element 10. Furthermore, a characteristic indicated by a dot-and-dash line in FIG. 8 (a characteristic indicated by a hollow square mark) represents a characteristic of capacitance variation at the time when the compensation unit 12 is in a small-capacitance connection state. A characteristic indicated by a dashed line in FIG. 8 (a characteristic indicated by a hollow triangle mark) represents a characteristic of capacitance variation at the time when the compensation unit 12 is in a middle-capacitance connection state. A characteristic indicated by a dotted line in FIG. 8 (a characteristic indicated by a mark X) represents a characteristic of capacitance variation at the time when the compensation unit 12 is in a large-capacitance connection state. It should be noted that a bold solid line and a dotted line arrow in FIG. 8 indicate a later-mentioned second compensation for capacitance variation.

(2) Second Compensation for Capacitance Variation

Next, compensation (second compensation) for capacitance variation of the variable capacitance element 10 in the packaged circuit 25 will be described with reference to FIGS. 7, 8, and 9 (*a*) and (*b*). It should be noted that FIGS. 9 (*a*) and (*b*) illustrate a process of changing a connection state of the compensation unit 12 in the second compensation for capacitance variation.

As in the case of the above-mentioned first embodiment (the first compensation), in the second compensation, a necessary range of capacitance variation of the variable capacitance element 10 is determined in advance in consideration of, for example, the use. Here, there will be described an example in which compensation is performed in the same manner as in the above-mentioned first compensation so that the capacitance of the variable capacitance element 10 after the compensation is in a range of not less than 0.93 C and less than 1.04 C.

In the packaged circuit 25 illustrated in FIG. 7, as mentioned above, when the variable capacitance element 10 is mounted on the packaged circuit 25, the compensation unit 12 is brought into a small-capacitance connection state. Therefore, in the packaged circuit 25 illustrated in FIG. 7, compensation for capacitance variation of the variable capacitance element 10 is started with a small-capacitance connection state.

First, measured is the capacitance of the variable capacitance element 10 at the time when the compensation unit 12 is in a small-capacitance connection state as illustrated in FIG. 7. Specifically, the capacitance of the first external terminal for compensation 16 is measured. Next, when the measured capacitance is in a range of not less than 0.93 C and less than 1.04 C, in other words, when the measured capacitance is in a range indicated by a bold solid line in the characteristic indicated by the dot-and-dash line in FIG. 8, the compensation is terminated.

On the other hand, when the capacitance measured in the small-capacitance connection state is not in a range of not less than 0.93 C and less than 1.04 C, the connection state of the compensation unit 12 is changed to a middle-capacitance connection state by changing the pattern of the external wiring 21. Specifically, as illustrated in FIG. 9 (*a*), the second external terminal for compensation 17 is electrically connected (pattern connecting) to a corresponding one of the second bias resistances R2 and the other AC signal terminal (AC2) by, for example, soldering or a short circuit resistance.

Figure 9A:
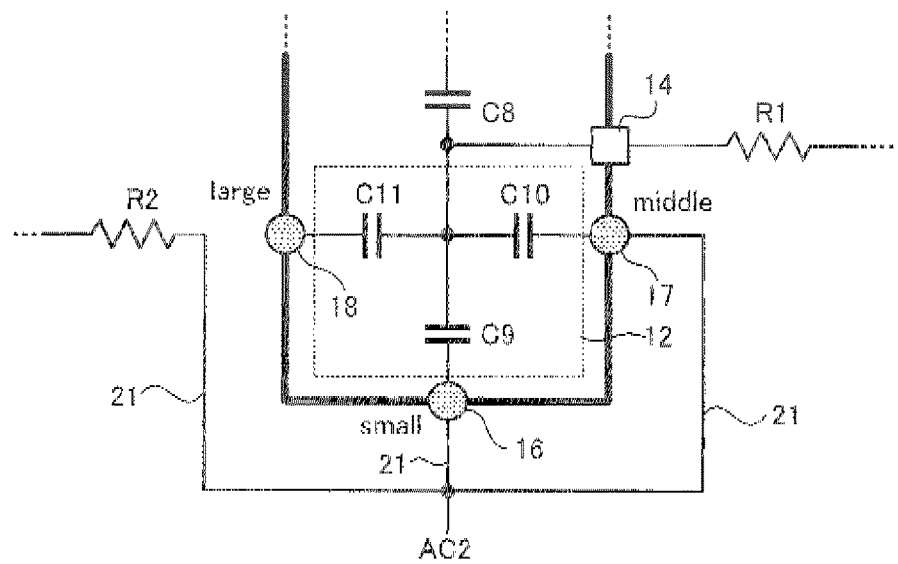
FIG. 9 describes compensation (second compensation) for capacitance variation in the variable capacitance element of Modified Example 1.
Figure 9B:
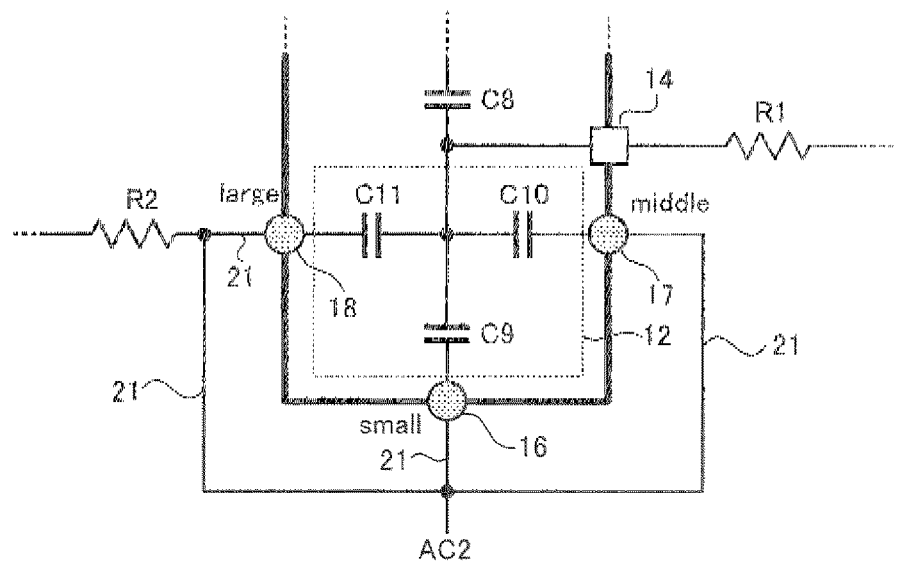

Next, measured is the capacitance of the variable capacitance element 10 at the time when the compensation unit 12 is in a middle-capacitance connection state as illustrated in FIG. 9 (*a*). Specifically, the capacitance of the first external terminal for compensation 16 or the second external terminal for compensation 17 is measured. Then, when the measured capacitance is in a range of not less than 0.93 C and less than 1.04 C, in other words, when the measured capacitance is in a range indicated by a bold solid line in the characteristic indicated by the dashed line in FIG. 8, the compensation is terminated.

On the other hand, when the capacitance measured in the middle-capacitance connection state is not in a range of not less than 0.93 C and less than 1.04 C, the pattern of the external wiring 21 is changed again, whereby the connection state of the compensation unit 12 is changed to a large-capacitance connection state. Specifically, as illustrated in FIG. 9 (*b*), additionally, the third external terminal for compensation 18 is electrically connected to a corresponding one of the second bias resistances R2 and the other AC signal terminal (AC2).

Next, measured is the capacitance of the variable capacitance element 10 at the time when the compensation unit 12 is in a large-capacitance connection state as illustrated in FIG. 9 (*b*). Specifically, the capacitance of any of the first external terminal for compensation 16 to the third external terminal for compensation 18 is measured. Then, when the measured capacitance is in a range of not less than 0.93 C and less than 1.04 C, in other words, when the measured capacitance is in a range indicated by a bold solid line in the characteristic indicated by the dotted line in FIG. 8, the compensation is terminated. On the other hand, when the capacitance measured in the large-capacitance connection state is not in a range of not less than 0.93 C and less than 1.04 C, the variable capacitance element 10 having undergone the compensation is disposed of as a defective product.

In this Modified Example, the capacitance variation of the variable capacitance element 10 is thus compensated. In the packaged circuit 25, as is the case with the above-mentioned first embodiment, the capacitance variation of the variable capacitance element 10 can be reduced from ±10% to from +4% to −7% after the mounting of the variable capacitance element 10.

As mentioned above, also in Modified Example 1, the capacitance variation (or the capacitance itself) of the variable capacitance element 10 can be compensated (adjusted) on the packaged circuit in the same manner as in the above-mentioned first embodiment. Therefore, also in this Modified Example, the same effects as those achieved in the above-mentioned first embodiment can be obtained.

It should be noted that the above-mentioned second compensation is a method of performing pattern connection of the external wiring 21, but, from the view point of cost, a method of cutting a pattern of the external wiring 21, like the above-mentioned first compensation (the compensation method in the above-mentioned first embodiment), is more advantageous.

MODIFIED EXAMPLE 2

There were described the examples in which, in the above-mentioned first compensation (FIG. 5) and second compensation (FIG. 8) for capacitance variation of the variable capacitance element 10, a connection state of the compensation unit 12 was changed to three states, namely, a large-capacitance, a middle-capacitance, and a small-capacitance connection state. That is, in the above-mentioned first compensation and second compensation, the capacitance of the variable capacitance element 10 was changed in three steps. However, the present disclosure is not limited to this. According to a necessary range of capacitance variation of the variable capacitance element 10, a connection state of the compensation unit 12 may be changed between two connection states selected from a large-capacitance, a middle-capacitance, and a small-capacitance connection state (the capacitance of the variable capacitance element 10 is changed in two steps) thereby to compensate a capacitance variation.

Here, as the example (Modified Example 2), there will be described a method (third compensation) of compensating a capacitance variation by changing a connection state of the compensation unit 12 between two connection states, namely, a middle-capacitance connection state and a small-capacitance connection state. Furthermore, there will be described an example, in which, in the third compensation, the capacitance variation of the variable capacitance element 10 in the packaged circuit 25 of Modified Example 1 illustrated in FIG. 7 is compensated. Furthermore, there will be described an example, in which, in the third compensation, the capacitance of the variable capacitance element 10 after the compensation in a range of not less than 0.90 C and less than 1.00 C.

Figure 10:
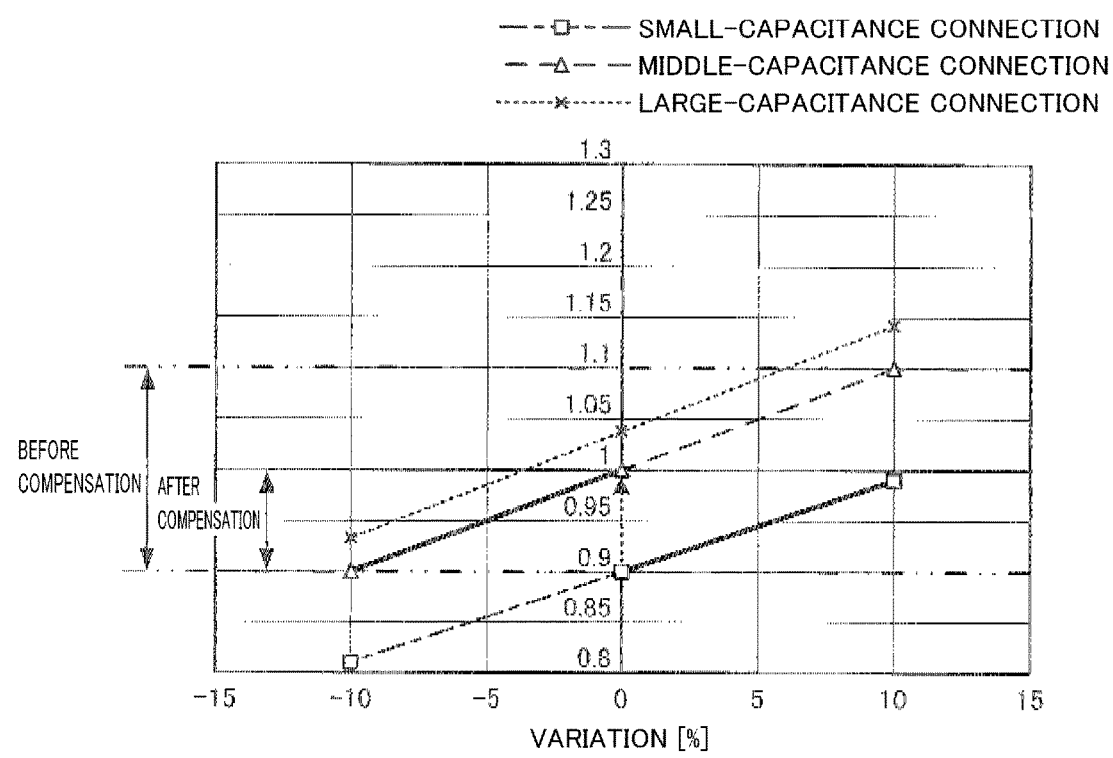
FIG. 10 describes compensation (third compensation) for capacitance variation in Modified Example 2.

Here, the third compensation will be specifically described with reference to FIG. 7, FIGS. 9 (a) and (b), and FIG. 10. FIG. 10 shows a characteristic chart showing a relationship between a connection state of the compensation unit 12 in Modified Example 2 and a change in capacitance with respect to the amount of variation. Each of the characteristics shown in FIG. 10 is the same as a corresponding one of the characteristics shown in FIG. 8. Furthermore, a bold solid line and a dotted line arrow in FIG. 10 indicate the third compensation for capacitance variation.

In the third compensation, first, there is measured the capacitance of the variable capacitance element 10 at the time when the compensation unit 12 is in a small-capacitance connection state as illustrated in FIG. 7. Specifically, the capacitance of the first external terminal for compensation 16 is measured. Then, when the measured capacitance is in a range of not less than 0.90 C and less than 1.00 C, in other words, when the measured capacitance is in a range indicated by a bold solid line in the characteristic indicated by the dot-and-dash line in FIG. 10, the compensation is terminated.

On the other hand, when the capacitance measured in the small-capacitance connection state is not in a range of not less than 0.90 C and less than 1.00 C, the pattern of the external wiring 21 is changed, whereby the connection state of the compensation unit 12 is changed to a middle-capacitance connection state. Specifically, as illustrated in FIG. 9 (a), the second external terminal for compensation 17 is electrically connected (pattern connecting) to a corresponding one of the second bias resistances R2 and the other AC signal terminal (AC2).

Next, measured is the capacitance of the variable capacitance element 10 at the time when the compensation unit 12 is in a middle-capacitance connection state as illustrated in FIG. 9 (a). Specifically, the capacitance of the first external terminal for compensation 16 or the second external terminal for compensation 17 is measured. Then, when the measured capacitance is in a range of not less than 0.90 C and less than 1.00 C, in other words, when the measured capacitance is in a range indicated by a bold solid line in the characteristic indicated by the dashed line in FIG. 8, the compensation is terminated.

On the other hand, when the capacitance measured in the middle-capacitance connection state is not in a range of not less than 0.90 C and less than 1.00 C, the variable capacitance element 10 having undergone the compensation is disposed of as a defective product.

In the third compensation, the capacitance variation of the variable capacitance element 10 is thus compensated. In the third compensation, the capacitance variation of the variable capacitance element 10 can be reduced from ±10% to from 0% to −10% after the mounting of the variable capacitance element 10.

As mentioned above, also in Modified Example 2, the capacitance variation (or the capacitance itself) of the variable capacitance element 10 can be compensated (adjusted) on the packaged circuit in the same manner as in the above-mentioned first embodiment. Therefore, also in this Modified Example, the same effects as those achieved in the above-mentioned first embodiment can be obtained.

[Relationship Between a Compensation Method and a Distribution of Capacitance Variation]

Here, the distribution of capacitance variation of the variable capacitance element 10 resulting from the above-mentioned first to third compensation, will be described. It is considered that, in the case of not performing a screening, the capacitance variation of the variable capacitance element 10 usually shows an approximately normal distribution. Therefore, it is considered that, in the variable capacitance element 10 of the present embodiment, in the case of not performing the above-mentioned compensations, the capacitance variation in each of the connection states of the compensation unit 12 also shows an approximately normal distribution.

Figure 11:
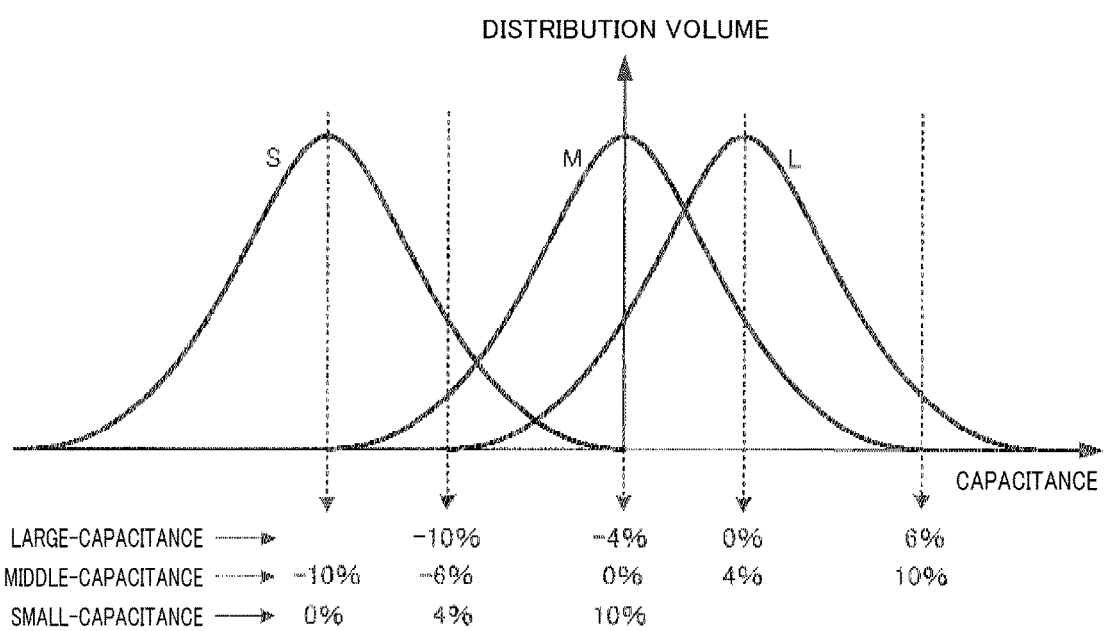
FIG. 11 is a distribution chart of capacitance variation of a variable capacitance element according to the present disclosure.

FIG. 11 shows the distribution of the capacitance variation. In FIG. 11 showing the distribution characteristic, the horizontal axis represents a capacitance and the vertical axis represents a distribution volume. Furthermore, a characteristic S in FIG. 11 represents a distribution of capacitance variation at the time when the compensation unit 12 is in a small-capacitance connection state, and a characteristic M represents a distribution of capacitance variation at the time when the compensation unit 12 is in a middle-capacitance connection state. Furthermore, a characteristic L represents a distribution of capacitance variation at the time when the compensation unit 12 is in a large-capacitance connection state. Furthermore, values indicated in the bottom part of the characteristic chart in FIG. 11 represent capacitance variation in each of the connection states.

The distribution of capacitance variation of the variable capacitance element 10 after the mounting thereof is changed depending on a method of compensating a capacitance variation. Each of FIGS. 12 (a) to (c) shows an example of a relationship between a compensation method and a distribution of capacitance variation. It should be noted that, in each of distribution characteristics shown in FIGS. 12 (a) to (c), the horizontal axis represents a capacitance and the vertical axis represents a distribution volume.

Figure 12A:
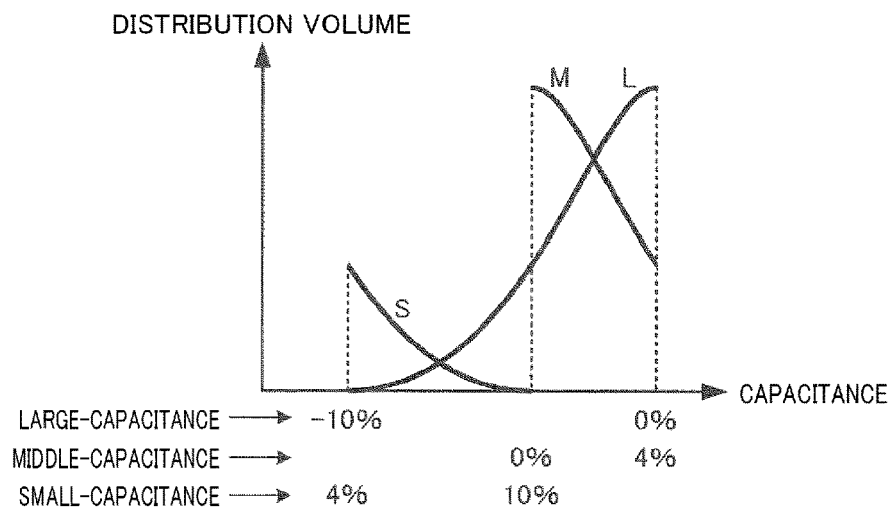
FIG. 12 illustrates a relationship between a method for compensation and the distribution of capacitance variation of a variable capacitance element.
Figure 12B:
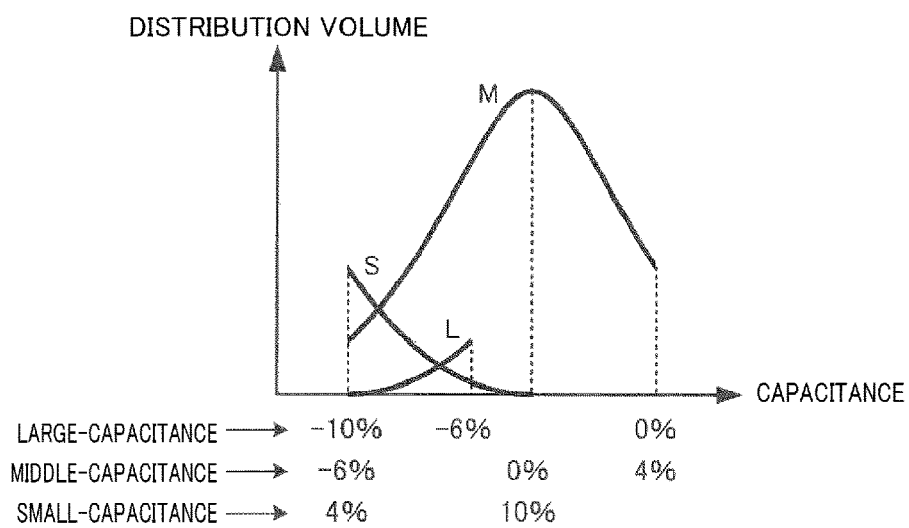
Figure 12C:
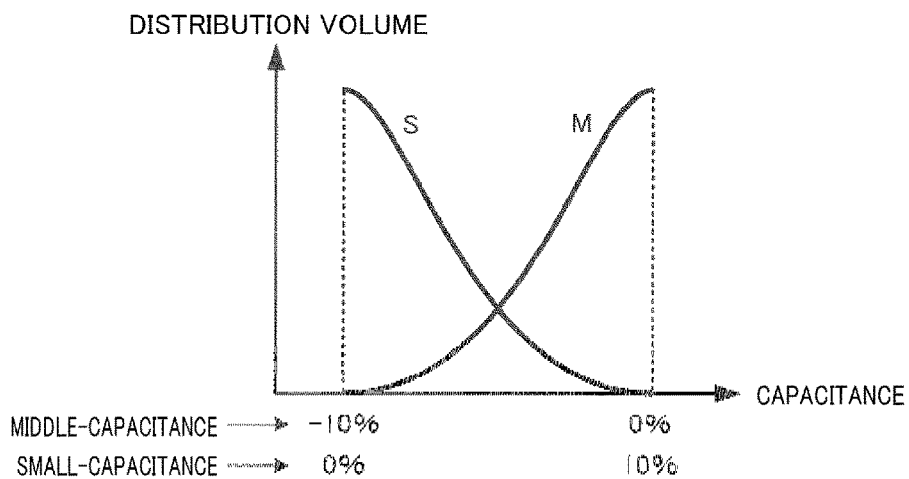

FIG. 12 (a) shows a distribution chart of a capacitance variation obtained in the case where the method of the above-mentioned first compensation is employed, that is, a distribution chart obtained in the case where capacitance variation is compensated by changing a connection state of the compensation unit 12 to a large-capacitance connection state, a middle-capacitance connection state, and a small-capacitance connection state in this order. It should be noted that the capacitance range of the characteristic L in FIG. 12 (a) corresponds to the capacitance variation range indicated by the bold solid line in the characteristic indicated by the dotted line in FIG. 5. The capacitance range of the characteristic M in FIG. 12 (a) corresponds to the capacitance variation range indicated by the bold solid line in the characteristic indicated by the dashed line in FIG. 5. Furthermore, the capacitance range of the characteristic S in FIG. 12 (a) corresponds to the capacitance variation range indicated by the bold solid line in the characteristic indicated by the dot-and-dash line in FIG. 5.

In the case where the above-mentioned first compensation method is employed, a characteristic obtained by overlapping the characteristic L, the characteristic M, and the characteristic S in FIG. 12 (a) is a distribution characteristic of capacitance variation of the variable capacitance element 10. Therefore, in the case where the above-mentioned first compensation method is employed, as clearly understood from FIG. 12 (a), there are produced many variable capacitance elements 10 having a larger capacitance than a capacitance obtained when the amount of variation is 0% in a middle-capacitance connection state.

FIG. 12 (b) shows a distribution chart of a capacitance variation obtained in the case where the method of the above-mentioned second compensation is employed, that is, a distribution chart obtained in the case where the capacitance variation is compensated by changing the connection state of the compensation unit 12 to a small-capacitance connection state, a middle-capacitance connection state, and a large-capacitance connection state in this order. It should be noted that the capacitance range of the characteristic S in FIG. 12 (b) corresponds to the capacitance variation range indicated by the bold solid line in the characteristic indicated by the dot-and-dash line in FIG. 8. The capacitance range of the characteristic M in FIG. 12 (b) corresponds to the capacitance variation range indicated by the bold solid line in the characteristic indicated by the dashed line in FIG. 8. Furthermore, the capacitance range of the characteristic L in FIG. 12 (b) corresponds to the capacitance variation range indicated by the bold solid line in the characteristic indicated by the dotted line in FIG. 8.

Also in the case where the above-mentioned second compensation method is employed, a characteristic obtained by overlapping the characteristic L, the characteristic M, and the characteristic S in FIG. 12 (b) is a distribution characteristic of capacitance variation of the variable capacitance element 10. Therefore, in the case where the above-mentioned second compensation method is employed, as clearly understood from FIG. 12 (b), there are produced many variable capacitance elements 10 having the approximately same capacitance as a capacitance obtained when the amount of variation is 0% in a middle-capacitance connection state.

FIG. 12 (c) shows a distribution chart of a capacitance variation obtained in the case where the method of the above-mentioned third compensation is employed, that is, a distribution chart obtained in the case where the capacitance variation is compensated by changing the connection state of the compensation unit 12 to a small-capacitance connection state and a middle-capacitance connection state in this order. It should be noted that the capacitance range of the characteristic S in FIG. 12 (c) corresponds to the capacitance variation range indicated by the bold solid line in the characteristic indicated by the dot-and-dash line in FIG. 10. The capacitance range of the characteristic M in FIG. 12 (c) corresponds to the capacitance variation range indicated by the bold solid line in the characteristic indicated by the dashed line in FIG. 10.

In the case where the above-mentioned third compensation method is employed, a characteristic obtained by overlapping the characteristic M and the characteristic S in FIG. 12 (c) is a distribution characteristic of capacitance variation of the variable capacitance element 10. Therefore, in this case, there are produced many variable capacitance elements 10 having the approximately same capacitance as a capacitance obtained when the amount of variation is 0% in a middle-capacitance connection state or having the approximately same capacitance as a capacitance obtained when the amount of variation is 0% in a small-capacitance connection state.

As mentioned above, in the variable capacitance element 10 of the present embodiment and a packaged circuit on which said variable capacitance element 10 is mounted, how much capacitance the variable capacitance elements 10 have and how many the variable capacitance elements 10 are produced are changed depending on a method of compensating the capacitance variation. Therefore, in an actual product, according to a necessary capacitance value of the variable capacitance element 10, a compensation method for capacitance variation (the configuration of a packaged circuit) is suitably selected. For example, in the case where the capacitance of the variable capacitance element 10 after the mounting thereof needs to be higher than a capacitance obtained at the time when the amount of variation is 0% in a middle-capacitance connection state, it is beneficial that a packaged circuit is configured so as to be a packaged circuit 20 (the first embodiment) as illustrated in FIG. 4 and the above-mentioned first compensation is applied. Furthermore, for example, in the case where the capacitance of the variable capacitance element 10 after the mounting thereof needs to be approximately equal to a capacitance obtained at the time when the amount of variation is 0% in a middle-capacitance connection state, it is beneficial that a packaged circuit is configured so as to be a packaged circuit 25 (Modified Example 1) as illustrated in FIG. 7 and the above-mentioned second compensation is applied.

<3. Second Embodiment: Second Configuration Example of Series-connected Type Variable Capacitance Element>

In the above-mentioned first embodiment, there was described a configuration example in which the compensation unit 12 was configured with three compensation capacitor units connected in parallel and the capacitance of the variable capacitance element 10 could be compensated in three steps. However, the present disclosure is not limited to this example, and the number of compensation capacitor units provided in the compensation unit 12 (the number of steps capable of varying a capacitance) and the capacitance of each of the compensation capacitor units may be suitably determined in consideration of, for example, a necessary compensation-range of capacitance and a necessary capacitance of the whole of the variable capacitance element 10. In the second embodiment, there will described configuration examples of a variable capacitance element in which a compensation unit is configured with two compensation capacitor units and a packaged circuit on which said variable capacitance element is mounted.

[Configuration of Variable Capacitance Element]

Figure 13:
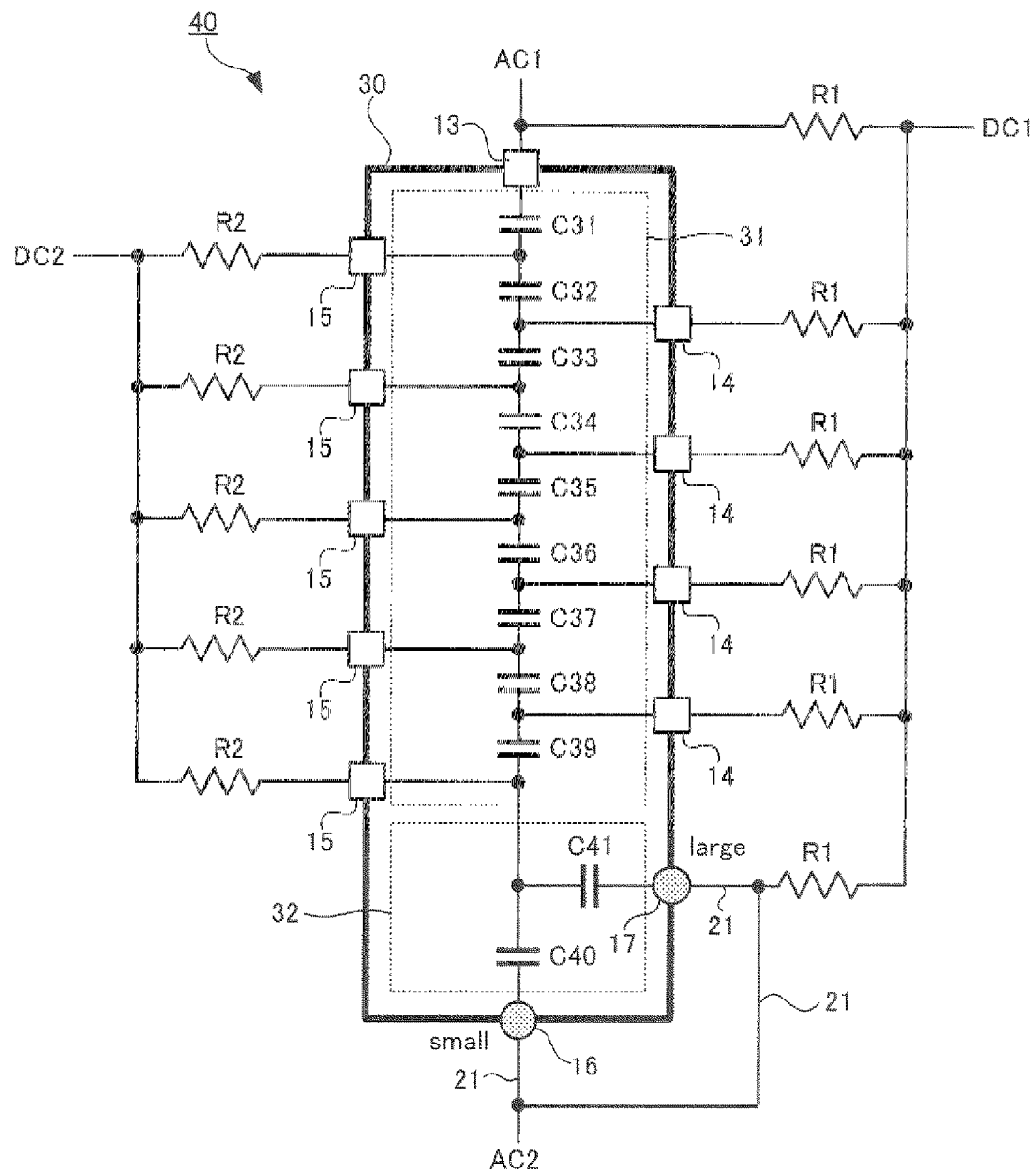
FIG. 13 is a schematic diagram of a packaged circuit on which a variable capacitance element according to a second embodiment is mounted.

FIG. 13 illustrates a schematic configuration of a variable capacitance element 30 according to the second embodiment and a schematic configuration of a packaged circuit 40 on which said variable capacitance element 30 is mounted. It should be noted that, to simplify an explanation, FIG. 13 illustrates only a circuit portion connected to each of external terminals of the variable capacitance element 30. Furthermore, in the packaged circuit 40 illustrated in FIG. 13, the same reference signs are given to the same configuration components as those in the packaged circuit 20 of the above-mentioned first embodiment illustrated in FIG. 4.

The variable capacitance element 30 of the second embodiment comprises a capacitor body unit 31 (an element body unit) and a compensation unit 32 serially connected to said capacitor body unit 31. The variable capacitance element 30 further comprises an external terminal for signals 13 (a first external terminal for signals), four first external terminals for control 14 (external terminals for control), and five second external terminals for control 15 (external terminals for control). The variable capacitance element 30 further comprises two external terminals for compensation (a first external terminal for compensation 16 and a second external terminal for compensation 17: an external terminal for capacitance compensation and a second external terminal for signals).

The capacitor body unit 31 comprises nine variable-capacitance capacitor units (a first variable-capacitance capacitor unit C31 to a ninth variable-capacitance capacitor unit C39: a first variable capacitor unit). In the present embodiment, the first variable-capacitance capacitor unit C31 to the ninth variable-capacitance capacitor unit C39 are serially connected. Furthermore, an end portion, on the side of the first variable-capacitance capacitor unit C31, of a series circuit composed of the nine variable-capacitance capacitor units is connected to the external terminal for signals 13, meanwhile an end portion, on the side of the ninth variable-capacitance capacitor unit C39, of said series circuit is connected to the compensation unit 32.

Each of a connection point between the second variable-capacitance capacitor unit C32 and the third variable-capacitance capacitor unit C33 and a connection point between the fourth variable-capacitance capacitor unit C34 and the fifth variable-capacitance capacitor unit C35 is connected to a corresponding one of the first external terminals for control 14. Furthermore, each of a connection point between the sixth variable-capacitance capacitor unit C36 and the seventh variable-capacitance capacitor unit C37 and a connection point between the eighth variable-capacitance capacitor unit C38 and the ninth variable-capacitance capacitor unit C39 is also connected to a corresponding one of the first external terminals for control 14.

Each of a connection point between the first variable-capacitance capacitor unit C31 and the second variable-capacitance capacitor unit C32 and a connection point between the third variable-capacitance capacitor unit C33 and the fourth variable-capacitance capacitor unit C34 is connected to a corresponding one of the second external terminals for control 15. Furthermore, each of a connection point between the fifth variable-capacitance capacitor unit C35 and the sixth variable-capacitance capacitor unit C36 and a connection point between the seventh variable-capacitance capacitor unit C37 and the eighth variable-capacitance capacitor unit C38 is also connected to a corresponding one of the second external terminals for control 15. Furthermore, a connection point between the ninth variable-capacitance capacitor unit C39 and the compensation unit 32 is connected to a corresponding one of the second external terminals for control 15.

It should be noted that the connections between a plurality of the variable capacitor units and the connections between each of the variable capacitor units and the corresponding one of the external terminals are performed by internal wiring. As illustrated in FIG. 13 later mentioned, when mounted on a circuit board of an external system or the like, each of the first external terminals for control 14 is connected to one output terminal (DC1) of a power supply for control voltage via a bias resistance. Meanwhile, each of the second external terminals for control 15 is connected to another output terminal (DC2) of the power supply for control voltage via a bias resistance.

Although not illustrated in FIG. 13, the first variable-capacitance capacitor unit C31 to the ninth variable-capacitance capacitor unit C39 are configured as a laminated capacitor in which nine dielectric layers (a first dielectric layer) are laminated with electrode layers sandwiched therebetween. It should be noted that the dielectric layer constituting each of the variable-capacitance capacitor units is formed of a ferroelectric material having a high relative dielectric constant, and the capacitance of the dielectric layer varies with a control voltage Vc (a control voltage signal) applied between a corresponding one of the first external terminals for control 14 and a corresponding one of the second external terminals for control 15. Specifically, the application of a control voltage Vc causes a decrease in the capacitance of each of the variable-capacitance capacitor units. Furthermore, depending on a method for producing the dielectric layer constituting each of the variable-capacitance capacitor units, the dielectric layer may comprise one dielectric film, or may comprise a plurality of dielectric films laminated.

The compensation unit 32 comprises two variable-capacitance capacitors for compensation (a first compensation capacitor unit C40 and a second compensation capacitor unit C41: a second variable capacitor unit). It should be noted that, in the present embodiment, the first compensation capacitor unit C40 and the second compensation capacitor unit C41 are connected in parallel.

A connection point (a parallel connection point) between the first compensation capacitor unit C40 and the second compensation capacitor unit C41 is connected to the ninth variable-capacitance capacitor unit C39 of the capacitor body unit 31 (an end portion, on the side of the ninth variable-capacitance capacitor unit C39, of a series circuit comprising the nine variable-capacitance capacitor units). Furthermore, an end portion, on a side opposite to the side of the parallel connection point, of the first compensation capacitor unit C40 is connected to the first external terminal for compensation 16. An end portion, on a side opposite to the side of the parallel connection point, of the second compensation capacitor unit C41 is connected to the second external terminal for compensation 17.

As shown in the later-mentioned explanation about compensation, in the present embodiment, when the variable capacitance element 30 is mounted on an external circuit board or the like, at least the first external terminal for compensation 16 is connected to the other input terminal (AC2) for AC signals. Thus, also in the present embodiment, at least the first external terminal for compensation 16 acts also as an external terminal for signals (the second external terminal for signals).

Although not illustrated in FIG. 13, the first compensation capacitor unit C40 and the second compensation capacitor unit C41 are configured as a laminated capacitor in which two dielectric layers (a second dielectric layer) are laminated with an electrode layer sandwiched therebetween. As is the case with the above-mentioned variable-capacitance capacitor units, the dielectric layer constituting each of the compensation capacitor units is formed of a ferroelectric material having a high relative dielectric constant, and the capacitance of the dielectric layer varies with a control voltage Vc (a control voltage signal) applied. Specifically, the application of a control voltage Vc causes a decrease in the capacitance of each of the compensation capacitor units.

Furthermore, depending on a method for producing the dielectric layer constituting each of the compensation capacitor units, the dielectric layer may comprise one dielectric film, or may comprise a plurality of dielectric films laminated.

It should be noted that, in the present embodiment, the dielectric layer constituting each of the variable-capacitance capacitor units inside the capacitor body unit 31 and the dielectric layer constituting each of the compensation capacitor units inside the compensation unit 32 are formed of the same ferroelectric material. Furthermore, in the present embodiment, all the electrode layers each provided between two dielectric layers adjoining each other in a lamination direction are also formed of the same material.

In the present embodiment, the variable capacitance element 30 is configured by laminating the first variable-capacitance capacitor unit C31 to the ninth variable-capacitance capacitor unit C39 and the first compensation capacitor unit C40 and the second compensation capacitor unit C41. Furthermore, in the present embodiment, the first variable-capacitance capacitor unit C31 to the ninth variable-capacitance capacitor unit C39 have the same capacitance, and the first compensation capacitor unit C40 and the second compensation capacitor unit C41 also have the same capacitance. It should be noted that the capacitance of each of the first compensation capacitor unit C40 and the second compensation capacitor unit C41 is made smaller than the capacitance of each of the first variable-capacitance capacitor unit C31 to the ninth variable-capacitance capacitor unit C39, for example, is made approximately one-half of the capacitance thereof

[Configuration Example of Packaged Circuit]

As illustrated in FIG. 13, the packaged circuit 40 comprises the variable capacitance element 30, and external wiring 21 configured to electrically connect the first external terminal for compensation 16 of the variable capacitance element 30 to the second external terminal for compensation 17 thereof. The packaged circuit 40 further comprises six first bias resistances R1 and five second bias resistances R2.

In a configuration example of the packaged circuit of the present embodiment, when the variable capacitance element 30 is mounted on the packaged circuit 40, the external terminal for signals 13 is connected to one AC-signal terminal (AC1) and a corresponding one of the first corresponding bias resistances R1. Furthermore, in the present embodiment, each of the external terminals for compensation included in the variable capacitance element 30 are connected to another AC-signal terminal (AC2) and a corresponding one of the second bias resistances R2 via the external wiring 21.

In the present embodiment, each of the first bias resistances R1 is provided between a corresponding one of the external terminals of the variable capacitance element 30 (the external terminal for signals 13, the first external terminals for control 14, the first external terminal for compensation 16, or the second external terminal for compensation 17) and one output terminal (DC1) of a power supply for control voltage. Furthermore, each of the second bias resistances R2 is provided between a corresponding one of the second external terminals for control 15 of the variable capacitance element 30 and another output terminal (DC2) of the power supply for control voltage.

[Relationship Between a Connection State of the Compensation Unit and an Amount of Change in Capacitance]

Next, there will be specifically described a relationship between a connection state between the first external terminal for compensation 16 and the second external terminal for compensation 17 (a connection state in the compensation unit 32) and the capacitance of the whole of the variable capacitance element 30. Here, in the variable capacitance element 30 of the present embodiment, each capacitance of the first variable-capacitance capacitor unit C31 to the ninth variable-capacitance capacitor unit C39 is taken as "10 C". Furthermore, each capacitance of the first compensation capacitor unit C40 and the second compensation capacitor unit C41 is taken as "5 C". Furthermore, the capacitance of the variable capacitance element 30 is assumed to vary within a range of −10% to +10%.

In this case, in the large-capacitance connection state (a state in which all of the first compensation capacitor unit C40 and the second compensation capacitor unit C41 contribute to compensation), taking the above-mentioned amount of variation into consideration, the capacitance of the variable capacitance element 30 is in a range of 0.90 C to 1.10 C. It should be noted that, in the large-capacitance connection state, when the amount of variation is 0%, the capacitance of the variable capacitance element 30 is 1.00 C.

In the small-capacitance connection state (a state in which only the first compensation capacitor unit C40 contributes to compensation), taking the above-mentioned amount of variation into consideration, the capacitance of the variable capacitance element 30 is in a range of 0.82 C to 1.00 C. It should be noted that, in the small-capacitance connection state, when the amount of variation is 0%, the capacitance of the variable capacitance element 30 is 0.91 C.

Here, the following Table 2 collectively shows the above-mentioned relationships between the connection state of the compensation unit 32 and a change in the capacitance of the variable capacitance element 30 of the present embodiment.

TABLE 2

| Variation amount | −10% | 0% | +10% |
|---|---|---|---|
| Small-capacitance connection | 0.82 C | 0.91 C | 1.00 C |
| Large-capacitance connection | 0.90 C | 1.00 C | 1.10 C |

Figure 14:
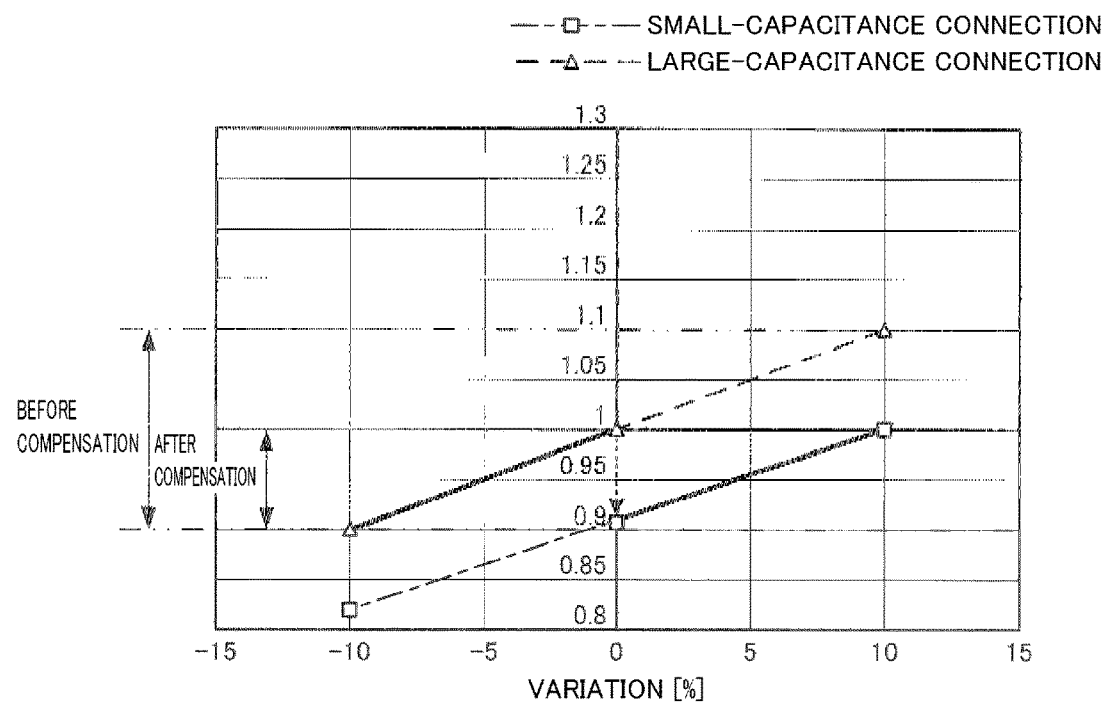
FIG. 14 illustrates a relationship between a connection state of a compensation unit and a capacitance variation characteristic with respect to an amount of variation, in the variable capacitance element of the second embodiment.

FIG. 14 shows a graph charting the relationships, shown in the above-mentioned Table 2, between a connection state of the compensation unit 32 and a change in the capacitance with respect to the amount of variation. It should be noted that, in FIG. 14 showing a characteristic, the horizontal axis represents the amount of capacitance variation of the variable capacitance element 30, and the vertical axis represents a capacitance value (relative value) of the variable capacitance element 30. Furthermore, a characteristic indicated by a dot-and-dash line in FIG. 14 (a characteristic indicated by a hollow square mark) represents a characteristic of capacitance variation at the time when the compensation unit 32 is in a small-capacitance connection state. A characteristic indicated by a dashed line in FIG. 14 (a characteristic indicated by a hollow triangle mark) represents a characteristic of capacitance variation at the time when the compensation unit 32 is in a large-capacitance connection state. A bold solid line and a dotted line arrow in FIG. 14 indicate a later-mentioned compensation for capacitance variation.

[Compensation for Capacitance Variation]

Figure 15:
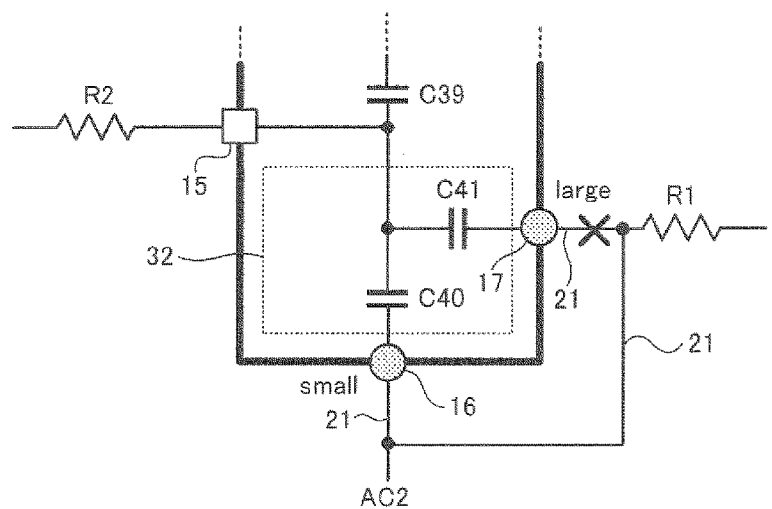
FIG. 15 describes compensation for capacitance variation in the variable capacitance element of the second embodiment.

Next, a method of compensation for capacitance variation of the variable capacitance element 30 in the packaged circuit 40 will be described with reference to FIGS. 13, 14, and 15. FIG. 15 illustrates a process of changing a connection state of the compensation unit 32 in the compensation for capacitance variation.

It should be noted that, also in the compensation of the present embodiment, as is the case with the above-mentioned first embodiment, a necessary range of capacitance variation of the variable capacitance element 30 is determined in advance in consideration of, for example, the use. Here, there will be described an example in which compensation is performed so that the capacitance of the variable capacitance element 30 after the compensation is in a range of not less than 0.90 C and less than 1.00 C.

In the present embodiment, when the variable capacitance element 30 is mounted on the packaged circuit 40, as illustrated in FIG. 13, there is brought about a state in which each of the first external terminal for compensation 16 and the second external terminal for compensation 17 is connected to the other AC signal terminal (AC2) and a corresponding one of the first bias resistances R1 via the external wiring 21. In other words, when the variable capacitance element 30 is mounted on the packaged circuit 40, the compensation unit 32 is brought into a large-capacitance connection state. Accordingly, in the packaged circuit 40 illustrated in FIG. 13, the compensation for capacitance variation of the variable capacitance element 30 is started with a large-capacitance connection state.

First, in the large-capacitance connection state as illustrated in FIG. 13, the capacitance of the variable capacitance element 30 is measured. Specifically, the capacitance of any of the first external terminal for compensation 16 and the second external terminal for compensation 17 is measured. Next, when the measured capacitance is in a range of not less than 0.90 C and less than 1.00 C, in other words, when the measured capacitance is in a range indicated by a bold solid line in the characteristic indicated by the dashed line in FIG. 14, the compensation is terminated.

On the other hand, when the capacitance measured in the large-capacitance connection state is not in a range of not less than 0.90 C and less than 1.00 C, the connection state of the compensation unit 32 is changed to a small-capacitance connection state. Specifically, as illustrated in FIG. 15, there is cut the pattern of the external wiring 21 at a portion at which the second external terminal for compensation 17 is connected to a corresponding one of the first bias resistances R1 and the other AC signal terminal (AC2).

Next, measured is the capacitance of the variable capacitance element 30 at the time when the compensation unit 32 is in a small-capacitance connection state as illustrated in FIG. 15. Specifically, the capacitance of the first external terminal for compensation 16 is measured. Then, when the measured capacitance is in a range of not less than 0.90 C and less than 1.00 C, in other words, when the measured capacitance is in a range indicated by a bold solid line in the characteristic indicated by the dot-and-dash line in FIG. 14, the compensation is terminated.

On the other hand, when the capacitance measured in the small-capacitance connection state is not in a range of not less than 0.90 C and less than 1.00 C, the variable capacitance element 30 having undergone the compensation is disposed of as a defective product.

In the packaged circuit 40 of the present embodiment, the capacitance variation of the variable capacitance element 30 is thus compensated. In the above-mentioned packaged circuit 40, the capacitance variation of the variable capacitance element 30 can be reduced from ±10% to from 0% to −5% after the mounting of the variable capacitance element 30.

As mentioned above, also in the present embodiment, the capacitance variation (or the capacitance itself) of the variable capacitance element 30 can be compensated (adjusted) on the packaged circuit in the same manner as in the above-mentioned first embodiment. Therefore, also in the present embodiment, the same effects as those achieved in the above-mentioned first embodiment can be obtained.

MODIFIED EXAMPLE 3

In the above-mentioned second embodiment, there was described an example in which a capacitance variation is compensated by cutting the pattern of the external wiring 21 connecting the external terminals for compensation, as is the case with the first compensation described in the above-mentioned first embodiment, but, the present disclosure is not limited to this embodiment. Also in the present embodiment, as is the case with the second and the third compensations described in the above-mentioned Modified Examples 1 and 2, respectively, capacitance variation may be compensated by a pattern connection of the external wiring 21.

In this case, a packaged circuit is configured such that, when the variable capacitance element 30 is mounted on the packaged circuit, the wiring pattern of the external wiring 21 between the first external terminal for compensation 16 and the second external terminal for compensation 17 is the same as a wiring pattern illustrated in FIG. 15. In other words, a packaged circuit is configured such that, when the variable capacitance element 30 is mounted on a packaged circuit, the compensation unit 32 is in a small-capacitance connection state. Furthermore, in the packaged circuit having such configuration, the capacitance variation of the variable capacitance element 30 is compensated by changing the connection state of the compensation unit 32 from a small-capacitance connection state to a large-capacitance connection state (by connecting the first external terminal for compensation 16 and the second external terminal for compensation 17 by the external wiring 21).

<4. Third Embodiment: Third Configuration Example of Series-connected Type Variable Capacitance Element>

In the above-mentioned first and second embodiments, there were described the examples in which a compensation unit was configured by connecting a plurality of compensation capacitor units in parallel, but, the present disclosure is not limited to these embodiments. In the present disclosure, the compensation unit may be configured by serially connecting a plurality of the compensation capacitor units (refer to FIG. 2 (*a*)). In a third embodiment, an example of such configuration will be described.

[Configuration of Variable Capacitance Element]

Figure 16:
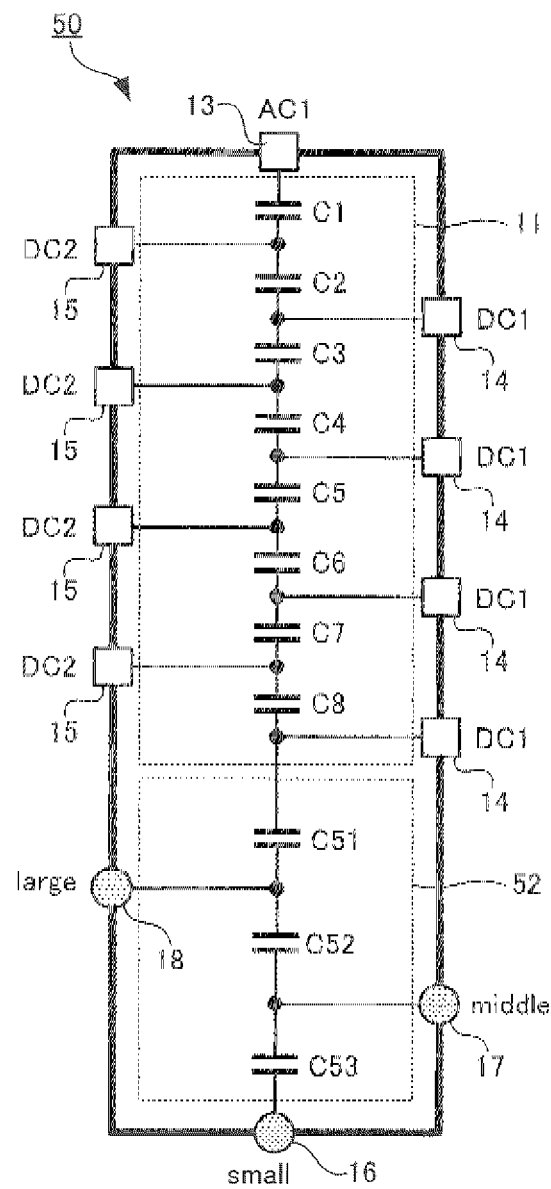
FIG. 16 is a schematic diagram of a variable capacitance element according to a third embodiment.

FIG. 16 illustrates a schematic configuration of a variable capacitance element according to the third embodiment of the present disclosure. It should be noted that, in the variable capacitance element 50 illustrated in FIG. 16, the same reference signs are given to the same configuration components as those in the variable capacitance element 10 illustrated in FIG. 3, and an explanation about said configuration components will be omitted.

The variable capacitance element 50 of the present embodiment comprises a capacitor body unit 11 (an element body unit) and a compensation unit 52 serially connected to said capacitor body unit 11. The variable capacitance element 50 further comprises an external terminal for signals 13 (a first external terminal for signals), four first external terminals for control 14 (external terminals for control), and four second external terminals for control 15 (external terminals for control). The variable capacitance element 50 further comprises three external terminals for compensation (a first external terminal for compensation 16 to a third external terminal for compensation 18: external terminals for capacitance compensation and a second external terminal for signals). As clearly understood from a comparison between FIG. 16 and FIG. 3, the variable capacitance element 50 of the present embodiment has a configuration obtained by changing the configuration of the compensation unit in the variable capacitance element 10 of the above-mentioned first embodiment. Therefore, only the configuration of the compensation unit 52 will be described here.

The compensation unit 52 comprises three variable-capacitance capacitors for compensation (a first compensation capacitor unit C51 to a third compensation capacitor unit C53: a second variable capacitor unit). It should be noted that, in the present embodiment, the first compensation capacitor unit C51 to the third compensation capacitor unit C53 are serially connected.

An end portion, on the side of the first compensation capacitor unit C51, of a series circuit comprising the first compensation capacitor unit C51 to the third compensation capacitor unit C53 is connected to the eighth variable-capacitance capacitor unit C8 of the capacitor body unit 11. Furthermore, an end portion, on the side of the third compensation capacitor unit C53, of the series circuit comprising the first compensation capacitor unit C51 to the third compensation capacitor unit C53 is connected to the first external terminal for compensation 16. A connection point between the second compensation capacitor unit C52 and the third compensation capacitor unit C53 is connected to the second external terminal for compensation 17. Furthermore, a connection point between the first compensation capacitor unit C51 and the second compensation capacitor unit C52 is connected to the third external terminal for compensation 18.

It should be noted that, in the present embodiment, as in the cases of the above-mentioned embodiments, a dielectric layer (a first dielectric layer) constituting each of the variable-capacitance capacitor units inside the capacitor body unit 11 and a dielectric layer (a second dielectric layer) constituting each of the compensation capacitor units inside the compensation unit 52 are formed of the same ferroelectric material. Furthermore, depending on a method for producing each of the dielectric layers, the dielectric layer may comprise one dielectric film, or may comprise a plurality of dielectric films laminated. In the present embodiment, the variable capacitance element 50 is configured by laminating the first variable-capacitance capacitor unit C1 to the eighth variable-capacitance capacitor unit C8 (a first variable capacitor unit) and the first compensation capacitor unit C51 to the third compensation capacitor unit C53. Furthermore, in the present embodiment, the first variable-capacitance capacitor unit C1 to the eighth variable-capacitance capacitor unit C8 and the first compensation capacitor unit C51 to the third compensation capacitor unit C53 each have the same capacitance.

[Configuration of Packaged Circuit]

Figure 17:
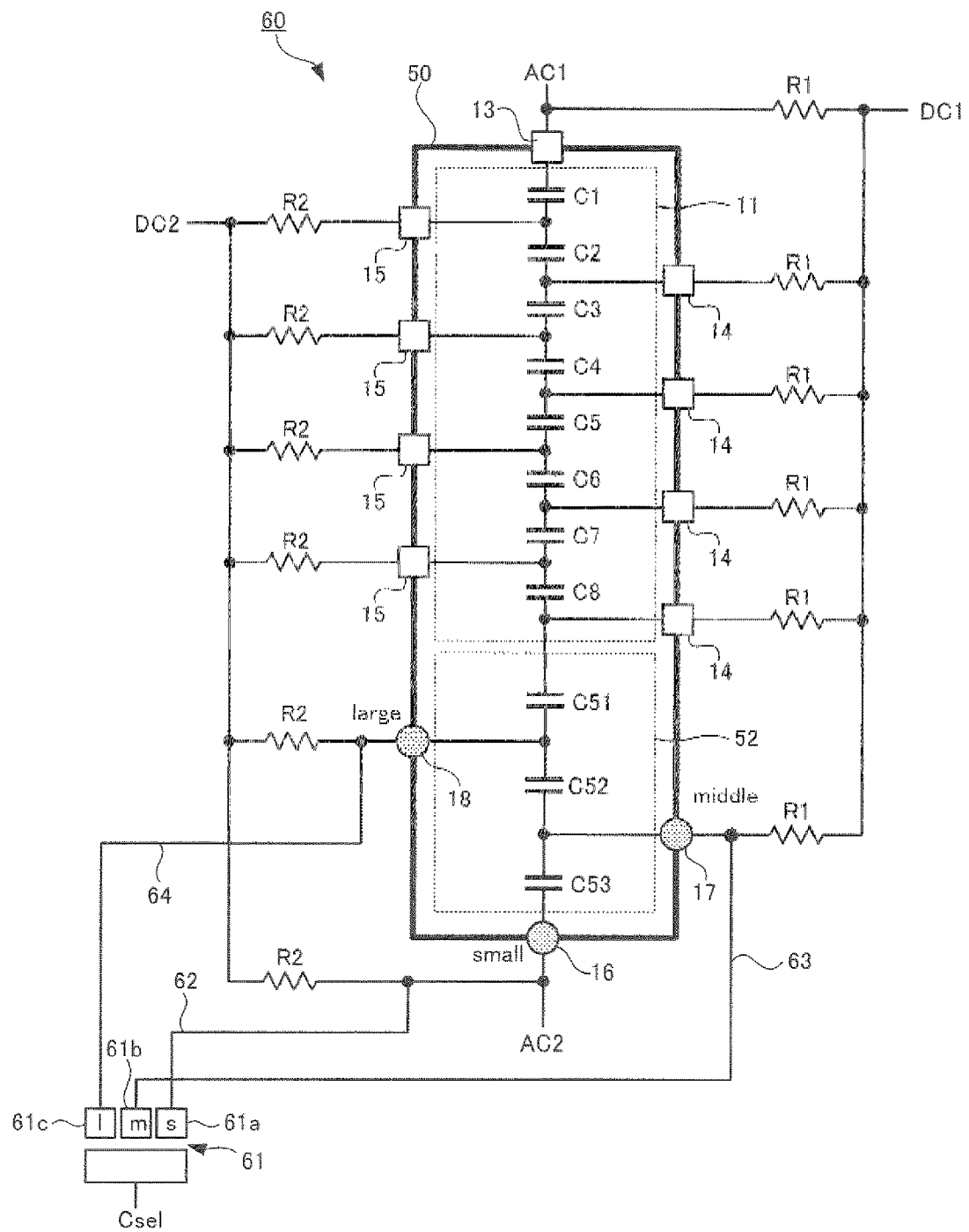
FIG. 17 is a schematic diagram of a packaged circuit on which the variable capacitance element according to the third embodiment is mounted.

FIG. 17 illustrates a schematic configuration of a packaged circuit in which the variable capacitance element 50 according to the third embodiment illustrated in FIG. 16 is mounted on a circuit board of an external system or the like. It should be noted that, to simplify an explanation, FIG. 17 illustrates only a circuit portion connected to each of the external terminals of the variable capacitance element 50. Furthermore, in the packaged circuit 60 illustrated in FIG. 17, the same reference signs are given to the same configuration components as those in the packaged circuit 20 illustrated in FIG. 4, and an explanation about those configuration components will be omitted.

The packaged circuit 60 comprises the variable capacitance element 50, a selection unit 61, six first bias resistances R1, and six second bias resistances R2. The packaged circuit 60 further comprises a first external wiring 62 configured to connect a connection point between the first external terminal for compensation 16 of the variable capacitance element 50 and a corresponding one of the second bias resistances R2 to a first selection terminal 61a of the selection unit 61. The packaged circuit 60 further comprises a second external wiring 63 configured to connect a connection point between the second external terminal for compensation 17 and a corresponding one of the first bias resistances R1 to a second selection terminal 61b of the selection unit 61. The packaged circuit 60 further comprises a third external wiring 64 configured to connect a connection point between the third external terminal for compensation 18 and a corresponding one of the second bias resistances R2 to a third selection terminal 61c of the selection unit 61.

In the packaged circuit 60 of the present embodiment, when the variable capacitance element 50 is mounted on the packaged circuit 60, the external terminal for signals 13 is connected to one AC-signal terminal (AC1) and a corresponding one of the first bias resistances R1. Furthermore, in the present embodiment, any of the first external terminal for compensation 16 to the third external terminal for compensation 18 is connected to another AC-signal terminal (AC2) and a corresponding one of the bias resistances via the external wiring.

In the present embodiment, each of the first bias resistances R1 is provided between a corresponding one of the external terminals of the variable capacitance element 50 (any of the external terminal for signals 13, the first external terminals for control 14, and the second external terminals for compensation 17) and one output terminal (DC1) of a power supply for control voltage. Each of the second bias resistances R2 is provided between a corresponding one of the external terminals of the variable capacitance element 50 (any of the second external terminals for control 15, the first external terminal for compensation 16, and the third external terminal for compensation 18) and another output terminal (DC2) of the power supply for control voltage. It should be noted that each of the bias resistances may be configured in the same manner as in the above-mentioned first embodiment.

The selection unit 61 is a circuit unit to change a connection state of the compensation capacitor units in the compensation unit 52, and may be configured with, for example, a land pattern provided in a substrate of the packaged circuit 60, a changeover switch, and the like. Furthermore, as mentioned later, the selection unit 61 is configured to change a connection state between each of the compensation capacitor units in the compensation unit 52 by changing a connection state among the first selection terminal 61a to the third selection terminal 61c at the time of compensation for capacitance variation of the variable capacitance element 50.

[Relationship Between a Connection State of the Compensation Unit and an Amount of Change in Capacitance]

Next, there will be specifically described a relationship between a connection state between the first external terminal for compensation 16 to the third external terminal for compensation 18 (a connection state in the compensation unit 52) and the capacitance of the whole of the variable capacitance element 50. Here, in the variable capacitance element 50 of the present embodiment, each capacitance of the first variable-capacitance capacitor unit C1 to the eighth variable-capacitance capacitor unit C8 and the first compensation capacitor unit C51 to the third compensation capacitor unit C53 is taken as "10 C". Furthermore, the capacitance of the variable capacitance element 50 is assumed to vary within a range of −10% to +10%.

In this case, in a small-capacitance connection state (a state in which all of the first compensation capacitor unit C51 to the third compensation capacitor unit C53 contribute to compensation), taking the above-mentioned amount of variation into consideration, the capacitance of the variable capacitance element 50 is in a range of 0.82 C to 1.00 C. It should be noted that, in the small-capacitance connection state, when the amount of variation is 0%, the capacitance of the variable capacitance element 50 is 0.91 C.

In a middle-capacitance connection state (a state in which the first compensation capacitor unit C51 and the second compensation capacitor unit C52 contribute to compensation), taking the above-mentioned amount of variation into consideration, the capacitance of the variable capacitance element 50 is in a range of 0.90 C to 1.10 C. It should be noted that, in the middle-capacitance connection state, when the amount of variation is 0%, the capacitance of the variable capacitance element 50 is 1.00 C.

Furthermore, in a large-capacitance connection state (a state in which only the first compensation capacitor unit C51 contributes to compensation), taking the above-mentioned amount of variation into consideration, the capacitance of the variable capacitance element 50 is in a range of 1.00 C to 1.22 C. It should be noted that, in the large-capacitance connection state, when the amount of variation is 0%, the capacitance of the variable capacitance element 50 is 1.11 C.

Here, the following Table 3 collectively shows the above-mentioned relationships between the connection state of the compensation unit 52 and a change in the capacitance in the variable capacitance element 50 of the present embodiment.

TABLE 3

| Variation amount | −10% | 0% | +10% |
| --- | --- | --- | --- |
| Small-capacitance connection | 0.82 C | 0.91 C | 1.00 C |
| Middle-capacitance connection | 0.90 C | 1.00 C | 1.10 C |
| Large-capacitance connection | 1.00 C | 1.11 C | 1.22 C |

Figure 18:
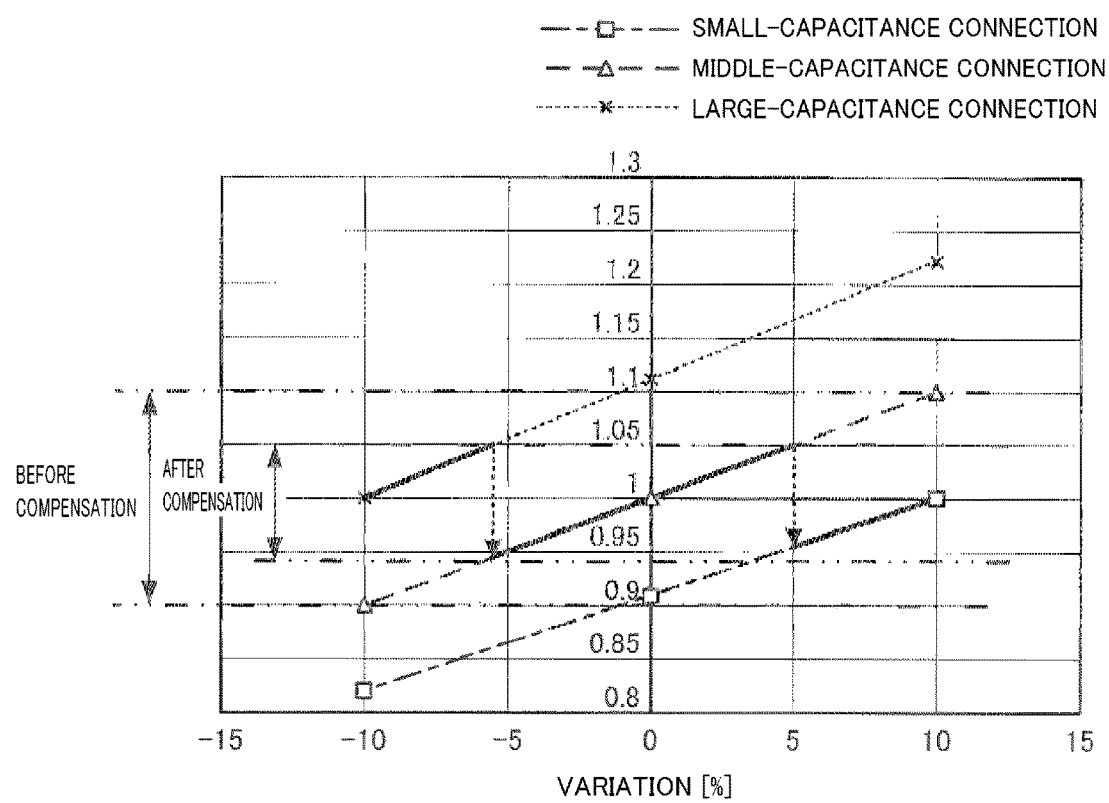
FIG. 18 describes compensation (first compensation) for capacitance variation in the variable capacitance element of the third embodiment.
Figure 19:
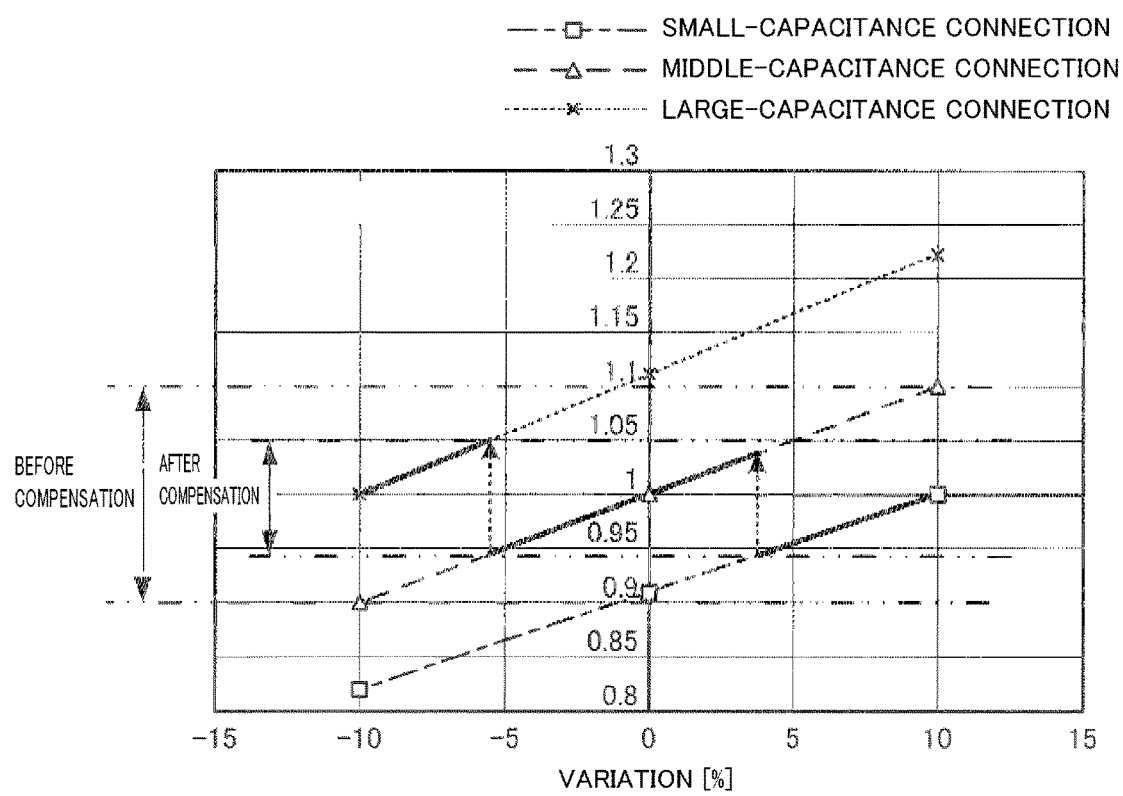
FIG. 19 describes compensation (second compensation) for capacitance variation in the variable capacitance element of the third embodiment.

Furthermore, FIGS. 18 and 19 show graphs charting the relationships, shown in the above-mentioned Table 3, between a connection state of the compensation unit 52 and a change in the capacitance with respect to the amount of variation. It should be noted that, in each of FIGS. 18 and 19 showing characteristics, the horizontal axis represents an amount of variation in capacitance of the variable capacitance element 50, and the vertical axis represents a capacitance value (relative value) of the variable capacitance element 50. Furthermore, characteristics indicated by a dot-and-dash line in FIGS. 18 and 19 (characteristic indicated by a hollow square mark) represent capacitance variation characteristics obtained at the time when the compensation unit 52 is in the small-capacitance connection state. Characteristics indicated by a dashed line in FIGS. 18 and 19 (characteristics indicated by a hollow triangle mark) represent capacitance variation characteristics obtained at the time when the compensation unit 52 is in the middle-capacitance connection state. Characteristics indicated by a dotted line in FIGS. 18 and 19 (characteristics indicated by a mark X) represent capacitance variation characteristics obtained at the time when the compensation unit 52 is in the large-capacitance connection state. It should be noted that a bold solid line and a dotted line arrow in FIG. 18 indicate a later-mentioned first compensation for capacitance variation, and a bold solid line and a dotted line arrow in FIG. 19 indicate a later-mentioned second compensation for capacitance variation.

[First Compensation for Capacitance Variation]

Next, a method of first compensation for capacitance variation of the variable capacitance element 50 in the packaged circuit 60 will be described with reference to FIGS. 17 and 18. It should be noted that, also in the first compensation, as in the cases of the above-mentioned embodiments, a necessary range of capacitance variation of the variable capacitance element 50 is determined in advance in consideration of, for example, the use. Here, there will be described an example in which compensation is performed so that the capacitance of the variable capacitance element 50 after the compensation is within a range of not less than 0.94 C and less than 1.05 C.

In the present embodiment, when the variable capacitance element 50 is mounted on the packaged circuit 60, there is brought about a state in which the first selection terminal 61a to the third selection terminal 61c of the selection unit 61 are not connected to each other. In this case, all of the first compensation capacitor unit C51 to the third compensation capacitor unit C53 inside the compensation unit 52 contribute to a capacitance value of the whole of the variable capacitance element 50, whereby the compensation unit 52 is in a small-capacitance connection state.

In the first compensation, first, the capacitance of the third external terminal for compensation 18 of the variable capacitance element 50 is measured. Next, when the measured capacitance is in a range of not less than 0.94 C and less than 1.05 C, in other words, when the measured capacitance is in a range indicated by a bold solid line in the characteristic indicated by the dotted line in FIG. 18, the third selection terminal 61c of the selection unit 61 is connected to the first selection terminal 61a thereof. In other words, an electrical short-circuit is established between the first external terminal for compensation 16 and the third external terminal for compensation 18 of the variable capacitance element 50. In this case, the compensation is terminated in a state in which the third selection terminal 61c of the selection unit 61 is connected to the first selection terminal 61a thereof.

On the other hand, when the measured capacitance of the third external terminal for compensation 18 is not in a range of not less than 0.94 C and less than 1.05 C, the capacitance of the second external terminal for compensation 17 of the variable capacitance element 50 is measured. Then, when the measured capacitance of the second external terminal for compensation 17 is in a range of not less than 0.94 C and less than 1.05 C, in other words, when the measured capacitance is in a range indicated by a bold solid line in the characteristic indicated by the dashed line in FIG. 18, the second selection terminal 61b of the selection unit 61 is connected to the first selection terminal 61a thereof. In other words, an electrical short-circuit is established between the first external terminal for compensation 16 and the second external terminal for compensation 17 of the variable capacitance element 50. In this case, then the compensation is terminated in a state in which the second selection terminal 61b of the selection unit 61 is connected to the first selection terminal 61a thereof.

On the other hand, when the measured capacitance of the second external terminal for compensation 17 is not in a range of not less than 0.94 C and less than 1.05 C, the capacitance of the first external terminal for compensation 16 of the variable capacitance element 50 is measured. Then, when the measured capacitance of the first external terminal for compensation 16 is in a range of not less than 0.94 C and less than 1.05 C, in other words, when the measured capacitance is in a range indicated by a bold solid line in the characteristic indicated by the dot-and-dash line in FIG. 18, the compensation is terminated without connecting the selection terminals of the selection unit 61 with each other.

It should be noted that, when the measured capacitance of the first external terminal for compensation 16 of the variable capacitance element 50 is not in a range of not less than 0.94 C and less than 1.05 C, the variable capacitance element 50 having undergone the compensation is disposed of as a defective product. In the first compensation of the present embodiment, the capacitance variation of the variable capacitance element 50 is thus compensated.

[Second Compensation for Capacitance Variation]

In the above-mentioned first compensation, there was described an example in which the capacitances of the third external terminal for compensation 18, the second external terminal for compensation 17, and the first external terminal for compensation 16 of the variable capacitance element 50 were measured in this order, but, the present disclosure is not limited to this example. In second compensation, there will be described an example in which the capacitances of the first external terminal for compensation 16, the second external terminal for compensation 17, and the third external terminal for compensation 18 of the variable capacitance element 50 were measured in this order.

The second compensation for capacitance variation of the variable capacitance element 50 in the packaged circuit 60 will be described with reference to FIGS. 17 and 19. It should be noted that, also in the second compensation, as in the cases of the above-mentioned embodiments, a necessary range of capacitance variation of the variable capacitance element 50 is determined in advance in consideration of, for example, the use. Here, there will be described an example in which, as is the case with the above-mentioned first compensation, compensation is performed so that the capacitance of the variable capacitance element 50 after the compensation is within a range of not less than 0.94 C and less than 1.05 C.

In the second compensation, first, the capacitance of the first external terminal for compensation 16 of the variable capacitance element 50 is measured. Then, when the measured capacitance is in a range of not less than 0.94 C and less than 1.05 C, in other words, when the measured capacitance is in a range indicated by a bold solid line in the characteristic indicated by the dot-and-dash line in FIG. 19, the compensation is terminated without connecting the selection terminals of the selection unit 61 with each other.

On the other hand, when the measured capacitance of the first external terminal for compensation 16 is not in a range of not less than 0.94 C and less than 1.05 C, the capacitance of the second external terminal for compensation 17 of the variable capacitance element 50 is measured. Then, when the measured capacitance of the second external terminal for compensation 17 is in a range of not less than 0.94 C and less than 1.05 C, in other words, when the measured capacitance is in a range indicated by a bold solid line in the characteristic indicated by the dashed line in FIG. 19, the second selection terminal 61b of the selection unit 61 is connected to the first selection terminal 61a thereof. In other words, an electrical short-circuit is established between the first external terminal for compensation 16 and the second external terminal for compensation 17 of the variable capacitance element 50. In this case, the compensation is then terminated in a state in which the second selection terminal 61b of the selection unit 61 is connected to the first selection terminal 61a thereof.

On the other hand, when the measured capacitance of the second external terminal for compensation 17 is not in a range of not less than 0.94 C and less than 1.05 C, the capacitance of the third external terminal for compensation 18 of the variable capacitance element 50 is measured. Then, when the measured capacitance of the third external terminal for compensation 18 is in a range of not less than 0.94 C and less than 1.05 C, in other words, when the measured capacitance is in a range indicated by a bold solid line in the characteristic indicated by the dotted line in FIG. 19, the third selection terminal 61c of the selection unit 61 is connected to the first selection terminal 61a thereof. In other words, an electrical short-circuit is established between the first external terminal for compensation 16 and the third external terminal for compensation 18 of the variable capacitance element 50. In this case, the compensation is then terminated in a state in which the third selection terminal 61c of the selection unit 61 is connected to the first selection terminal 61a thereof.

It should be noted that, when the measured capacitance of the third external terminal for compensation 18 of the variable capacitance element 50 is not in a range of not less than 0.94 C and less than 1.05 C, the variable capacitance element 50 having undergone the compensation is disposed of as a defective product. In the second compensation of the present embodiment, the capacitance variation of the variable capacitance element 50 is thus compensated.

As mentioned above, also in the present embodiment, as in the cases of the above-mentioned first and second embodiments, a range of capacitance variation of the variable capacitance element 50 can be reduced to a desired range after the mounting of the variable capacitance element 50. That is, also in the present embodiment, the capacitance variation (or the capacitance itself) of the variable capacitance element 50 can be compensated (adjusted) on the packaged circuit. Therefore, also in the present embodiment, the same effects as those in the above-mentioned first embodiment can be obtained.

It should be noted that, in the present embodiment, the number of serially-connected capacitor units contributing to the capacitance of the whole of the variable capacitance element 50 varies with a connection state of the compensation unit 52. That is, in the present embodiment, the pressure resistance of the variable capacitance element 50 varies with a connection state of the compensation unit 52. Therefore, in the present embodiment, taking a relationship between a connection state of the compensation capacitor units in the compensation unit 52 and the pressure resistance into consideration, there are suitably determined the number of the compensation capacitor units (the number of steps capable of varying a capacitance), the capacitance of each of the compensation capacitor units, the configuration of the capacitor body unit 11, and the like.

Furthermore, in the above-mentioned first and second compensations of the capacitance variation, there was described an example of measuring each of the external terminals for compensation of the variable capacitance element 50 one by one, but, the present disclosure is not limited to this example. The capacitances of all the external terminals for compensation of the variable capacitance element 50 may be measured at the same time, and, based on the measurement results, a suitable connection state among the first selection terminal 61a to the third selection terminal 61c is selected, whereby the capacitance variation of the variable capacitance element 50 may be compensated.

MODIFIED EXAMPLE 4

In the above-mentioned third embodiment, there was described a configuration example in which the compensation unit 52 was configured with three serially-connected compensation capacitor units so that the capacitance of the variable capacitance element 50 could be compensated in three steps. However, the present disclosure is not limited to this example, and the number of compensation capacitor units provided in a compensation unit (the number of steps capable of varying a capacitance) and the capacitance of each of the capacitor units may be suitably determined in consideration of, for example, a necessary compensation-range of capacitance and a necessary capacitance of the whole of a variable capacitance element. In Modified Example 4, there will described configuration examples of a variable capacitance element in which a compensation unit is configured with two serially-connected compensation capacitor units and a packaged circuit on which said variable capacitance element is mounted.

(1) Configuration of Variable Capacitance Element

Figure 20:
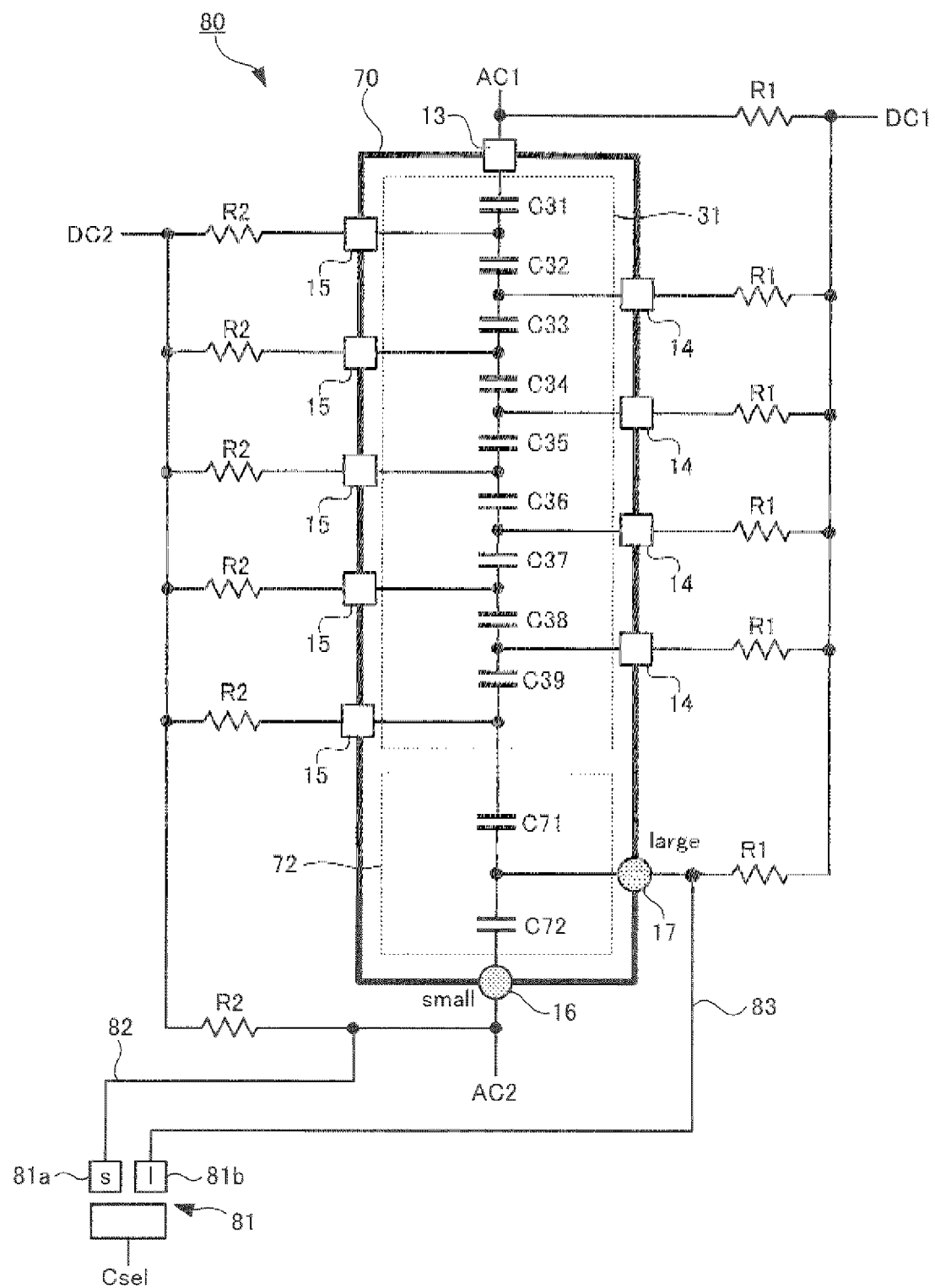
FIG. 20 is a schematic diagram of a packaged circuit on which a variable capacitance element according to Modified Example 4 is mounted.

FIG. 20 illustrates a schematic configuration of a variable capacitance element 70 according to Modified Example 4 and a schematic configuration of a packaged circuit 80 on which said variable capacitance element 70 is mounted. It should be noted that, to simplify an explanation, FIG. 20 illustrates only a circuit portion connected to each of external terminals of the variable capacitance element 70. Furthermore, in the packaged circuit 80 illustrated in FIG. 20, the same reference signs are given to the same configuration components as those in the packaged circuit 60 of the above-mentioned third embodiment illustrated in FIG. 17, and an explanation on those configuration components will be omitted.

The variable capacitance element 70 comprises a capacitor body unit 31 (an element body unit) and a compensation unit 72 serially connected to said capacitor body unit 31. The variable capacitance element 70 further comprises an external terminal for signals 13 (a first external terminal for signals), four first external terminals for control 14 (external terminals for control), and five second external terminals for control 15 (external terminals for control). The variable capacitance element 70 further comprises two external terminals for compensation (a first external terminal for compensation 16 and a second external terminal for compensation 17: an external terminal for capacitance compensation and a second external terminal for signals).

The capacitor body unit 31 comprises nine variable-capacitance capacitor units (a first variable-capacitance capacitor unit C31 to a ninth variable-capacitance capacitor unit C39), and has the same configuration as that of the variable capacitance element 30 of the second embodiment (FIG. 13).

The compensation unit 72 comprises two variable-capacitance capacitors for compensation (a first compensation capacitor unit C71 and a second compensation capacitor unit C72). It should be noted that, in the present embodiment, the first compensation capacitor unit C71 and the second compensation capacitor unit C72 are serially connected.

An end portion, on the side of the first compensation capacitor unit C71, of a series circuit comprising the first compensation capacitor unit C71 and the second compensation capacitor unit C72 is connected to the ninth variable-capacitance capacitor unit C39 of the capacitor body unit 31.

Furthermore, an end portion, on the side of the second compensation capacitor unit C72, of said series circuit comprising the first compensation capacitor unit C71 and the second compensation capacitor unit C72 is connected to the first external terminal for compensation 16. A connection point between the first compensation capacitor unit C71 and the second compensation capacitor unit C72 is connected to the second external terminal for compensation 17.

Although not illustrated in FIG. 20, the first compensation capacitor unit C71 and the second compensation capacitor unit C72 are configured as a laminated capacitor in which two dielectric layers (a second dielectric layer) are laminated with an electrode layer sandwiched therebetween. Furthermore, depending on a method for producing the dielectric layer constituting each of the compensation capacitor units, the dielectric layer may comprise one dielectric film, or may comprise a plurality of dielectric films laminated.

In this Modified Example, the dielectric layers (a first dielectric layer) constituting each of the variable-capacitance capacitor units inside the capacitor body unit 31 and the dielectric layers (the second dielectric layer) constituting each of the compensation capacitor units inside the compensation unit 72 are formed of the same ferroelectric material. Furthermore, in this Modified Example, the variable capacitance element 70 is configured by laminating the first variable-capacitance capacitor unit C31 to the ninth variable-capacitance capacitor unit C39 and the first compensation capacitor unit C71 and the second compensation capacitor unit C72. Furthermore, in this Modified Example, the first variable-capacitance capacitor unit C31 to the ninth variable-capacitance capacitor unit C39, the first compensation capacitor unit C71, and the second compensation capacitor unit C72 each have the same capacitance.

(2) Configuration Example of Packaged Circuit

The packaged circuit 80 comprises the variable capacitance element 70 and a selection unit 81. The packaged circuit 80 further comprises a first external wiring 82 electrically connecting between the first external terminal for compensation 16 of the variable capacitance element 70 and the selection unit 81, and a second external wiring 83 electrically connecting between the second external terminal for compensation 17 of the variable capacitance element 70 and the selection unit 81. The packaged circuit 80 further comprises six first bias resistances R1 and six second bias resistances R2.

It should be noted that each of the first bias resistances R1 is provided between a corresponding one of the external terminals of the variable capacitance element 70 (any of the external terminal for signals 13, the first external terminals for control 14, and the second external terminals for compensation 17) and one output terminal (DC1) of a power supply for control voltage. Furthermore, each of the second bias resistances R2 is provided between a corresponding one of the external terminals of the variable capacitance element 70 (any of the second external terminals for control 15 and the first external terminal for compensation 16) and another output terminal (DC2) of the power supply for control voltage. It should be noted that each of the bias resistances may be configured in the same manner as in the above-mentioned first embodiment.

In the packaged circuit 80, as illustrated in FIG. 20, the first external wiring 82 connects a connection point between the first external terminal for compensation 16 and a corresponding one of the second bias resistances R2 to a first selection terminal 81a of the selection unit 81. On the other hand, the second external wiring 83 connects a connection point between the second external terminal for compensation 17 and a corresponding one of the first bias resistances R1 to a second selection terminal 81*b* of the selection unit 81. It should be noted that the selection unit 81 is a circuit unit configured to change a connection state of the compensation capacitor units inside the compensation unit 72. Specifically, the selection unit 81 is configured to change a connection state of the compensation capacitor units inside the compensation unit 72 by changing a connection state between the first selection terminal 81*a* and the second selection terminal 81*b* at the time of compensation for capacitance variation of the variable capacitance element 70.

Also in the packaged circuit 80 having the above-mentioned configuration, as in the case of the above-mentioned third embodiment, the selection unit 81 enables a range of capacitance variation of the variable capacitance element 70 to be reduced to a desired range after the mounting of the variable capacitance element 70. That is, also in this Modified Example, the capacitance variation (or the capacitance itself) of the variable capacitance element 70 can be compensated (adjusted) on the packaged circuit, and thus, the same effects as those achieved in the above-mentioned first embodiment can be obtained.

MODIFIED EXAMPLE 5

In the above-mentioned third embodiment, there was described an example of in which a connection state of the compensation unit was changed by the selection unit provided in the packaged circuit, whereby the capacitance variation of the variable capacitance element was compensated, but, the present disclosure is not limited to this example. For example, in the same manner as in the above-mentioned first and second embodiments, the capacitance variation of a variable capacitance element may be compensated by cutting or connecting the pattern of external wiring between a plurality of the external terminals for compensation. In Modified Example 5, an example of such will be described.

(1) Modified Example 5-1

Figure 21:
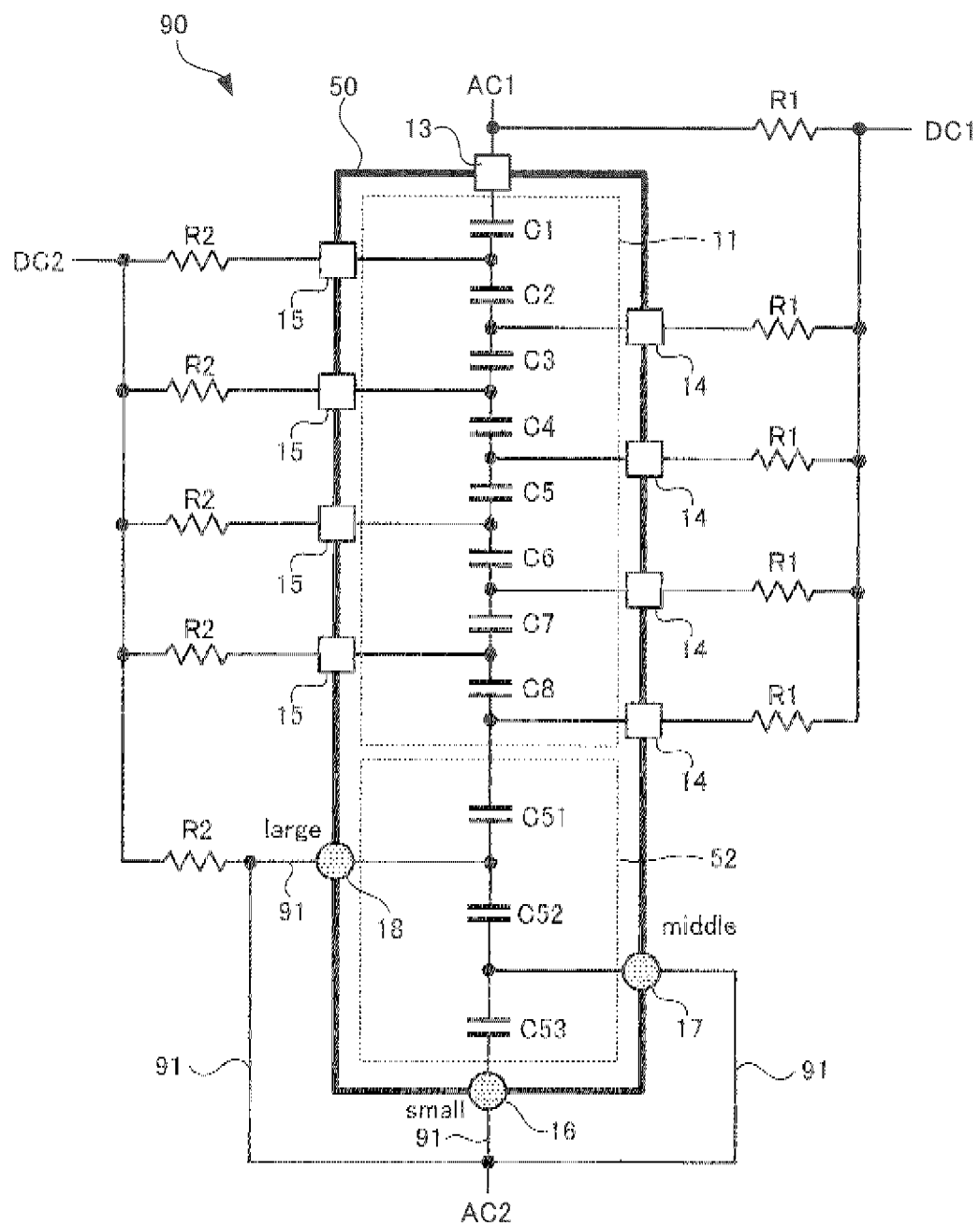
FIG. 21 is a schematic diagram of a packaged circuit on which a variable capacitance element according to Modified Example 5-1 is mounted.

FIG. 21 illustrates a variable capacitance element 50 in this Modified Example and a first configuration example (Modified Example 5-1) of a packaged circuit on which said variable capacitance element 50 is mounted. Furthermore, in the packaged circuit 90 illustrated in FIG. 21, the same reference signs are given to the same configuration components as those in the packaged circuit 60 of the above-mentioned third embodiment illustrated in FIG. 17. As clearly understood from a comparison between FIG. 21 and FIG. 17, the variable capacitance element 50 in this Modified Example has the same configuration as that of the third embodiment, and therefore here, an explanation about the configuration of the variable capacitance element 50 will be omitted.

The packaged circuit 90 in this Modified Example comprises the variable capacitance element 50, five first bias resistances R1, and five second bias resistances R2.

It should be noted that each of the first bias resistances R1 is provided between a corresponding one of the external terminals of the variable capacitance element 50 (any of the external terminal for signals 13 and the first external terminals for control 14) and one output terminal (DC1) of a power supply for control voltage. Each of the second bias resistances R2 is provided between a corresponding one of the external terminals of the variable capacitance element 50 (any of the second external terminals for control 15, the first external terminal for compensation 16, and the third external terminal for compensation 18) and another output terminal (DC2) of the power supply for control voltage. It should be noted that each of the bias resistances may be configured in the same manner as in the above-mentioned first embodiment.

As illustrated in FIG. 21, the packaged circuit 90 further comprises external wiring 91 configured to establish a short-circuit between the first external terminal for compensation 16 to the third external terminal for compensation 18 of the variable capacitance element 50 and to electrically connect each of the external terminals for compensation to a corresponding one of the second bias resistances R2. In other words, as is the case with the above-mentioned first embodiment, in the packaged circuit 90 of this Modified Example, when the variable capacitance element 50 is mounted on the packaged circuit 90, there is established a state (a large-capacitance connection state) in which the first external terminal for compensation 16 to the third external terminal for compensation 18 are connected to each other via the external wiring 91.

Then, in the packaged circuit 90 of this Modified Example, in the same manner as in the above-mentioned first embodiment (the above-mentioned first compensation), while the capacitance of each of the external terminals for compensation is measured, the wiring pattern of the external wiring 91 is suitably cut, whereby the capacitance variation of the variable capacitance element 50 is compensated.

More specifically, first, in a connection state illustrated in FIG. 21, both terminals of a second compensation capacitor unit C52 and both terminals of a third compensation capacitor C53 are at the same AC potential and also at the same DC potential, and hence, these two compensation capacitor units do not operate as capacitance elements. Therefore, in the connection state illustrated in FIG. 21, only a first compensation capacitor unit C51 acts as a capacitance element in the compensation unit 52, and accordingly, the variable capacitance element 50 reaches a maximum capacitance (a large-capacitance connection state). However, when the wiring pattern of the external wiring 91 configured to connect the third external terminal for compensation 18 to a corresponding one of the second bias resistances R2 is cut, the first compensation capacitor unit C51 and the second compensation capacitor unit C52 act as capacitance elements in the compensation unit 52 (a middle-capacitance connection state). Furthermore, in the middle-capacitance connection state, only the third compensation capacitor unit C53 does not operate as a capacitance element.

In this case, the combined capacitance of a capacitor formed by serially connecting the first compensation capacitor unit C51 to the second compensation capacitor unit C52 serves as a variable capacitance in the compensation unit 52. It should be noted that, at this time, a control voltage actually applied to each of the compensation capacitor units is one-half of a control voltage applied to each of variable-capacitance capacitor units in the capacitor body unit 11. That is, in this configuration example, a compensation capacitance value and bias dependence (capacitance variation) in the compensation unit 52 differ from those of the above-mentioned third embodiment illustrated in FIG. 17.

Furthermore, when the wiring pattern of the external wiring 91 configured to connect the second external terminal for compensation 17 to a corresponding one of the second bias resistances R2 is cut, the first compensation capacitor unit C51 to the third compensation capacitor unit C53 act as capacitance elements in the compensation unit 52 (a small-capacitance connection state). In this case, the combined capacitance of a capacitor formed by serially connecting all of the first compensation capacitor unit C51 to the third compensation capacitor unit C53 serves as a variable capacitance in the compensation unit 52. It should be noted that, at this time, a control voltage actually applied to each of the compensation capacitor units is one-third of a control voltage applied to each of the variable capacitor units in the capacitor body unit 11.

As mentioned above, in this configuration example, when the capacitance of the variable capacitance element 50 is compensated by cutting the wiring pattern of the external wiring 91, the compensation capacitance value varies with the number of the compensation capacitor units acting as capacitive elements in the compensation unit 52. Furthermore, in this configuration example, an increase in the number of the compensation capacitor units acting as capacitive elements in the compensation unit 52 causes a smaller variable range of compensation capacitance in the compensation unit 52. However, also in Modified Example 5-1, the initial capacitance of the variable capacitance element 50 can be compensated by changing a connection state of the compensation unit 52, and consequently, the same effects as those achieved in the above-mentioned first embodiment can be obtained.

(2) Modified Example 5-2

Figure 22:
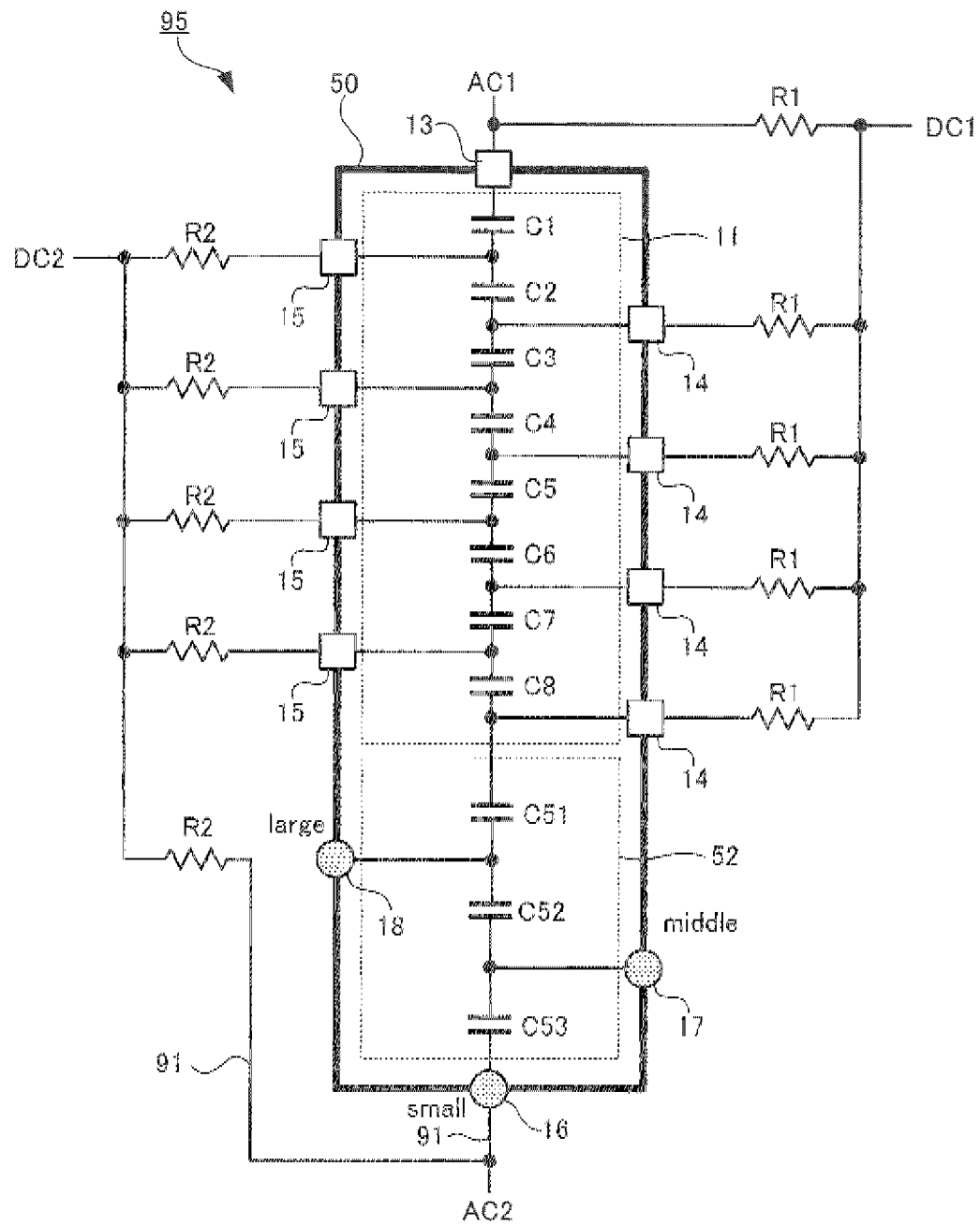
FIG. 22 is a schematic diagram of a packaged circuit on which a variable capacitance element according to Modified Example 5-2 is mounted.

FIG. 22 illustrates a variable capacitance element 50 in this Modified Example and a second configuration example (Modified Example 5-2) of a packaged circuit on which said variable capacitance element 50 is mounted. Furthermore, in the packaged circuit 95 of Modified Example 5-2 illustrated in FIG. 22, the same reference signs are given to the same configuration components as those in the packaged circuit 90 of the above-mentioned Modified Example 5-1 illustrated in FIG. 21.

As clearly understood from a comparison between FIG. 21 and FIG. 22, in this Modified Example, the wiring pattern of the external wiring 91 formed at the time when the variable capacitance element 50 is mounted on the packaged circuit 95 differs from that of the above-mentioned Modified Example 5-1. Therefore, only the wiring pattern of the external wiring 91 will be described here.

This Modified Example has a configuration such that, when the variable capacitance element 50 is mounted on the packaged circuit 95, only the first external terminal for compensation 16 of the variable capacitance element 50 is connected to a corresponding one of the second bias resistances R2 and the other AC signal terminal (AC2) via the external wiring 91. That is, in the packaged circuit 95 of this Modified Example, when the variable capacitance element 50 is mounted on the packaged circuit 95, the compensation capacitor units in the compensation unit 52 are in a small-capacitance connection state.

Then, in the packaged circuit 95 of this Modified Example, in the same manner as in the above-mentioned first embodiment (the above-mentioned second compensation), while the capacitance of each of the external terminals for compensation is measured, a plurality of the external terminals for compensation is suitably connected (pattern connecting) to each other by the external wiring 91, whereby the capacitance variation of the variable capacitance element 50 is compensated.

It should be noted that, in this case, a change in the wiring pattern of the external wiring 91 leads to a change in the number of the compensation capacitor units acting as capacitive elements in the compensation unit 52. Therefore, as is the case with the above-mentioned Modified Example 5-1, also in this Modified Example, a compensation capacitance value and bias dependence (capacitance variation) in the compensation unit 52 differ from those of the above-mentioned third embodiment illustrated in FIG. 17. However, also in Modified Example 5-2, the initial capacitance of the variable capacitance element 50 can be compensated by changing a connection state of the compensation unit 52, and consequently, the same effects as those achieved in the above-mentioned first embodiment can be obtained.

It should be noted that the above-mentioned third embodiment has a configuration such that bias resistances are connected to both terminals of each of the compensation capacitor units in the compensation unit 52 of the variable capacitance element 50, and hence, regardless of a connection state of the compensation capacitor units in the compensation unit 52, a control voltage applied to each of the compensation capacitor units is constant. In other words, in the above-mentioned third embodiment, regardless of a connection state of the compensation capacitor units in the compensation unit 52, the variable capacitance of each of the compensation capacitor units is constant.

On the other hand, the above-mentioned Modified Example 5 has a configuration such that bias resistances are connected only to both terminals of a series circuit comprising a plurality of compensation capacitor units in the compensation unit 52, and therefore, a control voltage applied to each of the compensation capacitor units varies with a connection state of the compensation capacitor units in the compensation unit 52. In other words, in the above-mentioned Modified Example 5, the variable capacitance of each of the compensation capacitor units differs depending on a connection state of the compensation capacitor units in the compensation unit 52. Therefore, in the above-mentioned Modified Example 5, the number of the compensation capacitor units, the capacitance of each of the compensation capacitor units, the configuration of the capacitor body unit 11, and the like are suitably determined in consideration of a relationship between a connection state of the compensation capacitor units in the compensation unit 52 and the variable capacitance of each of the compensation capacitor units.

<5. Fourth Embodiment: Configuration Example of Parallel-connected Type Variable Capacitance Element>

In a fourth embodiment, there will be described a configuration example in which a capacitor body unit and a compensation unit of a variable capacitance element are connected in parallel (refer to FIG. 1 (b)).

[Configuration of Variable Capacitance Element]

Figure 23:
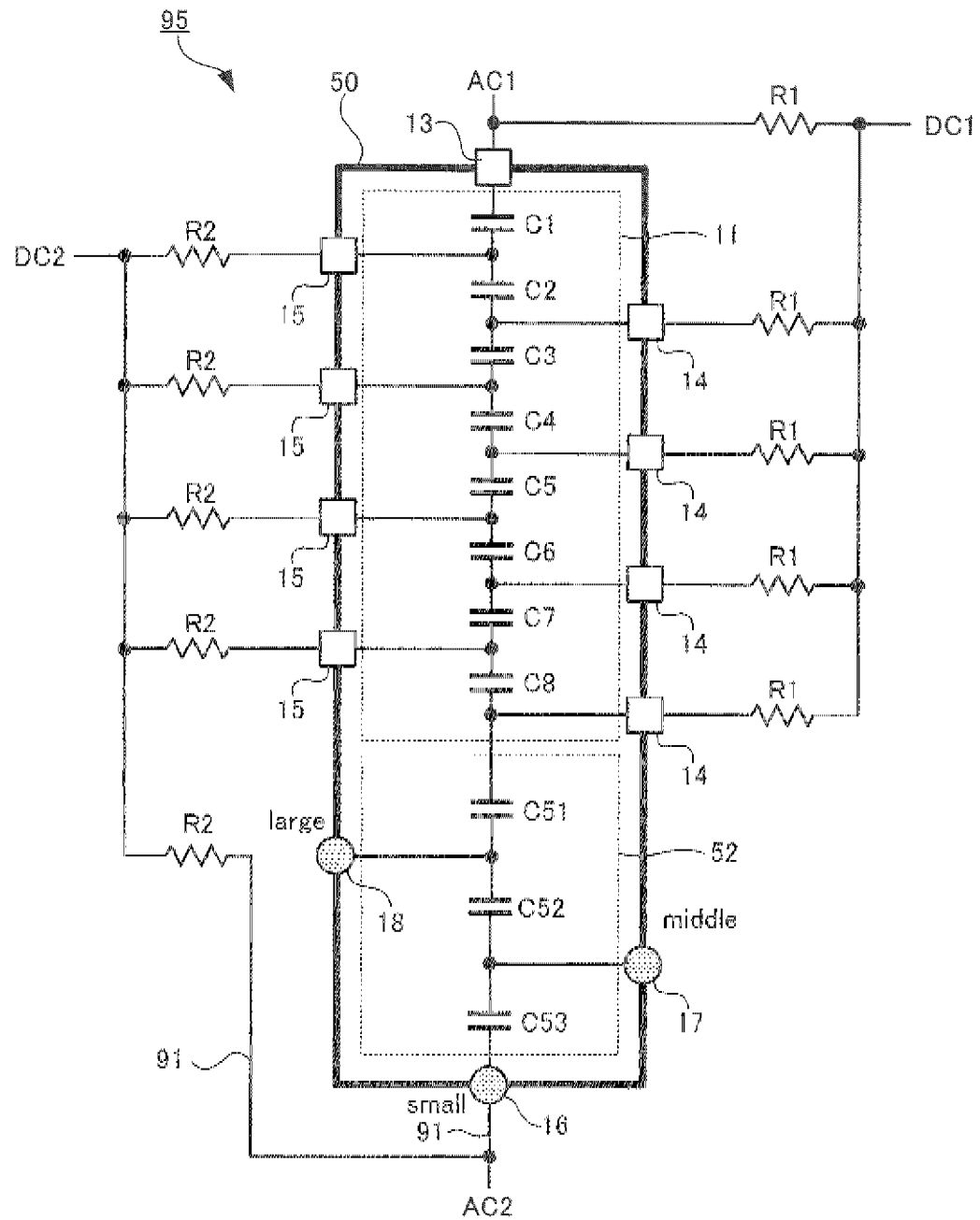
FIG. 23 is a schematic diagram of a packaged circuit on which a variable capacitance element according to a fourth embodiment is mounted.

FIG. 23 illustrates a schematic configuration of a variable capacitance element 100 according to the fourth embodiment and a schematic configuration of a packaged circuit 110 on which said variable capacitance element 100 is mounted. It should be noted that, to simplify an explanation, FIG. 23 illustrates only a circuit portion connected to each of external terminals of the variable capacitance element 100. Furthermore, in the variable capacitance element 100 and the packaged circuit 110 illustrated in FIG. 23, the same reference signs are given to the same configuration components as those in the variable capacitance element 10 and the packaged circuit 20 of the above-mentioned first embodiment illustrated in FIG. 4, and an explanation on those configuration components will be omitted.

The variable capacitance element 100 comprises a capacitor body unit 101 (an element body unit) and a compensation unit 102. The variable capacitance element 100 further comprises an external terminal for signals 13 (a first external terminal for signals), two second external terminals for control 15, a first external terminal for compensation 16 (a second external terminal for signals), and a second external terminal for compensation 17 (an external terminal for capacitance compensation).

The capacitor body unit 101 comprises two variable-capacitance capacitors (a first variable-capacitance capacitor unit C91 and a second variable-capacitance capacitor unit C92: a first variable capacitor unit). It should be noted that the first variable-capacitance capacitor unit C91 and the second variable-capacitance capacitor unit C92 are serially connected. Furthermore, a connection point between the first variable-capacitance capacitor unit C91 and the second variable-capacitance capacitor unit C92 is connected to a corresponding one of the second external terminals for control 15.

Furthermore, an end portion, on the side of the first variable-capacitance capacitor unit C91, of a series circuit comprising the two variable-capacitance capacitor units is connected to the external terminal for signals 13, meanwhile, an end portion, on the side of the second variable-capacitance capacitor unit C92, of said series circuit is connected to the first external terminal for compensation 16. It should be noted that the connections between a plurality of the variable-capacitance capacitor units and the connections between each of the variable-capacitance capacitor units and a corresponding one of the external terminals are performed by internal wiring.

The compensation unit 102 comprises two variable-capacitance capacitors for compensation (a first compensation capacitor unit C93 and a second compensation capacitor unit C94: a second variable capacitor unit). It should be noted that, in the present embodiment, the first compensation capacitor unit C93 and the second compensation capacitor unit C94 are serially connected.

A connection point between the first compensation capacitor unit C93 and the second compensation capacitor unit C94 is connected to a corresponding one of the second external terminals for control 15. Furthermore, an end portion, on the side of the first compensation capacitor unit C93, of a series circuit comprising the two compensation capacitor units is connected to the external terminal for signals 13, meanwhile, an end portion, on the side of the second compensation capacitor unit C94, of said series circuit is connected to the second external terminal for compensation 17. It should be noted that the connections between a plurality of the variable-capacitance capacitor units and the connections between each of the variable-capacitance capacitor units and a corresponding one of the external terminals are performed by internal wiring.

Although not illustrated in FIG. 23, the first variable-capacitance capacitor unit C91 and the second variable-capacitance capacitor unit C92 are configured as a laminated capacitor in which two dielectric layers (a first dielectric layer) are laminated with an electrode layer sandwiched therebetween. Furthermore, depending on a method for producing the dielectric layers constituting each of the variable capacitor units, the dielectric layer may comprise one dielectric film, or may comprise a plurality of dielectric films laminated.

The first compensation capacitor unit C93 and the second compensation capacitor unit C94 are configured as a laminated capacitor in which two dielectric layers (a second dielectric layer) are laminated with an electrode layer sandwiched therebetween. It should be noted that, depending on a method for producing the dielectric layers constituting each of the compensation capacitor units, the dielectric layer may comprise one dielectric film, or may comprise a plurality of dielectric films laminated. Furthermore, in the present embodiment, the dielectric layers constituting each of the variable-capacitance capacitor units inside the capacitor body unit 101 and the dielectric layers constituting each of the compensation capacitor units inside the compensation unit 102 are formed of the same ferroelectric material.

In the present embodiment, the variable capacitance element 100 is configured by laminating the first variable-capacitance capacitor unit C91 and the second variable-capacitance capacitor unit C92, and the first compensation capacitor unit C93 and the second compensation capacitor unit C94. Furthermore, in the present embodiment, the first variable-capacitance capacitor unit C91 and the second variable-capacitance capacitor unit C92 have the same capacitance. The capacitance of each of the first compensation capacitor unit C93 and the second compensation capacitor unit C94 is made smaller than the capacitance of each of the first variable-capacitance capacitor unit C91 and the second variable-capacitance capacitor unit C92, for example, is made approximately one-tenth of the capacitance thereof It should be noted that the number of the compensation capacitor units provided in the compensation unit 102 and the capacitance of each of said compensation capacitor units may be suitably determined in consideration of, for example, a necessary compensation-range of capacitance and a necessary capacitance of the whole of the variable capacitance element.

[Configuration Example of Packaged Circuit]

As illustrated in FIG. 23, the packaged circuit 110 of the present embodiment comprises the variable capacitance element 100, and external wiring 111 configured to electrically connect the first external terminal for compensation 16 and the second external terminal for compensation 17 of the variable capacitance element 100. The packaged circuit 110 further comprises two first bias resistances R1 and two second bias resistances R2.

In the packaged circuit 110 of the present embodiment, when the variable capacitance element 100 is mounted on the packaged circuit 110, the external terminal for signals 13 is connected to one AC-signal terminal (AC1) and a corresponding one of the first corresponding bias resistances R1. Meanwhile, at this time, both of the first external terminal for compensation 16 and the second external terminal for compensation 17 are connected to another AC-signal terminal (AC2) and a corresponding one of the first bias resistances R1 via the external wiring 111.

Each of the first bias resistances R1 is provided between a corresponding one of the external terminals of the variable capacitance element 100 (any of the external terminal for signals 13, the first external terminal for compensation 16, and the second external terminal for compensation 17) and one output terminal (DC1) of a power supply for control voltage. Meanwhile, each of the second bias resistances R2 is provided between a corresponding one of the second external terminals for control 15 of the variable capacitance element 100 and another output terminal (DC2) of the power supply for control voltage.

In the present embodiment, as illustrated in FIG. 23, when the variable capacitance element 100 is mounted on the packaged circuit 110, there is brought about a state in which the first external terminal for compensation 16 and the second external terminal for compensation 17 are connected to a corresponding one of the first bias resistances R1 and the other AC signal terminal (AC2) via the external wiring 111. Accordingly, in the present embodiment, when the variable capacitance element 100 is mounted on the packaged circuit 110, the packaged circuit 110 is brought into a large-capacitance connection state.

[Compensation for Capacitance Variation]

Compensation for capacitance variation in the packaged circuit 110 of the present embodiment is performed as follows. First, in the large-capacitance connection state as illustrated in FIG. 23, the capacitance of any one of the first external terminal for compensation 16 and the second external terminal for compensation 17 is measured. Then, when the measured capacitance is in a determined range of capacitance variation, the compensation is terminated while the large-capacitance connection state as illustrated in FIG. 23 is maintained.

On the other hand, when the measured capacitance is not in the determined range of capacitance variation, a wiring pattern portion of the external wiring 111 configured to electrically connect the first external terminal for compensation 16 and the second external terminal for compensation 17 is cut, whereby the connection state of the variable capacitance element 100 is changed to a small-capacitance connection state. Next, the capacitance of the first external terminal for compensation 16 is measured.

Then, when the measured capacitance is in the determined range of capacitance variation, the compensation is terminated while the small-capacitance connection state is maintained. It should be noted that, when the capacitance of the first external terminal for compensation 16 of the variable capacitance element 100 measured in the small-capacitance connection state is not in the determined range of capacitance variation, the variable capacitance element 100 having undergone the compensation is disposed of as a defective product. In the present embodiment, the capacitance variation of the variable capacitance element 100 is thus compensated.

As mentioned above, also in the present embodiment, while the capacitance of each of the external terminals for compensation is measured, the wiring pattern of the external wiring 111 is suitably cut, whereby the capacitance variation of the variable capacitance element 100 is compensated. Consequently, also in the present embodiment, the same effects as those achieved in the above-mentioned first embodiment can be obtained.

MODIFIED EXAMPLE 6

(1) Configuration of Packaged Circuit

Figure 24:
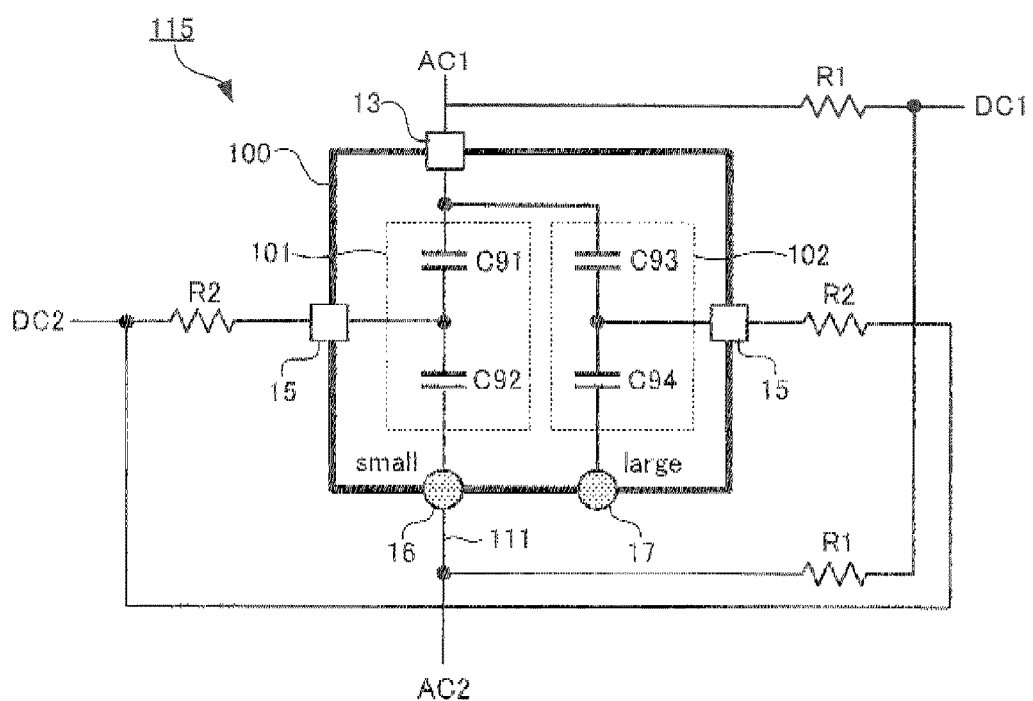
FIG. 24 is a schematic diagram of a packaged circuit on which a variable capacitance element according to Modified Example 6 is mounted.

FIG. 24 illustrates a variable capacitance element 100 according to Modified Example 6 and a configuration example of a packaged circuit on which said variable capacitance element 100 is mounted. It should be noted that, in the packaged circuit 115 of Modified Example 6 illustrated in FIG. 24, the same reference signs are given to the same configuration components as those in the packaged circuit 110 of the above-mentioned fourth embodiment illustrated in FIG. 23.

As clearly understood from a comparison between FIG. 24 and FIG. 23, in this Modified Example, the wiring pattern of the external wiring 111 formed at the time when the variable capacitance element 100 is mounted on the packaged circuit 115 differs from that of the above-mentioned fourth embodiment. Therefore, only the wiring pattern of the external wiring 111 will be described here.

In this Modified Example, when the variable capacitance element 100 is mounted on the packaged circuit 115, only the first external terminal for compensation 16 of the variable capacitance element 100 is connected to a corresponding one of the first bias resistances R1 and the other AC signal terminal (AC2) via the external wiring 111. In other words, in the packaged circuit 115 of this Modified Example, when the variable capacitance element 100 is mounted on the packaged circuit 115, the packaged circuit 115 is in a small-capacitance connection state.

(2) Compensation for Capacitance Variation

Compensation for capacitance variation in the packaged circuit 115 of this Modified Example is performed as follows. First, in a small-capacitance connection state illustrated in FIG. 24, the capacitance of the first external terminal for compensation 16 is measured. Next, when the measured capacitance is in a determined range of capacitance variation, the compensation is terminated while the small-capacitance connection state illustrated in FIG. 24 is maintained.

On the other hand, when the measured capacitance is not in the determined range of capacitance variation, as illustrated in FIG. 23, the first external terminal for compensation 16 and the second external terminal for compensation 17 are electrically connected (pattern connecting) via the external wiring 111, whereby the connection state of the variable capacitance element 100 is changed to a large-capacitance connection state.

Next, the capacitance of the first external terminal for compensation 16 or the second external terminal for compensation 17 is measured. Then, when the measured capacitance is in the determined range of capacitance variation, the compensation is terminated while the large-capacitance connection state is maintained. It should be noted that, when the capacitance of the variable capacitance element 100 measured in the large-capacitance connection state is not in the determined range of capacitance variation, the variable capacitance element 100 having undergone the compensation is disposed of as a defective product. In this Modified Example, the capacitance variation of the variable capacitance element 100 is thus compensated.

As mentioned above, in Modified Example 6, while the capacitance of each of the external terminals for compensation is measured, a plurality of the external terminals for compensation are suitably connected to each other via the external wiring 111, whereby the capacitance variation of the variable capacitance element 100 can be compensated. Consequently, also in the present embodiment, the same effects as those achieved in the above-mentioned first embodiment can be obtained.

MODIFIED EXAMPLE 7

In the above-mentioned embodiments and Modified Examples, there were described an example in which a compensation unit comprises a plurality of compensation capacitor units, but, the present disclosure is not limited to this example, a compensation unit may comprise one compensation capacitor unit.

It should be noted that, in this case, for example, as an external terminal for compensation, there is used an external terminal for control which is connected to a compensation-unit-side end portion of a capacitor body unit in the series-connected type variable capacitance element (packaged circuit) shown in the above-mentioned first to third embodiments (FIGS. 4, 13, and 17). More specifically, as an external terminal for compensation, there is used the first external terminal for control 14 which is connected to the eighth variable-capacitance capacitor unit C8 of the capacitor body unit 11 in the above-mentioned first and third embodiments (FIG. 4 and FIG. 17). As an external terminal for compensation, there is used the second external terminal for control 15 which is connected to the ninth variable-capacitance capacitor unit C39 of the capacitor body unit 31 in the above-mentioned second embodiment (FIG. 13).

In the case where one compensation capacitor unit constitutes the compensation unit 102 in the parallel-connected type variable capacitance element 100 (the packaged circuit 110) shown in the above-mentioned fourth embodiment (FIG. 23), it is beneficial to omit the second external terminal for control 15 connected to the compensation unit 102.

<6. Various Application Examples>

The above-mentioned variable capacitance element according to the present disclosure and the above-mentioned technique of compensation for capacitance variation are applicable to any system and any apparatus (electronic apparatus) as long as said system and said apparatus each require the capacitance of the variable capacitance element to be adjusted by applying a DC control voltage to the variable capacitance element. Hereinafter, various Application Examples of the variable capacitance element according to the present disclosure will be described.

[Application Example 1: Communication Apparatus]

First, in Application Example 1, there will be described an example in which a variable capacitance element according to each of the above-mentioned embodiments and Modified Examples is applied to, for example, a communication apparatus, such as an information processing terminal equipped with a non-contact communication function.

Figure 25:
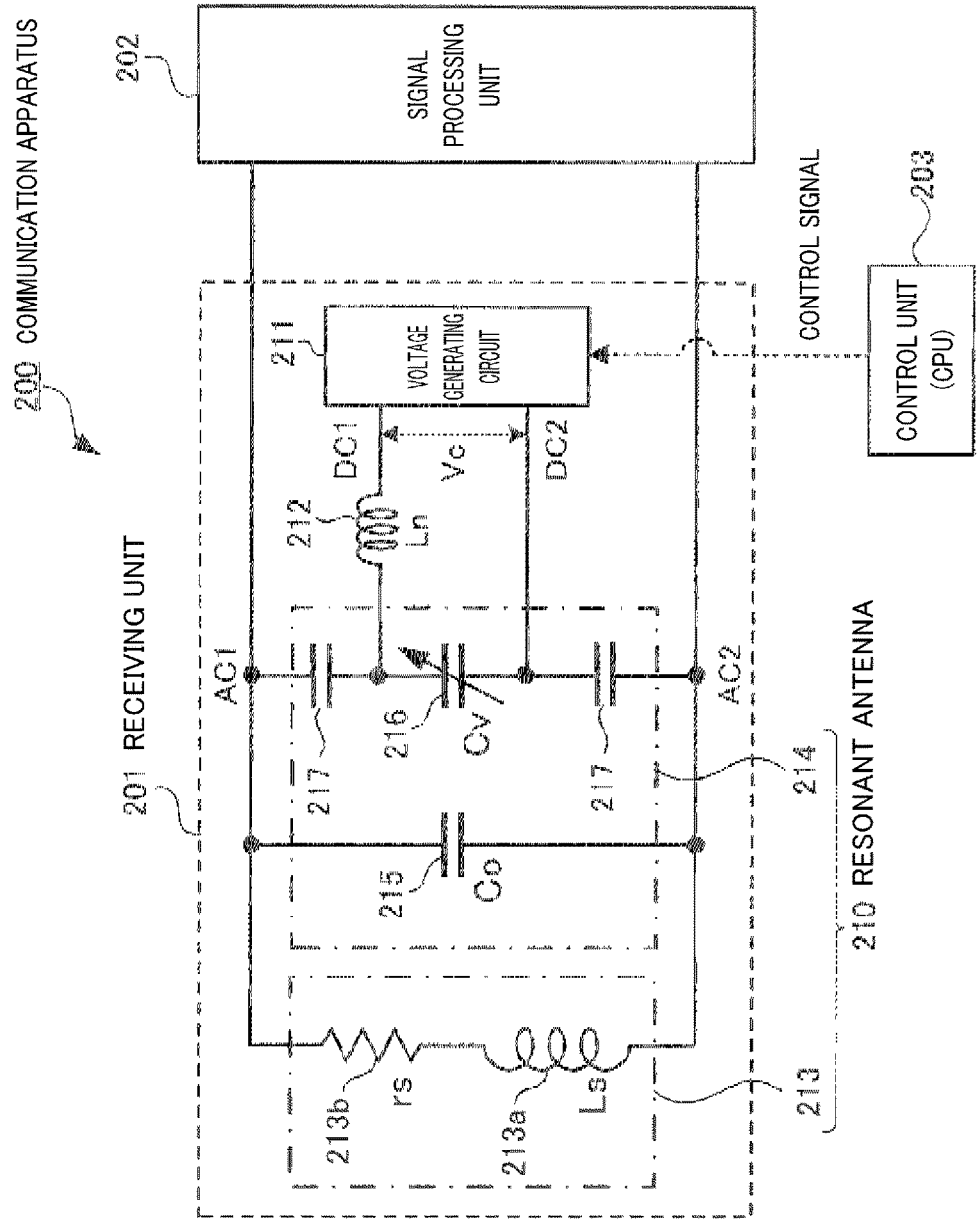
FIG. 25 is a schematic diagram of a communication apparatus (Application Example 1) including a variable capacitance element according to the present disclosure.

FIG. 25 illustrates a schematic circuit configuration of a communication apparatus according to Application Example 1. It should be noted that, to simplify an explanation, FIG. 25 illustrates only the configuration of a receiving (demodulating) circuit unit of the communication apparatus 200. Other configuration components including a signal-transmitting (-modulating) circuit unit may be the same as those of conventional communication apparatuses.

The communication apparatus 200 comprises a receiving unit 201, a signal processing unit 202, and a control unit 203.

The receiving unit 201 has a resonant antenna 210 (a resonant circuit, a receiving antenna unit, a communication unit), a voltage generating circuit 211 configured to apply a DC control voltage Vc to the resonant antenna 210, and a coil 212. It should be noted that the receiving unit 201 of this Application Example receives, for example, a signal in the resonant antenna 210, the signal being transmitted from an external R/W apparatus (not illustrated) by non-contact communication, and outputs the received signal to the signal processing unit 202.

The resonant antenna 210 has a resonant coil 213 and a resonant capacitor 214. The resonant coil 213 comprises an element, such as a spiral coil. Furthermore, an equivalent circuit of the resonant coil 213 is expressed by a series circuit of an inductance component 213$a$ (Ls) and a resistance component 213$b$ (rs: approximately several ohms) of the resonant coil 213.

The resonant capacitor 214 comprises a fixed-capacitance capacitor 215 having a capacitance Co, a variable capacitor 216, and two bias-removal capacitors 217 each being connected to a corresponding one of both terminals of the variable capacitor 216. The fixed-capacitance capacitor 215 and a series circuit comprising the variable capacitor 216 and the two bias-removal capacitors 217 are connected to the resonant coil 213 in parallel.

In other words, the resonant antenna 210 of this Application Example is a tunable resonant antenna in which variable capacitor 216 constitutes a part of the resonant capacitor 214. Furthermore, the resonance frequency of the resonant antenna 210 of this Application Example is calculated by $(LC)^{1/2}$, where L represents an inductance of the whole of the resonant coil 213 and C represents a capacitance of the whole of the resonant capacitor 214. It should be noted that the inductance L of the whole of the resonant coil 213 is determined by, for example, characteristics of a spiral coil (antenna) and a magnetic sheet (not illustrated) provided on the spiral coil. The capacitance C of the whole of the resonant capacitor 214 is determined mainly by a capacitance Co of the fixed-capacitance capacitor 215 and a capacitance Cv of the variable capacitor 216. However, in the case where the resonant coil 213 comprises a spiral coil, a line capacitance thereof is also taken into consideration.

Both terminals of the variable capacitor 216 are connected to two output terminals (DC1 and DC2) of the voltage generating circuit 211, respectively. In this Application Example, the one terminal of the variable capacitor 216 is connected to the one output terminal (DC1) of the voltage generating circuit 211 via the coil 212.

The variable capacitor 216 comprises the variable capacitance element according to the present disclosure, described in any of the above-mentioned embodiments and Modified Examples. The variable capacitance element according to the present disclosure is formed of a ferroelectric material having a high relative dielectric constant, and the capacitance Cv of the variable capacitance element varies with a control voltage Vc (a control voltage signal) applied from the voltage generating circuit 211. Specifically, the application of a control voltage Vc from the voltage generating circuit 211 causes a decrease in the capacitance Cv of the variable capacitor 216. Therefore, the application of a control voltage Vc causes the resonance frequency of the resonant antenna 210 to be higher.

The coil 212 is provided between one terminal of the variable capacitor 216 and one output terminal (DC1) of the voltage generating circuit 211. In this Application Example, an inductance Ln of the coil 212 is suitably set so that a circuit comprising the coil 212 and the variable capacitor 216 acts as a noise filter.

The signal processing unit 202 performs a predetermined processing for an AC signal received in the receiving unit 201, thereby demodulating the AC signal.

The control unit 203 comprises a circuit, such as a CPU (Central Processing Unit), configured to control all aspects of operation of the communication apparatus 200. In this Application Example, based on a control signal inputted into the voltage generating circuit 211 from a CPU (the control unit 203), a control voltage Vc to be applied to the variable capacitor 216 is adjusted, whereby the resonance frequency of the receiving unit 201 (the resonant antenna 210) is adjusted.

[Application Example 2: Communication System]

Next, there will be described an example (Application Example 2) in which a variable capacitance element according to each of the above-mentioned embodiments and Modified Examples is applied to a communication system configured to send and receive information by non-contact communication.

Figure 26:
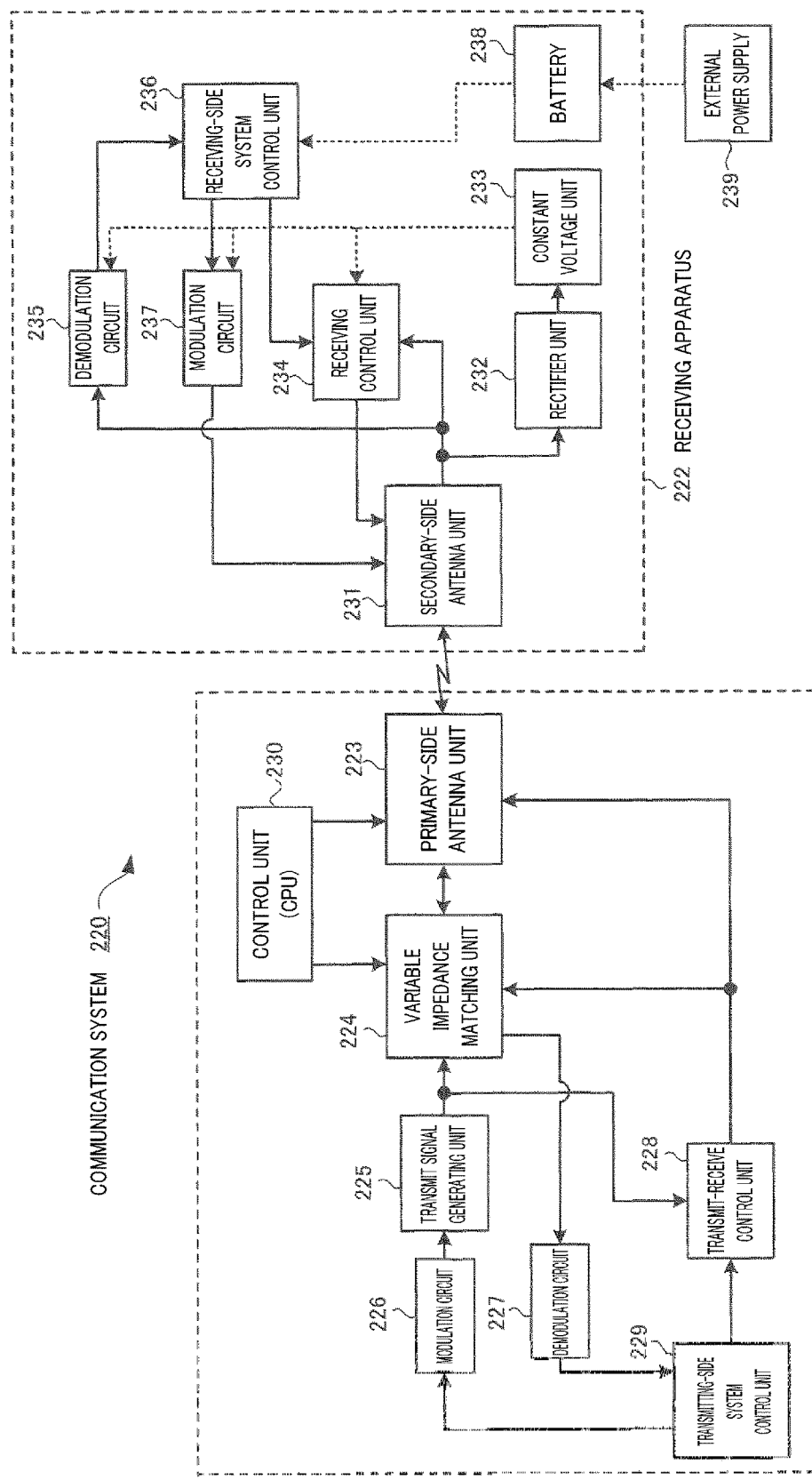
FIG. 26 is a schematic block diagram of a communication system (Application Example 2) including a variable capacitance element according to the present disclosure.

FIG. 26 illustrates a schematic block configuration of a communication system according to Application Example 2. It should be noted that, to simplify an explanation, FIG. 26 illustrates only the configuration of a principal part involved in non-contact communication. In FIG. 26, a solid line arrow represents wiring for input/output of information between each of circuit blocks, and a dotted line arrow represents wiring for supply of electric power.

The communication system 220 comprises a transmitting apparatus 221 and a receiving apparatus 222. In the communication system 220, information is transmitted and received between the transmitting apparatus 221 and the receiving apparatus 222 by non-contact communication. Examples of the communication system 220 having a configuration illustrated in FIG. 26 include a communication system in which a standard for noncontact IC cards, such as Felica (registered trademark), and a standard for near field communication (NFC) are applied in combination. Hereinafter, the configuration of each of the apparatuses will be described in detail.

(1) Transmitting Apparatus

The transmitting apparatus 221 has a reading/writing function of reading and writing data in a non-contact manner for the receiving apparatus 222. The transmitting apparatus 221 comprises a primary-side antenna unit (a transmitting antenna unit) 223, a variable impedance matching unit 224, a transmit signal generating unit 225, a modulation circuit 226, a demodulation circuit 227, a transmit-receive control unit 228, and a transmitting-side system control unit 229. The transmitting apparatus 221 further comprises a control unit 230 configured to control all aspects of operation of the transmitting apparatus 221.

The electrical connection relationships between each of the units in the transmitting apparatus 221 are as follows. The primary-side antenna unit 223 is connected to the variable impedance matching unit 224, thereby outputting and inputting a signal. Furthermore, one control terminal of the primary-side antenna unit 223 is connected to the transmit-receive control unit 228, meanwhile another control terminal of the primary-side antenna unit 223 is connected to the control unit 230.

An input terminal of the variable impedance matching unit 224 is connected to an output terminal of the transmit signal generating unit 225, meanwhile an output terminal of the variable impedance matching unit 224 is connected to an input terminal of the demodulation circuit 227. Furthermore, one control terminal of the variable impedance matching unit 224 is connected to the transmit-receive control unit 228, meanwhile another control terminal of the variable impedance matching unit 224 is connected to the control unit 230.

An input terminal of the transmit signal generating unit 225 is connected to an output terminal of the modulation circuit 226. An input terminal of the modulation circuit 226 is connected to one output terminal of the transmitting-side system control unit 229. An output terminal of the demodulation circuit 227 is connected to an input terminal of the transmitting-side system control unit 229. One input terminal of the transmit-receive control unit 228 is connected to an output terminal of the transmit signal generating unit 225, meanwhile another input terminal of the transmit-receive control unit 228 is connected to another output terminal of the transmitting-side system control unit 229.

Next, the configuration and function of each of the units of the transmitting apparatus 221 will be described. The primary-side antenna unit 223 has the same configuration as that of the receiving unit 201 (a resonant circuit unit) of the above-mentioned Application Example 1 (FIG. 25), and has a resonant circuit (a resonant antenna 210) comprising a resonant coil and a resonant capacitor, and a voltage generating circuit configured to adjust the capacitance of the resonant capacitor. The primary-side antenna unit 223 transmits a transmit signal having a desired frequency by the resonant circuit, and receives a response signal from the later-mentioned receiving apparatus 222. At this time, the voltage generating circuit adjusts the capacitance of the resonant capacitor so as to achieve a desired resonance frequency of the resonant circuit. In this Application Example, the variable capacitance element described in any of the above-mentioned embodiments and Modified Examples is applied to a variable capacitor (not illustrated) included in the primary-side antenna unit 223.

The variable impedance matching unit 224 is a circuit configured to match the impedance of the transmit signal generating unit 225 to that of the primary-side antenna unit 223. It should be noted that, although not illustrated in FIG. 26, the variable impedance matching unit 224 has a variable capacitor, and a voltage generating circuit configured to adjust the capacitance of said variable capacitor. In this Application Example, the adjustment of the capacitance of the variable capacitor by the voltage generating circuit achieves impedance matching between the transmit signal generating unit 225 and the primary-side antenna unit 223. It should be noted that, in this Application Example, the variable capacitance element described in any of the above-mentioned embodiments and Modified Examples is applied also to a variable capacitor included in the variable impedance matching unit 224.

The transmit signal generating unit 225 modulates a carrier signal having a desired frequency (for example, 13.56 MHz), based on transmit data inputted from the modulation circuit 226, and outputs said modulated carrier signal to the primary-side antenna unit 223 via the variable impedance matching unit 224.

The modulation circuit 226 modulates transmit data inputted from the transmitting-side system control unit 229, and outputs said modulated transmit data to the transmit signal generating unit 225.

The demodulation circuit 227 acquires a response signal received at the primary-side antenna unit 223, via the variable impedance matching unit 224, and demodulates said response signal. Then, the demodulation circuit 227 outputs the demodulated response data to the transmitting-side system control unit 229.

The transmit-receive control unit 228 monitors a communication state, such as a transmitting voltage, a transmitting current, and the like, of a carrier signal sent out to the variable impedance matching unit 224 from the transmit signal generating unit 225. Then, in accordance with the results of monitoring the communication state, the transmit-receive control unit 228 outputs a control signal to the variable impedance matching unit 224 and the primary-side antenna unit 223.

According to instructions from outside and built-in programs, the transmitting-side system control unit 229 generates a control signal for each control, and outputs said control signal to the modulation circuit 226 and the transmit-receive control unit 228, thereby controlling the operation of both of the circuit units. The transmitting-side system control unit 229 produces transmit data responsive to a control signal (a command signal), and provides said transmit data to the modulation circuit 226. Furthermore, the transmitting-side system control unit 229 performs a predetermined processing, based on the response data demodulated in the demodulation circuit 227.

The control unit 230 comprises a circuit, such as CPU. Each of a plurality of output terminals of CPU (the control unit 230) is connected to a corresponding one of input terminals of the voltage generating circuits in the variable impedance matching unit 224 and the primary-side antenna unit 223. The control unit 230 outputs a control signal inputted to the variable impedance matching unit 224 and the primary-side antenna unit 223 from the transmit-receive control unit 228. Based on said control signal, there is adjusted a control voltage applied to the variable capacitors included in the variable impedance matching unit 224 and the primary-side antenna unit 223. At this time, the control voltage is adjusted so as to optimize impedance matching between the transmit signal generating unit 225 and the primary-side antenna unit 223 and the resonance frequency of the primary-side antenna unit 223.

It should be noted that there was described an example illustrated in FIG. 26, wherein the transmit-receive control unit 228, the transmitting-side system control unit 229, and the control unit 230 (CPU) are independently provided in the transmitting apparatus 221, but, the present disclosure is not limited to this example. There may be employed a configuration in which the control unit 230 includes the transmit-receive control unit 228 and the transmitting-side system control unit 229.

(2) Receiving Apparatus

Next, the receiving apparatus 222 will be described. It should be noted that, in the Application Example illustrated in FIG. 26, the receiving apparatus 222 is configured with a non-contact IC card (data carrier). Furthermore, in this Application Example, the receiving apparatus 222 has a function of adjusting its own resonance frequency.

The receiving apparatus 222 comprises a secondary-side antenna unit (a receiving antenna unit) 231, a rectifier unit 232, a constant voltage unit 233, a receiving control unit 234, a demodulation circuit 235, a receiving-side system control unit 236, a modulation circuit 237, and a battery 238.

Electric connection relationships between each of the units in the receiving apparatus 222 are as follows. An output terminal of the secondary-side antenna unit 231 is connected to an input terminal of the rectifier unit 232, one input terminal of the receiving control unit 234, and an input terminal of the demodulation circuit 235. Furthermore, an input terminal of the secondary-side antenna unit 231 is connected to an output terminal of the modulation circuit 237, meanwhile a control terminal of the secondary-side antenna unit 231 is connected to an output terminal of the receiving control unit 234. An output terminal of the rectifier unit 232 is connected to an input terminal of the constant voltage unit 233. Furthermore, an output terminal of the constant voltage unit 233 is connected to each of power supply input terminals of the receiving control unit 234, the modulation circuit 237, and the demodulation circuit 235.

Another input terminal of the receiving control unit 234 is connected to one output terminal of the receiving-side system control unit 236. An output terminal of the demodulation circuit 235 is connected to an input terminal of the receiving-side system control unit 236. Furthermore, an input terminal of the modulation circuit 237 is connected to another output terminal of the receiving-side system control unit 236. A power supply input terminal of the receiving-side system control unit 236 is connected to an output terminal of the battery 238.

Next, the configuration and function of each of the units of the receiving apparatus 222 will be described. Although not illustrated, the secondary-side antenna unit 231 has a resonant circuit comprising a resonant coil and a resonant capacitor, and said resonant capacitor includes a variable capacitor the capacitance of which changes by applying a control voltage. The secondary-side antenna unit 231 is a unit to communicate with the transmitting apparatus 221 (the primary-side antenna unit 223) by electromagnetic coupling, and, for that, receives a magnetic field generated by the primary-side antenna unit 223, thereby receiving a transmit signal from the transmitting apparatus 221. At this time, the capacitance of the variable capacitor is adjusted so as to achieve a desired resonance frequency of the secondary-side antenna unit 231. It should be noted that, in this Application Example, the variable capacitance element described in any of the above-mentioned embodiments and Modified Examples is applied to the variable capacitor included in the secondary-side antenna unit 231.

The rectifier unit 232 is configured with, for example, a half-wave rectifier circuit comprising a rectifying diode and a rectifying capacitor, and rectifies AC power received at the secondary-side antenna unit 231 to DC power, and outputs said rectified DC power to the constant voltage unit 233.

The constant voltage unit 233 applies control processing and stabilizing processing of voltage fluctuations (data components) to an electric signal (DC power) inputted from the rectifier unit 232, and supplies said processed DC power to the receiving control unit 234. It should be noted that the DC power outputted through the rectifier unit 232 and the constant voltage unit 233 is used as a power source to operate an IC (Integrated Circuit) in the receiving apparatus 222.

The receiving control unit 234 is configured with, for example, an IC, and monitors the magnitude of a received signal received at the secondary-side antenna unit 231, the phase of voltage/current, and the like. Then, based on the results of monitoring the received signal, the receiving control unit 234 controls the resonance characteristics of the secondary-side antenna unit 231, thereby optimizing the resonance frequency at the time of signal reception. Specifically, a control voltage is applied to the variable capacitor included in the secondary-side antenna unit 231 thereby to adjust the capacitance thereof, whereby the resonance frequency of the secondary-side antenna unit 231 is adjusted.

The demodulation circuit 235 demodulates a received signal received at the secondary-side antenna unit 231 and outputs said demodulated signal to the receiving-side system control unit 236.

Based on the signal demodulated in the demodulation circuit 235, the receiving-side system control unit 236 judges the contents of the demodulated signal and performs necessary processing, thereby controlling the modulation circuit 237 and the receiving control unit 234.

In accordance with the result (the contents of the demodulated signal) judged by the receiving-side system control unit 236, the modulation circuit 237 modulates a received carrier and generates a response signal. Then, the modulation circuit 237 outputs the generated response signal to the secondary-side antenna unit 231. It should be noted that the response signal outputted from the modulation circuit 237 is transmitted from the secondary-side antenna unit 231 to the primary-side antenna unit 223 by non-contact communication.

The battery 238 supplies electric power to the receiving-side system control unit 236. The charging of this battery 238 is performed by connecting a charging terminal thereof to an external power supply 239. Like this Application Example, a configuration in which the receiving apparatus 222 has the battery 238 built in allows more stable electric power to be supplied to the receiving-side system control unit 236, thereby allowing the receiving-side system control unit 236 to be operated more stably. It should be noted that, in this Application Example, there may be employed a configuration in which the receiving-side system control unit 236 is driven without using the battery 238, but with using DC power generated via the rectifier unit 232 and the constant voltage unit 233.

In the communication system 220 having the above-mentioned configuration, non-contact data communication is performed between the primary-side antenna unit 223 of the transmitting apparatus 221 and the secondary-side antenna unit 231 of the receiving apparatus 222 via electromagnetic coupling. Therefore, in order to efficiently perform communication between the transmitting apparatus 221 and the receiving apparatus 222, each of the resonant circuits of the primary-side antenna unit 223 and the secondary-side antenna unit 231 is configured so as to resonate at the same carrier frequency (for example, 13.56 MHz).

In this Application Example, as mentioned above, the variable capacitance element described in any of the above-mentioned embodiments and Modified Examples and having a capacitance capable of being compensated after the mounting thereof is applied to variable capacitors included in the primary-side antenna unit 223, the variable impedance matching unit 224, and the secondary-side antenna unit 231. Therefore, the communication system 220 of this Application Example enables both the resonance frequency and impedance-matching characteristics to be kept optimum, thereby improving communication characteristics.

It should be noted that, in this Application Example, the receiving apparatus 222 is configured with a noncontact IC card (a data carrier), but, the present disclosure is not limited to this example. As the receiving apparatus 222, there may be used a communication apparatus described in the above-mentioned Application Example 1, such as an information processing terminal having a non-contact communication function. Furthermore, in the case where a noncontact IC card (a data carrier) includes a CPU having a performance equivalent to a system CPU equipped in a communication apparatus, such as an information processing terminal having a non-contact communication function, the variable capacitance element according to the present disclosure may be applied also to such noncontact IC card.

In this case, each of the resonance frequencies of the primary-side antenna unit 223 and the secondary-side antenna unit 231 is separately adjusted in a corresponding one of the voltage generating circuits. Therefore, even if a received resonance frequency and/or a transmitted resonance frequency are deviated due to various factors, the communication system 220 having such configuration allows the deviation of each of the resonance frequencies to be easily adjusted in each of the apparatuses, thereby achieving stable communication characteristics.

[Application Example 3:Wireless Charging System]

Next, there will be described an example (Application Example 3) in which a variable capacitance element according to each of the above-mentioned embodiments and Modified Examples is applied to a wireless charging system configured to send and receive (transmit) electric power by non-contact communication.

Figure 27:
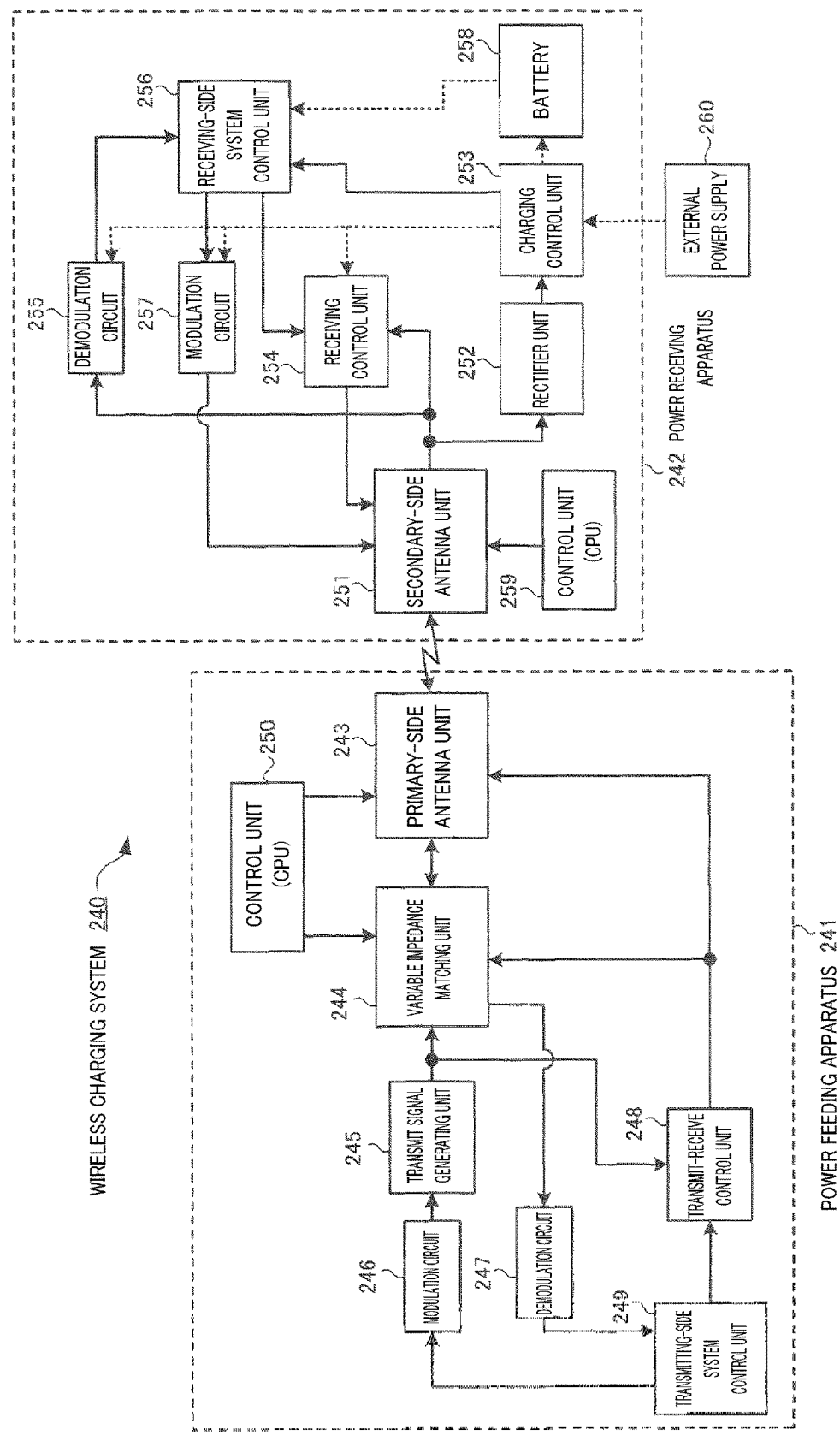
FIG. 27 is a schematic block diagram of a wireless charging system (Application Example 3) including a variable capacitance element according to the present disclosure.

FIG. 27 is a schematic block configuration of a wireless charging system according to Application Example 3. It should be noted that, to simplify an explanation, FIG. 27 illustrates only the configuration of a principal part involved in non-contact communication. In FIG. 27, a solid line arrow represents wiring for input/output of information between circuit blocks, and a dotted line arrow represents wiring for supply of electric power.

The wireless charging system 240 comprises a power feeding apparatus 241 (a power feeding apparatus unit) and a power receiving apparatus 242 (a power receiving apparatus unit). The wireless charging system 240 sends and receives (transmits) electric power between the power feeding apparatus 241 and the power receiving apparatus 242 by non-contact communication. It should be noted that, in the wireless charging system 240 of this Application Example, as a charging method for supplying (charging) electric power in a non-contact manner, a method, such as electromagnetic induction or magnetic field resonance, may be applied. Hereinafter, the configuration of each of the apparatuses will be described in more detail.

(1) Power Feeding Apparatus

The power feeding apparatus 241 is an apparatus to supply electric power to a desired electronic apparatus (the power receiving apparatus 242) in a non-contact manner. The power feeding apparatus 241 comprises a primary-side antenna unit 243 (a power feeding antenna unit), a variable impedance matching unit 244, a transmit signal generating unit 245, a modulation circuit 246, a demodulation circuit 247, a transmit-receive control unit 248, a transmitting-side system control unit 249, and a control unit 250.

The primary-side antenna unit 243 and the variable impedance matching unit 244 of the power feeding apparatus 241 have the same configuration as the primary-side antenna unit 223 and the variable impedance matching unit 224 of the transmitting apparatus 221 of the above-mentioned Application Example 2, respectively. In other words, also in this Application Example, any of the variable capacitance elements (the variable capacitors) described in the above-mentioned embodiments and Modified Examples is provided to the primary-side antenna unit 243 and the variable impedance matching unit 244 of the power feeding apparatus 241.

The transmit signal generating unit 245, the modulation circuit 246, and the demodulation circuit 247 of the power feeding apparatus 241 have the same configuration as the transmit signal generating unit 225, the modulation circuit 226, and the demodulation circuit 227 of the transmitting apparatus 221 of the above-mentioned Application Example 2, respectively. Furthermore, the transmit-receive control unit 248, the transmitting-side system control unit 249, and the control unit 250 of the power feeding apparatus 241 have the same configuration as the transmit-receive control unit 228, the transmitting-side system control unit 229, and the control unit 230 of the transmitting apparatus 221 of the above-mentioned Application Example 2, respectively. It should be noted that electric connection relationships between each of the units in the power feeding apparatus 241 are the same as those in the transmitting apparatus 221 of the Application Example 2.

It should be noted that, in the example illustrated in FIG. 27, the transmit-receive control unit 248, the transmitting-side system control unit 249, and the control unit 250 (CPU) are separately provided to the power feeding apparatus 241, but, the present disclosure is not limited to this example. There may be employed a configuration in which the control unit 250 includes the transmit-receive control unit 248 and the transmitting-side system control unit 249.

(2) Power Receiving Apparatus

The power receiving apparatus 242 is configured with, for example, a mobile apparatus having a non-contact communication function. The power receiving apparatus 242 comprises a secondary-side antenna unit (a power receiving antenna unit) 251, a rectifier unit 252, a charging control unit 253, a receiving control unit 254, a demodulation circuit 255, a receiving-side system control unit 256, a modulation circuit 257, a battery 258, and a control unit 259.

Electric connection relationships between each of the units in the receiving apparatus 242 are as follows. An output terminal of the secondary-side antenna unit 251 is connected to an input terminal of the rectifier unit 252, one input terminal of the receiving control unit 254, and an input terminal of the demodulation circuit 255. An input terminal of the secondary-side antenna unit 251 is connected to an output terminal of the modulation circuit 257. Furthermore, one control terminal of the secondary-side antenna unit 251 is connected to an output terminal of the receiving control unit 254, meanwhile another control terminal of the secondary-side antenna unit 251 is connected to an output terminal of the control unit 259.

An output terminal of the rectifier unit 252 is connected to an input terminal of the charging control unit 253. An output terminal of the charging control unit 253 is connected to one input terminal of the receiving-side system control unit 256. Furthermore, one power supply output terminal of the charging control unit 253 is connected to each of power supply input terminals of the receiving control unit 254, the modulation circuit 257, and the demodulation circuit 255, meanwhile another power supply output terminal of the charging control unit 253 is connected to a charging terminal of the battery 258. Another input terminal of the receiving control unit 254 is connected to one output terminal of the receiving-side system control unit 256. An output terminal of the demodulation circuit 255 is connected to another input terminal of the receiving-side system control unit 256. An input terminal of the modulation circuit 257 is connected to another output terminal of the receiving-side system control unit 256. A power supply input terminal of the receiving-side system control unit 256 is connected to an output terminal of the battery 258.

Next, the configuration and function of each of the units of the power receiving apparatus 242 will be described. It should be noted that, in this Application Example, each of the units of the power receiving apparatus 242, except the secondary-side antenna unit 251, charging control unit 253, and control unit 259, has the same configuration as a corresponding one of the units of the receiving apparatus 222 in the communication system 220 according to the Application Example 2. Therefore, here, only the configurations of the secondary-side antenna unit 251, the charging control unit 253, and the control unit 259 will be described.

The secondary-side antenna unit 251 has the same configuration as the receiving unit 201 (a resonant circuit unit) of the above-mentioned Application Example 1 (FIG. 25), and includes a resonant circuit (a resonant antenna 210) including a resonant coil and a resonant capacitor, and a voltage generating circuit configured to adjust the capacitance of the resonant capacitor. It should be noted that, in this Application Example, the variable capacitance element described in any of the above-mentioned embodiments and Modified Examples is applied to a variable capacitor (not illustrated) included in the secondary-side antenna unit 251.

The secondary-side antenna unit 251 is an antenna unit to transmit electric power by electromagnetic coupling with the power feeding apparatus 241 (the primary-side antenna unit 243), and, for that, receives a magnetic field generated by the primary-side antenna unit 243, thereby receiving transmitted electric power from the power feeding apparatus 241. At this time, the capacitance of the variable capacitor is adjusted by applying a control voltage controlled by the voltage generating circuit to the variable capacitor, so that the secondary-side antenna unit 251 has a desired resonance frequency. It should be noted that operation control of the voltage generating circuit (control of a control voltage) is performed based on a control signal inputted from the control unit 259.

The charging control unit 253 supplies the battery 258 with an electric signal (DC power) inputted from the rectifier unit 252, thereby charging the battery 258, and also supplies said electric signal (DC power) to the receiving control unit 254 as a driving electric power for the receiving control unit 254. Furthermore, the charging control unit 253 monitors a charging state, and outputs the monitoring result to the receiving-side system control unit 256. Furthermore, the charging control unit 253 is connectable to an external power supply 260. In the case where the charging control unit 253 is connected to the external power supply 260, electric power outputted from the external power supply 260 is supplied to the battery 258 via the charging control unit 253, whereby the battery 258 is charged. It should be noted that, in the case where the battery 258 is charged by the external power supply 260, there may be employed a configuration in which the external power supply 260 may be directly connected to the battery 258.

The control unit 259 is configured with a circuit, such as CPU. Each of output terminals of a CPU (the control unit 259) is connected to a corresponding one of input terminals of the voltage generating circuit in the secondary-side antenna unit 251. The control unit 259 outputs a control signal inputted from the receiving control unit 254 to the secondary-side antenna unit 251. Based on this control signal, there is adjusted a control voltage to be applied to the variable capacitor included in the secondary-side antenna unit 251. Furthermore, at this time, the control voltage is adjusted so as to optimize the resonance frequency of the secondary-side antenna unit 251.

It should be noted that, in the example illustrated in FIG. 27, the receiving control unit 254, the receiving-side system control unit 256, and the control unit 259 (CPU) are separately provided to the power receiving apparatus 242, but, the present disclosure is not limited to this example. There may be employed a configuration in which the control unit 259 includes the receiving control unit 254 and the receiving-side system control unit 256.

In the wireless charging system 240 having the above-mentioned configuration, based on a signal outputted from the transmitting-side system control unit 249 of the power feeding apparatus 241, an electromagnetic wave for electric power transmission is transmitted from the primary-side antenna unit 243, and said electromagnetic wave is received at the secondary-side antenna unit 251 of the power receiving apparatus 242. Then, the signal received at the secondary-side antenna unit 251 is converted into DC power at the rectifier unit 252, and said DC power is charged into the battery 258 via the charging control unit 253.

In the wireless charging system 240 of this Application Example, a signal received at the secondary-side antenna unit 251 of the power receiving apparatus 242 is demodulated by the demodulation circuit 255. Subsequently, the contents of the demodulated data are judged at the receiving-side system control unit 256, and, according to the result, the modulation circuit 257 modulates the received carrier signal. Then, the modulation circuit 257 transmits the modulated received-carrier signal as a response signal to the power feeding apparatus 241 via the secondary-side antenna unit 251.

A series of the recognition processing enables power transmission to equipment, metal, and the like outside the system to be avoided. Furthermore, in the case where a power transmission is judged right by the recognition processing, a transmit signal is outputted in an unmodulated state for power transmission. In this case, in order to perform long-time charging, the above-mentioned recognition processing is intermittently performed, thereby securing safety.

Furthermore, in the wireless charging system 240 of this Application Example, as mentioned above, a charging state is monitored by the charging control unit 253 of the power receiving apparatus 242. Then, data on the charging state are sent to the power feeding apparatus 241 via the receiving-side system control unit 256, the modulation circuit 257, and the secondary-side antenna unit 251 in order to achieve an optimum charging state. On the other hand, the data on the charging state sent back from the power receiving apparatus 242 are demodulated by the demodulation circuit 247 of the power feeding apparatus 241, and the contents of said demodulated data are judged by the transmitting-side system control unit 249. Then, based on the judgment result, the transmitting-side system control unit 249 suitably performs necessary processing.

In the above-mentioned operation of the wireless charging system 240, each of the resonance frequencies of the variable impedance matching unit 244, the primary-side antenna unit 243, and the secondary-side antenna unit 251 is suitably adjusted by the voltage generating circuit in a corresponding one of the units. Therefore, even if a received resonance frequency and/or a transmitted resonance frequency are deviated due to various factors, the wireless charging system 240 having such configuration allows the deviation of each of the resonance frequencies to be easily adjusted in each of the apparatuses, thereby achieving stable power-transmission operation.

[Application Example 4:Power Supply Apparatus]

Next, there will be described an example (Application Example 4) in which a variable capacitance element (a variable capacitor) according to each of the above-mentioned embodiments and Modified Examples is applied to a power supply apparatus.

Figure 28:
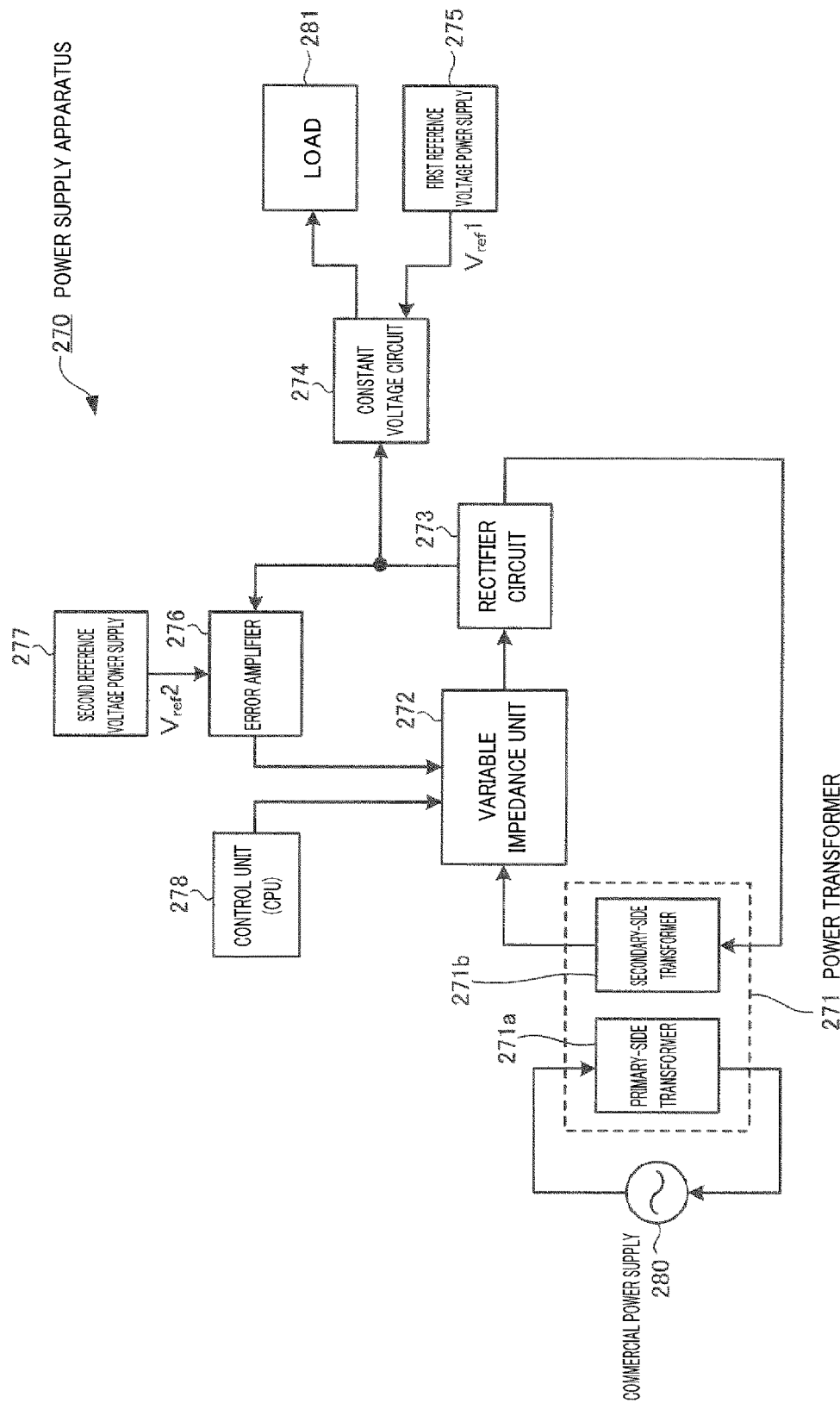
FIG. 28 is a schematic block diagram of a power supply apparatus (Application Example 4) including a variable capacitance element according to the present disclosure.

FIG. 28 is a schematic block configuration of a power supply apparatus according to Application Example 4. Here, a power supply apparatus 270 configured to step down a voltage (AC100V) of a commercial power supply 280 through a power transformer 271 is taken as an example and described.

The power supply apparatus 270 comprises the power transformer 271 (a power supply unit), a variable impedance unit 272, a rectifier circuit 273 (a rectifier circuit unit), a constant voltage circuit 274, a first reference voltage power supply 275, an error amplifier 276, a second reference voltage power supply 277, and a control unit 278.

Electric connection relationships between each of the units in the power supply apparatus 270 are as follows. As illustrated in FIG. 28, a later-mentioned primary-side transformer 271a in the power transformer 271 is connected to the commercial power supply 280. On the other hand, an output terminal of a later-mentioned secondary-side transformer 271b in the power transformer 271 is connected to an input terminal of the variable impedance unit 272, meanwhile an input terminal of the secondary-side transformer 271b is connected to one output terminal of the rectifier circuit 273.

An output terminal of the variable impedance unit 272 is connected to an input terminal of the rectifier circuit 273. Furthermore, one control terminal of the variable impedance unit 272 is connected to an output terminal of the error amplifier 276, meanwhile another control terminal of the variable impedance unit 272 is connected to the control unit 278. Another output terminal of the rectifier circuit 273 is connected to one input terminal of the voltage regulator circuit 274 and one input terminal of the error amplifier 276.

As illustrated in FIG. 28, another input terminal of the constant voltage circuit 274 is connected to the first reference voltage power supply 275, meanwhile an output terminal of the voltage regulator circuit 274 is connected to a load 281. Furthermore, another input terminal of the error amplifier 276 is connected to the second reference voltage power supply 277.

Next, the configuration and function of each of the units of the power supply apparatus 270 will be described. As illustrated in FIG. 28, the power transformer 271 has the primary-side transformer 271a and the secondary-side transformer 271b. The power transformer 271 steps down the voltage of the commercial power supply 280 at a ratio corresponding to the turns ratio of the primary-side transformer 271a to the secondary-side transformer 271b, and outputs said stepped-down voltage to the variable impedance unit 272.

Although not illustrated in FIG. 28, the variable impedance unit 272 has a variable capacitor and a voltage generating circuit configured to adjust the capacitance of said variable capacitor. It should be noted that, in this Application Example, the variable capacitance element described in any of the above-mentioned embodiments and Modified Examples is applied to the variable capacitor included in the variable impedance unit 272.

The variable impedance unit 272 increases or decreases the capacitance of the variable capacitor, thereby changing an impedance. Thus, the variable impedance unit 272 increases or decreases an AC voltage inputted from the secondary-side transformer 271b, and supplies said increased or decreased AC voltage to the rectifier circuit 273.

The rectifier circuit 273 is configured with, for example, a half-wave rectifier circuit comprising a rectifying diode and a rectifying capacitor. The rectifier circuit 273 converts an AC voltage inputted from the variable impedance unit 272 to a DC voltage, and supplies said DC voltage to the constant voltage circuit 274 and the error amplifier 276.

The constant voltage circuit 274 compares a reference voltage Vref1 supplied from the first reference voltage power supply 275 with the DC voltage inputted from the rectifier circuit 273, and generates a DC voltage having a constant voltage value, then, supplies said DC voltage of having a constant voltage value to the load 281. Specifically, the constant voltage circuit 274 increases or decreases the step-down amount of an input voltage in its own circuit so that a voltage equal to the reference voltage Vref1 is applied to the load 281.

The error amplifier 276 compares a DC voltage inputted from the rectifier circuit 273 with a reference voltage Vref2 supplied from the second reference voltage power supply 277, and, based on the comparison result, controls the impedance of the variable impedance unit 272. It should be noted that, usually, a reference voltage Vref2 outputted from the second reference voltage power supply 277 is set higher by approximately 2 [V] than a reference voltage Vref1 outputted from the first reference voltage power supply 275.

The control unit 278 is configured with, for example, a circuit, such as a CPU. An output terminal of a CPU (the control unit 278) is connected to a corresponding one of input terminals of the voltage generating circuit in the variable impedance unit 272. Then, the control unit 278 adjusts a control voltage which is to be applied to the variable capacitor in the variable impedance unit 272, and outputs the control voltage. In this Application Example, the impedance of the variable impedance unit 272 is thus adjusted.

It should be noted that, at this time, the impedance of the variable impedance unit 272 is adjusted so that a DC voltage approximately equal to the reference voltage Vref1 outputted from the first reference voltage power supply 275 is inputted into the constant voltage circuit 274. More specifically, in the case where a load current becomes larger and an AC voltage of the secondary-side transformer 271b is thereby decreased, the control unit 278 decreases the impedance of the variable impedance unit 272. Furthermore, in the case where the voltage of the commercial power supply 280 becomes larger and the AC voltage of the secondary-side transformer 271b is increased thereby, the control unit 278 increases the impedance of the variable impedance unit 272. Thus, a stable AC voltage is inputted into the rectifier circuit 273, and as a result, the input voltage of the constant voltage circuit 274 is also made stable and can be controlled.

In the power supply apparatus 270 having the above-mentioned configuration, an AC voltage which is stepped down at a ratio corresponding to the turns ratio of the primary-side transformer 271a of the power transformer 271 to the secondary-side transformer 271b thereof is converted into a DC voltage by the rectifier circuit 273. Then, based on the DC voltage outputted from the rectifier circuit 273, the voltage step-down type constant voltage circuit 274 generates a DC voltage having a constant voltage value, and supplies said DC voltage having the constant voltage value to the load 281.

Conventionally, in a power supply apparatus 270 having the above-mentioned configuration, an increase or decrease in load current and a change in voltage of a primary-side transformer 271a cause a DC voltage outputted from a rectifier circuit 273, in other words, an input voltage of a constant voltage circuit 274 to change. Usually, for such change in the input voltage of the constant voltage circuit 274, as mentioned above, the voltage step-down type voltage regulator circuit 274 increases or decreases the step-down amount of the input voltage so that a voltage equal to the reference voltage Vref1 is applied to the load 281, whereby a voltage to be supplied to the load 281 is stabilized. In this case, the step-down amount of the input voltage in the constant voltage circuit 274 corresponds to power losses of the constant voltage circuit 274. In other words, the larger the step-down amount of an input voltage is, the higher the power losses in the constant voltage circuit 274 are. Therefore, ideally, if the input voltage of the constant voltage circuit 274 can be controlled so as to be the minimum operating voltage of the constant voltage circuit 274 (a reference voltage Vref1), the power losses in the constant voltage circuit 274 can be minimized.

On the other hand, in the power supply apparatus 270 of this Application Example, in the case where the input voltage of the constant voltage circuit 274 changes due to an increase or decrease in load current or a change in the voltage of the primary-side transformer 271a, the impedance of the variable impedance unit 272 is adjusted by the control unit 278 as mentioned above. Specifically, the control unit 278 adjusts the impedance of the variable impedance unit 272 so that the input voltage of the constant voltage circuit 274 is made approximately equal to the reference voltage Vref1 outputted from the first reference voltage power supply 275. Therefore, the power supply apparatus 270 of this Application Example allows the input voltage of the constant voltage circuit 274 to be controlled to the minimum operating voltage of the constant voltage circuit 274 (the reference voltage Vref1), thereby allowing the power losses in the constant voltage circuit 274 to be minimized.

Furthermore, in a conventional common voltage-step-down type power supply apparatus, the input voltage of a constant voltage circuit is stabilized by a variable resistance, and accordingly power losses are caused in the variable resistance. On the other hand, in this Application Example, the capacitance of the variable capacitor included in the variable impedance unit 272 is changed, whereby a voltage is stepped down, and therefore, power losses in a resistance component are not caused. Hence, the power supply apparatus 270 of this Application Example can achieve lower power losses than the conventional power supply apparatus does.

It should be noted that, in this Application Example, a circuit on the electric power input side of the variable impedance unit 272 is configured with the commercial power supply 280 and the power transformer 271, but, the present disclosure is not limited to this example. For example, a circuit on the electric power input side of the variable impedance unit 272 may be configured with a switch power supply. For example, the use of a switch power supply configured to turn on and off an output at a switching frequency of 100 kHz achieves a power supply apparatus which performs the same operation as the power supply apparatus 270 illustrated in FIG. 28 does.

Furthermore, in the power supply apparatus 270 of this Application Example, a single output system is employed, but the present disclosure is not limited to this example. For example, by providing a plurality of output terminals to a power transformer, a power supply apparatus having a plurality of output systems (power supply systems) may be configured.

Application Example 5: Other Various Electronic Apparatus

The variable capacitance element according to the present disclosure is applicable also to various electronic apparatuses each being configured by suitably combining the communication system, the wireless charging system, and the power supply apparatus described in the above-mentioned Application Examples 2 to 4, respectively. It should be noted that, in this case, the configurations of a transmitting apparatus (a communication apparatus unit) and a receiving apparatus of a communication system incorporated in an electronic apparatus are the same as the configurations of the transmitting apparatus 221 and the receiving apparatus 222 described in the above-mentioned Application Example 2 (FIG. 26), respectively, but, the non-contact communication is made with outside.

Examples of an electronic apparatus including the communication system and the wireless charging system include a cellular phone, a smartphone, a tablet PC (Personal Computer), a notebook PC, a remote controller, a wireless speaker, and the like. Furthermore, examples of an electronic apparatus including the communication system and the wireless charging system include a camcorder, a digital camera, a portable audio player, 3D glasses, a hand-held video game machine, and the like.

Examples of an electronic apparatus including the communication system and the power supply apparatus (the power supply apparatus unit) include a tablet PC, a notebook PC, a desktop PC, a printer, a projector, a liquid crystal display television, a home video game machine, a refrigerator, and the like. Furthermore, examples of an electronic apparatus including the communication system and the power supply apparatus (the power supply apparatus unit) include a DVD (Digital Versatile Disc)/BD (Blu-ray Disc: registered trademark) player, a DVD/BD recorder, and the like. Furthermore, an electronic apparatus including the communication system and the power supply apparatus (power supply apparatus unit) is applicable also to electric vehicles.

Examples of an electronic apparatus including the wireless charging system and the power supply apparatus (the power supply apparatus unit) include a notebook PC, a portable television, a radio, a radio cassette recorder, an electric toothbrush, an electric shaver, an iron, and the like. Furthermore, an electronic apparatus including the wireless charging system and the power supply apparatus (the power supply apparatus unit) is applicable also to an electric vehicle.

Examples of an electronic apparatus including the communication system, the wireless charging system, and the power supply apparatus (the power supply apparatus unit) include a notebook PC, a portable television, a radio, a radio cassette recorder, and the like. Furthermore, an electronic apparatus including the communication system, the wireless charging system, and the power supply apparatus (the power supply apparatus unit) is applicable also to an electric vehicle.

The technique according to the present disclosure is applicable to the above-mentioned various electronic apparatuses, and the same effects as in the present disclosure can be obtained. Furthermore, in this case, each of the control units configured to control a corresponding ones of the apparatuses (systems) may be provided to every apparatus, or, in the case where there are a plurality of control units which can be shared between the apparatuses, those control units may be configured to be integrated.

Furthermore, the variable capacitance element according to the present disclosure is applicable also to, for example, a regulating apparatus to be used for frequency regulation before shipment of non-contact communication apparatuses. However, in this case, operation control of the voltage generating circuit can be performed by a processing circuit unit, such as LSI (Large Scale Integration), in the regulating apparatus.

It should be noted that, in the present disclosure, the following configurations may be employed.

(1)

A variable capacitance element, comprising:

an element body unit which includes a first variable capacitor unit including a first dielectric layer formed of a ferroelectric material and has a capacitance varying according to a control voltage signal applied from outside;

a compensation unit which includes a second variable capacitor unit including a second dielectric layer formed of the ferroelectric material, is connected to the element body unit, and has a capacitance varying according to the control voltage signal;

a first external terminal for signals which is connected to the element body unit and configured to receive an input of an AC signal;

a second external terminal for signals which is connected to the element body unit or the compensation unit and configured to receive an input of an AC signal;

an external terminal for control which is connected to the element body unit and configured to receive an input of the control voltage signal; and an external terminal for capacitance compensation which is connected to the compensation unit.

(2)

The variable capacitance element according to (1), wherein the element body unit and the compensation unit are serially connected, and wherein the second external terminal for signals is connected to the compensation unit.

(3)

The variable capacitance element according to (1) or (2), wherein the compensation unit has a plurality of the second variable capacitor units, said second variable capacitor units being connected in parallel, wherein one end of each of the second variable capacitor units is connected to the element body unit, wherein another end of one of the second variable capacitor units is connected to the second external terminal for signals, and wherein the external terminal for capacitance compensation is provided to another end of each of the remaining second variable capacitor units, and said other end of each of said remaining second variable capacitor units is connected to a corresponding one of the external terminals for capacitance compensation.

(4)

The variable capacitance element according to (1) or (2), wherein the compensation unit has a plurality of the second variable capacitor units, said second variable capacitor units being serially connected, wherein one end of a series circuit comprising the plurality of the second variable capacitor units is connected to the element body unit, wherein another end of the series circuit is connected to the second external terminal for signals, and wherein the external terminal for capacitance compensation is provided to each of connection points between the second variable capacitor units adjacent to each other, and each of the connection points is connected to a corresponding one of the external terminals for capacitance compensation.

(5)

The variable capacitance element according to (1), wherein the element body unit and the compensation unit are connected in parallel, wherein the second external terminal for signals is connected to the element body unit, and wherein one end of the compensation unit is connected to the first external terminal for signals, and another end of the compensation unit is connected to the external terminal for capacitance compensation.

(6)

The variable capacitance element according to (1) or (5), wherein the compensation unit has a plurality of the second variable capacitor units, said second variable capacitor units being serially connected, and wherein one end of a series circuit comprising the plurality of the second variable capacitor units is connected to the first external terminal for signals, and another end of the series circuit is connected to the external terminal for capacitance compensation.

(7)

A packaged circuit, comprising:

an element body unit which includes a first variable capacitor unit including a first dielectric layer formed of a ferroelectric material and has a capacitance varying according to a control voltage signal applied from outside;

a compensation unit which includes a second variable capacitor unit including a second dielectric layer formed of the ferroelectric material, is connected to the element body unit, and has a capacitance varying according to the control voltage signal;

a first external terminal for signals which is connected to the element body unit and configured to receive an input of an AC signal;

a second external terminal for signals which is connected to the element body unit or the compensation unit and configured to receive an input of an AC signal;

an external terminal for control which is connected to the element body unit and configured to receive an input of the control voltage signal;

an external terminal for capacitance compensation which is connected to the compensation unit; and a bias resistance connected to the external terminal for control.

(8)

The packaged circuit according to (7), further comprising external wiring configured to electrically connect the second external terminal for signals and the external terminal for capacitance compensation.

(9)

A resonant circuit, comprising:

a resonant capacitor including a variable capacitance element; and a resonant coil connected to the resonant capacitor, wherein the variable capacitance element includes: an element body unit which includes a first variable capacitor unit including a first dielectric layer formed of a ferroelectric material and has a capacitance varying according to a control voltage signal applied from outside; a compensation unit which includes a second variable capacitor unit including a second dielectric layer formed of the ferroelectric material, is connected to the element body unit, and has a capacitance varying according to the control voltage signal; a first external terminal for signals which is connected to the element body unit and configured to receive an input of an AC signal; a second external terminal for signals which is connected to the element body unit or the compensation unit and configured to receive an input of an AC signal; an external terminal for control which is connected to the element body unit and configured to receive an input of the control voltage signal; and an external terminal for capacitance compensation which is connected to the compensation unit.

(10)

A communication apparatus, comprising:

a receiving antenna unit including a resonant capacitor and a resonant coil and configured to perform non-contact communication with outside, wherein the resonant capacitor includes a variable capacitance element, wherein the resonant coil is connected to the resonant capacitor, and wherein the variable capacitance element includes: an element body unit which includes a first variable capacitor unit including a first dielectric layer formed of a ferroelectric material and has a capacitance varying according to a control voltage signal applied from outside; a compensation unit which includes a second variable capacitor unit including a second dielectric layer formed of the ferroelectric material, is connected to the element body unit, and has a capacitance varying according to the control voltage signal; a first external terminal for signals which is connected to the element body unit and configured to receive an input of an AC signal; a second external terminal for signals which is connected to the element body unit or the compensation unit and configured to receive an input of an AC signal; an external terminal for control which is connected to the element body unit and configured to receive an input of the control voltage signal; and an external terminal for capacitance compensation which is connected to the compensation unit; and a voltage generating circuit configured to output the control voltage signal to the external terminal for control included in the variable capacitance element.

(11)

A communication system, comprising:

a transmitting apparatus including a transmitting antenna unit, wherein the transmitting antenna unit includes a resonant capacitor and a resonant coil connected to the resonant capacitor, and wherein the resonant capacitor includes a variable capacitance element, the variable capacitance element including: an element body unit which includes a first variable capacitor unit including a first dielectric layer formed of a ferroelectric material and has a capacitance varying according to a control voltage signal applied from outside; a compensation unit which includes a second variable capacitor unit including a second dielectric layer formed of the ferroelectric material, is connected to the element body unit, and has a capacitance varying according to the control voltage signal; a first external terminal for signals which is connected to the element body unit and configured to receive an input of an AC signal; a second external terminal for signals which is connected to the element body unit or the compensation unit and configured to receive an input of an AC signal; an external terminal for control which is connected to the element body unit and configured to receive an input of the control voltage signal; and an external terminal for capacitance compensation which is connected to the compensation unit; and a receiving apparatus configured to perform non-contact communication with the transmitting apparatus.

(12)

A wireless charging system, comprising:

a power feeding apparatus including a power feeding antenna unit, wherein the power feeding antenna unit includes a first resonant capacitor and a first resonant coil connected to the first resonant capacitor, and wherein the first resonant capacitor includes a first variable capacitance element, the first variable capacitance element including: a first element body unit which includes a first variable capacitor unit including a first dielectric layer formed of a ferroelectric material and has a capacitance varying according to a first control voltage signal applied from outside; a first compensation unit which includes a second variable capacitor unit including a second dielectric layer formed of the ferroelectric material, is connected to the first element body unit, and has a capacitance varying according to the first control voltage signal; a first external terminal for signals which is connected to the first element body unit and configured to receive an input of an AC signal; a second external terminal for signals which is connected to the first element body unit or the first compensation unit and configured to receive an input of an AC signal; a first external terminal for control which is connected to the first element body unit and configured to receive an input of the first control voltage signal; and a first external terminal for capacitance compensation which is connected to the first compensation unit; and a power receiving apparatus including a power receiving antenna unit, wherein the power receiving antenna unit includes a second resonant capacitor and a second resonant coil connected to the second resonant capacitor, and is configured to perform non-contact communication with the power feeding antenna unit, and wherein the second resonant capacitor includes a second variable capacitance element, the second variable capacitance element including: a second element body unit which includes a third variable capacitor unit including a third dielectric layer formed of a ferroelectric material and has a capacitance varying according to a second control voltage signal applied from outside; a second compensation unit which includes a fourth variable capacitor unit including a fourth dielectric layer formed of the ferroelectric material, is connected to the second element body unit, and has a capacitance varying according to the second control voltage signal; a third external terminal for signals which is connected to the second element body unit and configured to receive an input of an AC signal; a fourth external terminal for signals which is connected to the second element body unit or the second compensation unit and configured to receive an input of an AC signal; a second external terminal for control is connected to the second element body unit and configured to receive an input of the second control voltage signal; and a second external terminal for capacitance compensation which is connected to the second compensation unit.

(13)

A power supply apparatus, comprising:
a power supply unit;
a rectifier circuit unit configured to convert AC power supplied from the power supply unit into DC power; and
a variable impedance unit including a variable capacitance element and provided between the power supply unit and the rectifier circuit unit,
wherein the variable capacitance element includes: an element body unit which includes a first variable capacitor unit including a first dielectric layer formed of a ferroelectric material and has a capacitance varying according to a control voltage signal applied from outside; a compensation unit which includes a second variable capacitor unit including a second dielectric layer formed of the ferroelectric material, is connected to the element body unit, and has a capacitance varying according to the control voltage signal; a first external terminal for signals which is connected to the element body unit and configured to receive an input of an AC signal; a second external terminal for signals which is connected to the element body unit or the compensation unit and configured to receive an input of an AC signal; an external terminal for control which is connected to the element body unit and configured to receive an input of the control voltage signal; and an external terminal for capacitance compensation which is connected to the compensation unit.

(14)

An electronic apparatus, comprising:
a communication unit which includes a resonant capacitor and a resonant coil connected to the resonant capacitor, and is configured to perform non-contact communication with outside,
wherein the resonant capacitor includes a variable capacitance element, the variable capacitance element including: an element body unit which includes a first variable capacitor unit including a first dielectric layer formed of a ferroelectric material and has a capacitance varying according to a control voltage signal applied from outside; a compensation unit which includes a second variable capacitor unit including a second dielectric layer formed of the ferroelectric material, is connected to the element body unit, and has a capacitance varying according to the control voltage signal; a first external terminal for signals is connected to the element body unit and configured to receive an input of an AC signal; a second external terminal for signals which is connected to the element body unit or the compensation unit and configured to receive an input of an AC signal; an external terminal for control which is connected to the element body unit and configured to receive an input of the control voltage signal; and an external terminal for capacitance compensation which is connected to the compensation unit; and a voltage generating circuit configured to output the control voltage signal to the external terminal for control included in the variable capacitance element.

(15)

An electronic apparatus, comprising:
a power feeding apparatus unit including a power feeding antenna unit,
wherein the power feeding antenna unit includes a first resonant capacitor and a first resonant coil connected to the first resonant capacitor, and
wherein the first resonant capacitor includes a first variable capacitance element, the first variable capacitance element including: a first element body unit which includes a first variable capacitor unit including a first dielectric layer formed of a ferroelectric material and has a capacitance varying according to a first control voltage signal applied from outside; a first compensation unit which includes a second variable capacitor unit including a second dielectric layer formed of the ferroelectric material, is connected to the first element body unit, and has a capacitance varying according to the first control voltage signal; a first external terminal for signals which is connected to the first element body unit, and configured to receive an input of an AC signal; a second external terminal for signals which is connected to the first element body unit or the first compensation unit and configured to receive an input of an AC signal; a first external terminal for control which is connected to the first element body unit and configured to receive an input of the first control voltage signal; and a first external terminal for capacitance compensation which is connected to the first compensation unit; and
a power receiving apparatus unit including a power receiving antenna unit, wherein the power receiving antenna unit includes a second resonant capacitor and a second resonant coil connected to the second resonant capacitor, and is configured to perform non-contact communication with the power feeding antenna unit, and wherein the second resonant capacitor includes a second variable capacitance element, the second variable capacitance element including: a second element body unit which includes a third variable capacitor unit including a third dielectric layer formed of a ferroelectric material and has a capacitance varying according to a second control voltage signal applied from outside; a second compensation unit which includes a fourth variable capacitor unit including a fourth dielectric layer formed of the ferroelectric material, is connected to the second element body unit, and has a capacitance varying according to the second control voltage signal; a third external terminal for signals which is connected to the second element body unit and configured to receive an input of an AC signal; a fourth external terminal for signals which is connected to the second element body unit or the second compensation unit and configured to receive an input of an AC signal; a second external terminal for control which is connected to the second element body unit and configured to receive an input of the second control voltage signal; and a second external terminal for capacitance compensation which is connected to the second compensation unit.

(16)
An electronic apparatus, comprising:
a power supply unit;
a rectifier circuit unit configured to convert AC power supplied from the power supply unit into DC power; and
a variable impedance unit including a variable capacitance element and provided between the power supply unit and the rectifier circuit unit,
wherein the variable capacitance element includes: an element body unit which includes a first variable capacitor unit including a first dielectric layer formed of a ferroelectric material and has a capacitance varying according to a control voltage signal applied from outside; a compensation unit which includes a second variable capacitor unit including a second dielectric layer formed of the ferroelectric material, is connected to the element body unit, and has a capacitance varying according to the control voltage signal; a first external terminal for signals which is connected to the element body unit and configured to receive an input of an AC signal; a second external terminal for signals is connected to the element body unit or the compensation unit and configured to receive an input of an AC signal; an external terminal for control which is connected to the element body unit and configured to receive an input of the control voltage signal; and an external terminal for capacitance compensation which is connected to the compensation unit.

(17)
An electronic apparatus, comprising:
a communication apparatus unit including a receiving antenna unit,
wherein the receiving antenna unit includes a first resonant capacitor and a first resonant coil connected to the first resonant capacitor, and is configured to perform non-contact communication with outside, and
wherein the first resonant capacitor includes a first variable capacitance element, the first variable capacitance element including: a first element body unit which includes a first variable capacitor unit including a first dielectric layer formed of a ferroelectric material and has a capacitance varying according to a first control voltage signal applied from outside; a first compensation unit which includes a second variable capacitor unit including a second dielectric layer formed of the ferroelectric material, is connected to the first element body unit, and has a capacitance varying according to the first control voltage signal; a first external terminal for signals which is connected to the first element body unit and configured to receive an input of an AC signal; a second external terminal for signals which is connected to the first element body unit or the first compensation unit and configured to receive an input of an AC signal; a first external terminal for control which is connected to the first element body unit and configured to receive an input of the first control voltage signal; and a first external terminal for capacitance compensation which is connected to the first compensation unit;
a power feeding apparatus unit including a power feeding antenna unit,
wherein the power feeding antenna unit includes a second resonant capacitor and a second resonant coil connected to the second resonant capacitor, and
wherein the second resonant capacitor includes a second variable capacitance element, the second variable capacitance element including: a second element body unit which includes a third variable capacitor unit including a third dielectric layer formed of a ferroelectric material and has a capacitance varying according to a second control voltage signal applied from outside; a second compensation unit which includes a fourth variable capacitor unit including a fourth dielectric layer formed of the ferroelectric material, is connected to the second element body unit, and has a capacitance varying according to the second control voltage signal; a third external terminal for signals which is connected to the second element body unit and configured to receive an input of an AC signal; a fourth external terminal for signals which is connected to the second element body unit or the second compensation unit and configured to receive an input of an AC signal; a second external terminal for control which is connected to the second element body unit and configured to receive an input of the second control voltage signal; and a second external terminal for capacitance compensation which is connected to the second compensation unit; and
a power receiving apparatus unit including a power receiving antenna unit, wherein the power receiving antenna unit includes a third resonant capacitor and a third resonant coil connected to the third resonant capacitor, and is configured to perform non-contact communication with the power feeding antenna unit, and wherein the third resonant capacitor includes a third variable capacitance element, the third variable capacitance element including: a third element body unit which includes a fifth variable capacitor unit including a fifth dielectric layer formed of a ferroelectric material and has a capacitance varying according to a third control voltage signal applied from outside; a third compensation unit which includes a sixth variable capacitor unit including a sixth dielectric layer formed of the ferroelectric material, is connected to the third element body unit, and has a capacitance varying according to the third control voltage signal; a fifth external terminal for signals which is connected to the third element body unit and configured to receive an input of an AC signal; a sixth external terminal for signals which is connected to the third element body unit or the third compensation unit and configured to receive an input of an AC signal; a third external terminal for control which is connected to the third element body unit and configured to receive an input of the third control voltage signal; and a third external terminal for capacitance compensation which is connected to the third compensation unit.

(18)
An electronic apparatus, comprising:
a communication apparatus unit including a receiving antenna unit,
wherein the receiving antenna unit includes a first resonant capacitor and a first resonant coil connected to the first resonant capacitor, and is configured to perform non-contact communication with outside, and
wherein the first resonant capacitor includes a first variable capacitance element, the first variable capacitance element including: a first element body unit which includes a first variable capacitor unit including a first dielectric layer formed of a ferroelectric material and has a capacitance varying according to a first control voltage signal applied from outside; a first compensation unit which includes a second variable capacitor unit including a second dielectric layer formed of the ferroelectric material, is connected to the first element body unit, and has a capacitance varying according to the first control voltage signal; a first external terminal for signals which is connected to the first element body unit and configured to receive an input of an AC signal; a second external terminal for signals which is connected to the first element body unit or the first compensation unit and configured to receive an input of an AC signal; a first external terminal for control which is connected to the first element body unit and configured to receive an input of the first control voltage signal; and a first external terminal for capacitance compensation which is connected to the first compensation unit; and a power supply apparatus unit including a power supply unit, a rectifier circuit unit, and a variable impedance unit, wherein the rectifier circuit unit is configured to convert AC power supplied from the power supply unit into DC power, wherein the variable impedance unit includes a second variable capacitance element and is provided between the power supply unit and the rectifier circuit unit, and wherein the second variable capacitance element includes: a second element body unit which includes a third variable capacitor unit including a third dielectric layer formed of a ferroelectric material and has a capacitance varying according to a second control voltage signal applied from outside; a second compensation unit which includes a fourth variable capacitor unit including a fourth dielectric layer formed of the ferroelectric material, is connected to the second element body unit, and has a capacitance varying according to the second control voltage signal; a third external terminal for signals which is connected to the second element body unit and configured to receive an input of an AC signal; a fourth external terminal for signals which is connected to the second element body unit or the second compensation unit and configured to receive an input of an AC signal; a second external terminal for control which is connected to the second element body unit and configured to receive an input of the second control voltage signal; and a second external terminal for capacitance compensation which is connected to the second compensation unit.

(19)
An electronic apparatus, comprising:
a power feeding apparatus unit including a power feeding antenna unit,
wherein the power feeding antenna unit includes a first resonant capacitor and a first resonant coil connected to the first resonant capacitor, and
wherein the first resonant capacitor includes a first variable capacitance element, the first variable capacitance element including: a first element body unit which includes a first variable capacitor unit including a first dielectric layer formed of a ferroelectric material and has a capacitance varying according to a first control voltage signal applied from outside; a first compensation unit which includes a second variable capacitor unit including a second dielectric layer formed of the ferroelectric material, is connected to the first element body unit, and has a capacitance varying according to the first control voltage signal; a first external terminal for signals which is connected to the first element body unit and configured to receive an input of an AC signal; a second external terminal for signals which is connected to the first element body unit or the first compensation unit and configured to receive an input of an AC signal; a first external terminal for control which is connected to the first element body unit and configured to receive an input of the first control voltage signal; and a first external terminal for capacitance compensation which is connected to the first compensation unit;

a power receiving apparatus unit having a power receiving antenna unit, wherein the power receiving antenna unit includes a second resonant capacitor and a second resonant coil connected to the second resonant capacitor, and is configured to perform non-contact communication with the power feeding antenna unit, and wherein the second resonant capacitor includes a second variable capacitance element, the second variable capacitance element including: a second element body unit which includes a third variable capacitor unit including a third dielectric layer formed of a ferroelectric material and has a capacitance varying according to a second control voltage signal applied from outside; a second compensation unit which includes a fourth variable capacitor unit including a fourth dielectric layer formed of the ferroelectric material, is connected to the second element body unit, and has a capacitance varying according to the second control voltage signal; a third external terminal for signals which is connected to the second element body unit and configured to receive an input of an AC signal; a fourth external terminal for signals which is connected to the second element body unit or the second compensation unit and configured to receive an input of an AC signal; a second external terminal for control which is connected to the second element body unit and configured to receive an input of the second control voltage signal; and a second external terminal for capacitance compensation which is connected to the second compensation unit; and a power supply apparatus unit including a power supply unit, a rectifier circuit unit, and a variable impedance unit, wherein the rectifier circuit unit is configured to convert AC power supplied from the power supply unit into DC power, wherein the variable impedance unit includes a third variable capacitance element and is provided between the power supply unit and the rectifier circuit unit, and wherein the third variable capacitance element includes: a third element body unit which includes a fifth variable capacitor unit including a fifth dielectric layer formed of a ferroelectric material and has a capacitance varying according to a third control voltage signal applied from outside; a third compensation unit which includes a sixth variable capacitor unit including a sixth dielectric layer formed of the ferroelectric material, is connected to the third element body unit, and has a capacitance varying according to the third control voltage signal; a fifth external terminal for signals which is connected to the third element body unit and configured to receive an input of an AC signal; a sixth external terminal for signals which is connected to the third element body unit or the third compensation unit and configured to receive an input of an AC signal; a third external terminal for control which is connected to the third element body unit and configured to receive an input of the third control voltage signal; and a third external terminal for capacitance compensation which is connected to the third compensation unit.

(20)
An electronic apparatus, comprising:
a communication apparatus unit including a receiving antenna unit,
wherein the receiving antenna unit includes a first resonant capacitor and a first resonant coil connected to the first resonant capacitor, and is configured to perform non-contact communication with outside, and
wherein the first resonant capacitor includes a first variable capacitance element, the first variable capacitance element including: a first element body unit which includes a first variable capacitor unit including a first dielectric layer formed of a ferroelectric material and has a capacitance varying according to a first control voltage signal applied from outside; a first compensation unit which includes a second variable capacitor unit including a second dielectric layer formed of the ferroelectric material, is connected to the first element body unit, and has a capacitance varying according to the first control voltage signal; a first external terminal for signals which is connected to the first element body unit and configured to receive an input of an AC signal; a second external terminal for signals which is connected to the first element body unit or the first compensation unit and configured to receive an input of an AC signal; a first external terminal for control which is connected to the first element body unit and configured to receive an input of the first control voltage signal; and a first external terminal for capacitance compensation which is connected to the first compensation unit;

a power feeding apparatus unit including a power feeding antenna unit, wherein the power feeding antenna unit includes a second resonant capacitor and a second resonant coil connected to the second resonant capacitor, and wherein the second resonant capacitor includes a second variable capacitance element, the second variable capacitance element including: a second element body unit which includes a third variable capacitor unit including a third dielectric layer formed of a ferroelectric material and has a capacitance varying according to a second control voltage signal applied from outside; a second compensation unit which includes a fourth variable capacitor unit including a fourth dielectric layer formed of the ferroelectric material, is connected to the second element body unit, and has a capacitance varying according to the second control voltage signal; a third external terminal for signals which is connected to the second element body unit and configured to receive an input of an AC signal; a fourth external terminal for signals which is connected to the second element body unit or the second compensation unit and configured to receive an input of an AC signal; a second external terminal for control which is connected to the second element body unit and configured to receive an input of the second control voltage signal; and a second external terminal for capacitance compensation which is connected to the second compensation unit;

a power receiving apparatus unit including a power receiving antenna unit, wherein the power receiving antenna unit includes a third resonant capacitor and a third resonant coil connected to the third resonant capacitor, and is configured to perform non-contact communication with the power feeding antenna unit, and wherein the third resonant capacitor includes a third variable capacitance element, the third variable capacitance element including: a third element body unit which includes a fifth variable capacitor unit including a fifth dielectric layer formed of a ferroelectric material and has a capacitance varying according to a third control voltage signal applied from outside; a third compensation unit which includes a sixth variable capacitor unit including a sixth dielectric layer formed of the ferroelectric material, is connected to the third element body unit, and has a capacitance varying according to the third control voltage signal; a fifth external terminal for signals which is connected to the third element body unit and configured to receive an input of an AC signal; a sixth external terminal for signals which is connected to the third element body unit or the third compensation unit and configured to receive an input of an AC signal; a third external terminal for control which is connected to the third element body unit and configured to receive an input of the third control voltage signal; and a third external terminal for capacitance compensation which is connected to the third compensation unit; and a power supply apparatus unit including a power supply unit, a rectifier circuit unit, and a variable impedance unit, wherein the rectifier circuit unit is configured to convert AC power supplied from the power supply unit into DC power, wherein the variable impedance unit includes a fourth variable capacitance element and is provided between the power supply unit and the rectifier circuit unit, and wherein the fourth variable capacitance element includes: a fourth element body unit which includes a seventh variable capacitor unit including a seventh dielectric layer formed of a ferroelectric material and has a capacitance varying according to a fourth control voltage signal applied from outside; a fourth compensation unit which includes an eighth variable capacitor unit including an eighth dielectric layer formed of the ferroelectric material, is connected to the fourth element body unit, and has a capacitance varying according to the fourth control voltage signal; a seventh external terminal for signals which is connected to the fourth element body unit and configured to receive an input of an AC signal; an eighth external terminal for signals which is connected to the fourth element body unit or the fourth compensation unit and configured to receive an input of an AC signal; a fourth external terminal for control which is connected to the fourth element body unit and configured to receive an input of the fourth control voltage signal; and a fourth external terminal for capacitance compensation which is connected to the fourth compensation unit.

REFERENCE SIGNS LIST 1, 2, 10, 30, 50, 70, 100 . . . variable capacitance element, 3, 11, 31, 101 . . . capacitor body unit, 4, 12, 32, 52, 72, 102 . . . compensation unit, 5, 13 . . . external terminal for signals, 6 . . . external terminals for compensation, 7 . . . internal terminal, 8 . . . first compensation capacitor unit, 9 . . . second compensation capacitor unit, 14 . . . first external terminal for control, 15 . . . second external terminal for control, 16 . . . first external terminal for compensation, 17 . . . second external terminal for compensation, 18 . . . third external terminal for compensation, 20, 25, 40, 60, 80, 90, 95, 100, 110, 115 . . . packaged circuit, 21, 91, 111 . . . external wiring, 61, 81 . . . selection unit, 62, 82 . . . first external wiring, 63, 83 . . . second external wiring, 64 . . . third external wiring, 200 . . . communication apparatus, 201 . . . receiving unit, 210 . . . resonant antenna, 211 . . . voltage generating circuit, 213 . . . resonant coil, 214 . . . resonant capacitor, 215 . . . fixed-capacitance capacitor, 216 . . . variable capacitor, 217 . . . bias-removal capacitor, 220 . . . communication system, 221 . . . transmitting apparatus, 222 . . . receiving apparatus, 240 . . . wireless charging system, 241 . . . power feeding apparatus, 242 . . . power receiving apparatus, 270 . . . power supply apparatus, 271 . . . power transformer, 272 . . . variable impedance unit, C1 to C8, C31 to C38 . . . first to eighth variable-capacitance capacitor units, C39 . . . ninth variable-capacitance capacitor unit, C9, C40, C51, C71 . . . first compensation capacitor unit, C10, C41, C52, C72 . . . second compensation capacitor unit, C11, C53 . . . third compensation capacitor unit, C91 . . . first variable-capacitance capacitor unit, C92 . . . second variable-capacitance capacitor unit, C93 . . . first compensation capacitor unit, C94 . . . second compensation capacitor unit, R1 . . . first bias resistance, R2 . . . second bias resistance, Vc . . . control voltage.

The invention claimed is:

1. A variable capacitance element comprising:
an element body unit which includes a first variable capacitor unit including a first dielectric layer formed of a ferroelectric material and has a capacitance varying according to a control voltage signal applied from outside;
a compensation unit which includes a plurality of second variable capacitor units including a second dielectric layer formed of the ferroelectric material, is connected to the element body unit, and has a capacitance varying according to the control voltage signal;
a first external terminal for signals which is connected to the element body unit and configured to receive an input of an AC signal;
a second external terminal for signals which is connected to the element body unit or the compensation unit and configured to receive an input of an AC signal;
an external terminal for control which is connected to the element body unit and configured to receive an input of the control voltage signal; and
an external terminal for capacitance compensation which is connected to the compensation unit, wherein:
the element body unit and the compensation unit are serially connected,
the second external terminal for signals is connected to the compensation unit,
said second variable capacitor units being connected in parallel,
one end of each of the second variable capacitor units is connected to the element body unit,
another end of one of the second variable capacitor units is connected to the second external terminal for signals, and
the external terminal for capacitance compensation is provided to another end of each of the remaining second variable capacitor units, and said other end of each of said remaining second variable capacitor units is connected to a corresponding one of the external terminals for capacitance compensation.

2. A variable capacitance element comprising:
an element body unit which includes a first variable capacitor unit including a first dielectric layer formed of a ferroelectric material and has a capacitance varying according to a control voltage signal applied from outside;
a compensation unit which includes a plurality of second variable capacitor units including a second dielectric layer formed of the ferroelectric material, is connected to the element body unit, and has a capacitance varying according to the control voltage signal;
a first external terminal for signals which is connected to the element body unit and configured to receive an input of an AC signal;
a second external terminal for signals which is connected to the element body unit or the compensation unit and configured to receive an input of an AC signal;
an external terminal for control which is connected to the element body unit and configured to receive an input of the control voltage signal; and
an external terminal for capacitance compensation which is connected to the compensation unit, wherein:
the element body unit and the compensation unit are serially connected,
the second external terminal for signals is connected to the compensation unit,
said second variable capacitor units being serially connected,
one end of a series circuit comprising the plurality of the second variable capacitor units is connected to the element body unit,
another end of the series circuit is connected to the second external terminal for signals, and
the external terminal for capacitance compensation is provided to each of connection points between the second variable capacitor units adjacent to each other, and each of the connection points is connected to a corresponding one of the external terminals for capacitance compensation.

3. A variable capacitance element comprising:
an element body unit which includes a first variable capacitor unit including a first dielectric layer formed of a ferroelectric material and has a capacitance varying according to a control voltage signal applied from outside;
a compensation unit which includes a plurality of second variable capacitor units including a second dielectric layer formed of the ferroelectric material, is connected to the element body unit, and has a capacitance varying according to the control voltage signal;
a first external terminal for signals which is connected to the element body unit and configured to receive an input of an AC signal;
a second external terminal for signals which is connected to the element body unit or the compensation unit and configured to receive an input of an AC signal;
an external terminal for control which is connected to the element body unit and configured to receive an input of the control voltage signal; and
an external terminal for capacitance compensation which is connected to the compensation unit, wherein:
the element body unit and the compensation unit are connected in parallel,
the second external terminal for signals is connected to the element body unit, and
one end of the compensation unit is connected to the first external terminal for signals, and another end of the compensation unit is connected to the external terminal for capacitance compensation.

4. The variable capacitance element according to 3, wherein
said second variable capacitor units being serially connected, and
one end of a series circuit comprising the plurality of the second variable capacitor units is connected to the first external terminal for signals, and another end of the series circuit is connected to the external terminal for capacitance compensation.

5. A wireless charging system, comprising:
a power feeding apparatus including a power feeding antenna unit,
wherein the power feeding antenna unit includes a first resonant capacitor and a first resonant coil connected to the first resonant capacitor, and
wherein the first resonant capacitor includes a first variable capacitance element, the first variable capacitance element including: a first element body unit which includes a first variable capacitor unit including a first dielectric layer formed of a ferroelectric material and has a capacitance varying according to a first control voltage signal applied from outside; a first compensation unit which includes a second variable capacitor unit including a second dielectric layer formed of the ferroelectric material, is connected to the first element body unit, and has a capacitance varying according to the first control voltage signal; a first external terminal for signals which is connected to the first element body unit and configured to receive an input of an AC signal; a second external terminal for signals which is connected to the first element body unit or the first compensation unit and configured to receive an input of an AC signal; a first external terminal for control which is connected to the first element body unit and configured to receive an input of the first control voltage signal; and a first external terminal for capacitance compensation which is connected to the first compensation unit; and a power receiving apparatus including a power receiving antenna unit, wherein the power receiving antenna unit includes a second resonant capacitor and a second resonant coil connected to the second resonant capacitor, and is configured to perform non-contact communication with the power feeding antenna unit, and wherein the second resonant capacitor includes a second variable capacitance element, the second variable capacitance element including: a second element body unit which includes a third variable capacitor unit including a third dielectric layer formed of a ferroelectric material and has a capacitance varying according to a second control voltage signal applied from outside; a second compensation unit which includes a fourth variable capacitor unit including a fourth dielectric layer formed of the ferroelectric material, is connected to the second element body unit, and has a capacitance varying according to the second control voltage signal; a third external terminal for signals which is connected to the second element body unit and configured to receive an input of an AC signal; a fourth external terminal for signals which is connected to the second element body unit or the second compensation unit and configured to receive an input of an AC signal; a second external terminal for control is connected to the second element body unit and configured to receive an input of the second control voltage signal; and a second external terminal for capacitance compensation which is connected to the second compensation unit.

6. An electronic apparatus, comprising:

a power feeding apparatus unit including a power feeding antenna unit, wherein the power feeding antenna unit includes a first resonant capacitor and a first resonant coil connected to the first resonant capacitor, and wherein the first resonant capacitor includes a first variable capacitance element, the first variable capacitance element including: a first element body unit which includes a first variable capacitor unit including a first dielectric layer formed of a ferroelectric material and has a capacitance varying according to a first control voltage signal applied from outside; a first compensation unit which includes a second variable capacitor unit including a second dielectric layer formed of the ferroelectric material, is connected to the first element body unit, and has a capacitance varying according to the first control voltage signal; a first external terminal for signals which is connected to the first element body unit and configured to receive an input of an AC signal; a second external terminal for signals which is connected to the first element body unit or the first compensation unit and configured to receive an input of an AC signal; a first external terminal for control which is connected to the first element body unit and configured to receive an input of the first control voltage signal; and a first external terminal for capacitance compensation which is connected to the first compensation unit; and a power receiving apparatus unit including a power receiving antenna unit, wherein the power receiving antenna unit includes a second resonant capacitor and a second resonant coil connected to the second resonant capacitor, and is configured to perform non-contact communication with the power feeding antenna unit, and wherein the second resonant capacitor includes a second variable capacitance element, the second variable capacitance element including: a second element body unit which includes a third variable capacitor unit including a third dielectric layer formed of a ferroelectric material and has a capacitance varying according to a second control voltage signal applied from outside; a second compensation unit which includes a fourth variable capacitor unit including a fourth dielectric layer formed of the ferroelectric material, is connected to the second element body unit, and has a capacitance varying according to the second control voltage signal; a third external terminal for signals which is connected to the second element body unit and configured to receive an input of an AC signal; a fourth external terminal for signals which is connected to the second element body unit or the second compensation unit and configured to receive an input of an AC signal; a second external terminal for control which is connected to the second element body unit and configured to receive an input of the second control voltage signal; and a second external terminal for capacitance compensation which is connected to the second compensation unit.

7. An electronic apparatus, comprising:

a communication apparatus unit including a receiving antenna unit, wherein the receiving antenna unit includes a first resonant capacitor and a first resonant coil connected to the first resonant capacitor, and is configured to perform non-contact communication with outside, and wherein the first resonant capacitor includes a first variable capacitance element, the first variable capacitance element including: a first element body unit which includes a first variable capacitor unit including a first dielectric layer formed of a ferroelectric material and has a capacitance varying according to a first control voltage signal applied from outside; a first compensation unit which includes a second variable capacitor unit including a second dielectric layer formed of the ferroelectric material, is connected to the first element body unit, and has a capacitance varying according to the first control voltage signal; a first external terminal for signals which is connected to the first element body unit and configured to receive an input of an AC signal; a second external terminal for signals which is connected to the first element body unit or the first compensation unit and configured to receive an input of an AC signal; a first external terminal for control which is connected to the first element body unit and configured to receive an input of the first control voltage signal; and a first external terminal for capacitance compensation which is connected to the first compensation unit;

a power feeding apparatus unit including a power feeding antenna unit, wherein the power feeding antenna unit includes a second resonant capacitor and a second resonant coil connected to the second resonant capacitor, and wherein the second resonant capacitor includes a second variable capacitance element, the second variable capacitance element including: a second element body unit which includes a third variable capacitor unit including a third dielectric layer formed of a ferroelectric material and has a capacitance varying according to a second control voltage signal applied from outside; a second compensation unit which includes a fourth variable capacitor unit including a fourth dielectric layer formed of the ferroelectric material, is connected to the second element body unit, and has a capacitance varying according to the second control voltage signal; a third external terminal for signals which is connected to the second element body unit and configured to receive an input of an AC signal; a fourth external terminal for signals which is connected to the second element body unit or the second compensation unit and configured to receive an input of an AC signal; a second external terminal for control which is connected to the second element body unit and configured to receive an input of the second control voltage signal; and a second external terminal for capacitance compensation which is connected to the second compensation unit; and a power receiving apparatus unit including a power receiving antenna unit, wherein the power receiving antenna unit includes a third resonant capacitor and a third resonant coil connected to the third resonant capacitor, and is configured to perform non-contact communication with the power feeding antenna unit, and wherein the third resonant capacitor includes a third variable capacitance element, the third variable capacitance element including: a third element body unit which includes a fifth variable capacitor unit including a fifth dielectric layer formed of a ferroelectric material and has a capacitance varying according to a third control voltage signal applied from outside; a third compensation unit which includes a sixth variable capacitor unit including a sixth dielectric layer formed of the ferroelectric material, is connected to the third element body unit, and has a capacitance varying according to the third control voltage signal; a fifth external terminal for signals which is connected to the third element body unit and configured to receive an input of an AC signal; a sixth external terminal for signals which is connected to the third element body unit or the third compensation unit and configured to receive an input of an AC signal; a third external terminal for control which is connected to the third element body unit and configured to receive an input of the third control voltage signal; and a third external terminal for capacitance compensation which is connected to the third compensation unit.

8. An electronic apparatus, comprising:

a communication apparatus unit including a receiving antenna unit, wherein the receiving antenna unit includes a first resonant capacitor and a first resonant coil connected to the first resonant capacitor, and is configured to perform non-contact communication with outside, and wherein the first resonant capacitor includes a first variable capacitance element, the first variable capacitance element including: a first element body unit which includes a first variable capacitor unit including a first dielectric layer formed of a ferroelectric material and has a capacitance varying according to a first control voltage signal applied from outside; a first compensation unit which includes a second variable capacitor unit including a second dielectric layer formed of the ferroelectric material, is connected to the first element body unit, and has a capacitance varying according to the first control voltage signal; a first external terminal for signals which is connected to the first element body unit and configured to receive an input of an AC signal; a second external terminal for signals which is connected to the first element body unit or the first compensation unit and configured to receive an input of an AC signal; a first external terminal for control which is connected to the first element body unit and configured to receive an input of the first control voltage signal; and a first external terminal for capacitance compensation which is connected to the first compensation unit; and a power supply apparatus unit including a power supply unit, a rectifier circuit unit, and a variable impedance unit, wherein the rectifier circuit unit is configured to convert AC power supplied from the power supply unit into DC power, wherein the variable impedance unit includes a second variable capacitance element and is provided between the power supply unit and the rectifier circuit unit, and wherein the second variable capacitance element includes: a second element body unit which includes a third variable capacitor unit including a third dielectric layer formed of a ferroelectric material and has a capacitance varying according to a second control voltage signal applied from outside; a second compensation unit which includes a fourth variable capacitor unit including a fourth dielectric layer formed of the ferroelectric material, is connected to the second element body unit, and has a capacitance varying according to the second control voltage signal; a third external terminal for signals which is connected to the second element body unit and configured to receive an input of an AC signal; a fourth external terminal for signals which is connected to the second element body unit or the second compensation unit and configured to receive an input of an AC signal; a second external terminal for control which is connected to the second element body unit and configured to receive an input of the second control voltage signal; and a second external terminal for capacitance compensation which is connected to the second compensation unit.

9. An electronic apparatus, comprising:

a power feeding apparatus unit including a power feeding antenna unit, wherein the power feeding antenna unit includes a first resonant capacitor and a first resonant coil connected to the first resonant capacitor, and wherein the first resonant capacitor includes a first variable capacitance element, the first variable capacitance element including: a first element body unit which includes a first variable capacitor unit including a first dielectric layer formed of a ferroelectric material and has a capacitance varying according to a first control voltage signal applied from outside; a first compensation unit which includes a second variable capacitor unit including a second dielectric layer formed of the ferroelectric material, is connected to the first element body unit, and has a capacitance varying according to the first control voltage signal; a first external terminal for signals which is connected to the first element body unit and configured to receive an input of an AC signal; a second external terminal for signals which is connected to the first element body unit or the first compensation unit and configured to receive an input of an AC signal; a first external terminal for control which is connected to the first element body unit and configured to receive an input of the first control voltage signal; and a first external terminal for capacitance compensation which is connected to the first compensation unit;

a power receiving apparatus unit including a power receiving antenna unit, wherein the power receiving antenna unit includes a second resonant capacitor and a second resonant coil connected to the second resonant capacitor, and is configured to perform non-contact communication with the power feeding antenna unit, and wherein the second resonant capacitor includes a second variable capacitance element, the second variable capacitance element including: a second element body unit which includes a third variable capacitor unit including a third dielectric layer formed of a ferroelectric material and has a capacitance varying according to a second control voltage signal applied from outside; a second compensation unit which includes a fourth variable capacitor unit including a fourth dielectric layer formed of the ferroelectric material, is connected to the second element body unit, and has a capacitance varying according to the second control voltage signal; a third external terminal for signals which is connected to the second element body unit and configured to receive an input of an AC signal; a fourth external terminal for signals which is connected to the second element body unit or the second compensation unit and configured to receive an input of an AC signal; a second external terminal for control which is connected to the second element body unit and configured to receive an input of the second control voltage signal; and a second external terminal for capacitance compensation which is connected to the second compensation unit; and a power supply apparatus unit including a power supply unit, a rectifier circuit unit, and a variable impedance unit, wherein the rectifier circuit unit is configured to convert AC power supplied from the power supply unit into DC power, wherein the variable impedance unit includes a third variable capacitance element and is provided between the power supply unit and the rectifier circuit unit, and wherein the third variable capacitance element includes: a third element body unit which includes a fifth variable capacitor unit including a fifth dielectric layer formed of a ferroelectric material and has a capacitance varying according to a third control voltage signal applied from outside; a third compensation unit which includes a sixth variable capacitor unit including a sixth dielectric layer formed of the ferroelectric material, is connected to the third element body unit, and has a capacitance varying according to the third control voltage signal; a fifth external terminal for signals which is connected to the third element body unit and configured to receive an input of an AC signal; a sixth external terminal for signals which is connected to the third element body unit or the third compensation unit and configured to receive an input of an AC signal; a third external terminal for control which is connected to the third element body unit and configured to receive an input of the third control voltage signal; and a third external terminal for capacitance compensation which is connected to the third compensation unit.

10. An electronic apparatus, comprising:

a communication apparatus unit including a receiving antenna unit, wherein the receiving antenna unit includes a first resonant capacitor and a first resonant coil connected to the first resonant capacitor, and is configured to perform non-contact communication with outside, and wherein the first resonant capacitor includes a first variable capacitance element, the first variable capacitance element including: a first element body unit which includes a first variable capacitor unit including a first dielectric layer formed of a ferroelectric material and has a capacitance varying according to a first control voltage signal applied from outside; a first compensation unit which includes a second variable capacitor unit including a second dielectric layer formed of the ferroelectric material, is connected to the first element body unit, and has a capacitance varying according to the first control voltage signal; a first external terminal for signals which is connected to the first element body unit and configured to receive an input of an AC signal; a second external terminal for signals which is connected to the first element body unit or the first compensation unit and configured to receive an input of an AC signal; a first external terminal for control which is connected to the first element body unit and configured to receive an input of the first control voltage signal; and a first external terminal for capacitance compensation which is connected to the first compensation unit;

a power feeding apparatus unit including a power feeding antenna unit, wherein the power feeding antenna unit includes a second resonant capacitor and a second resonant coil connected to the second resonant capacitor, and wherein the second resonant capacitor includes a second variable capacitance element, the second variable capacitance element including: a second element body unit which includes a third variable capacitor unit including a third dielectric layer formed of a ferroelectric material and has a capacitance varying according to a second control voltage signal applied from outside; a second compensation unit which includes a fourth variable capacitor unit including a fourth dielectric layer formed of the ferroelectric material, is connected to the second element body unit, and has a capacitance varying according to the second control voltage signal; a third external terminal for signals which is connected to the second element body unit and configured to receive an input of an AC signal; a fourth external terminal for signals which is connected to the second element body unit or the second compensation unit and configured to receive an input of an AC signal; a second external terminal for control which is connected to the second element body unit and configured to receive an input of the second control voltage signal; and a second external terminal for capacitance compensation which is connected to the second compensation unit;

a power receiving apparatus unit including a power receiving antenna unit, wherein the power receiving antenna unit includes a third resonant capacitor and a third resonant coil connected to the third resonant capacitor, and is configured to perform non-contact communication with the power feeding antenna unit, and wherein the third resonant capacitor includes a third variable capacitance element, the third variable capacitance element including: a third element body unit which includes a fifth variable capacitor unit including a fifth dielectric layer formed of a ferroelectric material and has a capacitance varying according to a third control voltage signal applied from outside; a third compensation unit which includes a sixth variable capacitor unit including a sixth dielectric layer formed of the ferroelectric material, is connected to the third element body unit, and has a capacitance varying according to the third control voltage signal; a fifth external terminal for signals which is connected to the third element body unit and configured to receive an input of an AC signal; a sixth external terminal for signals which is connected to the third element body unit or the third compensation unit and configured to receive an input of an AC signal; a third external terminal for control which is connected to the third element body unit and configured to receive an input of the third control voltage signal; and a third external terminal for capacitance compensation which is connected to the third compensation unit; and a power supply apparatus unit including a power supply unit, a rectifier circuit unit, and a variable impedance unit, wherein the rectifier circuit unit is configured to convert AC power supplied from the power supply unit into DC power, wherein the variable impedance unit includes a fourth variable capacitance element and is provided between the power supply unit and the rectifier circuit unit, and wherein the fourth variable capacitance element includes: a fourth element body unit which includes a seventh variable capacitor unit including a seventh dielectric layer formed of a ferroelectric material and has a capacitance varying according to a fourth control voltage signal applied from outside; a fourth compensation unit which includes an eighth variable capacitor unit including an eighth dielectric layer formed of the ferroelectric material, is connected to the fourth element body unit, and has a capacitance varying according to the fourth control voltage signal; a seventh external terminal for signals which is connected to the fourth element body unit and configured to receive an input of an AC signal; an eighth external terminal for signals which is connected to the fourth element body unit or the fourth compensation unit and configured to receive an input of an AC signal; a fourth external terminal for control which is connected to the fourth element body unit and configured to receive an input of the fourth control voltage signal; and a fourth external terminal for capacitance compensation which is connected to the fourth compensation unit.

* * * * *